United States Patent
Maruyama et al.

(10) Patent No.: US 9,104,257 B2
(45) Date of Patent: Aug. 11, 2015

(54) DISPLAY APPARATUS AND METHOD OF DRIVING THE SAME

(75) Inventors: Satoshi Maruyama, Hakusan (JP); Takanori Tsunashima, Ageo (JP); Hiroyuki Kimura, Fukaya (JP); Kenji Harada, Nomi (JP); Hirotaka Hayashi, Fukaya (JP)

(73) Assignee: JAPAN DISPLAY INC., Tokyo (JP)

( * ) Notice: Subject to any disclaimer, the term of this patent is extended or adjusted under 35 U.S.C. 154(b) by 433 days.

(21) Appl. No.: 13/425,648

(22) Filed: Mar. 21, 2012

(65) Prior Publication Data

US 2012/0242634 A1    Sep. 27, 2012

(30) Foreign Application Priority Data

Mar. 25, 2011  (JP) ................................ 2011-068870
Mar. 25, 2011  (JP) ................................ 2011-068871
Mar.  9, 2012  (JP) ................................ 2012-053465

(51) Int. Cl.
  *G06F 3/041* (2006.01)
  *G09G 3/36* (2006.01)

(52) U.S. Cl.
  CPC ............ *G06F 3/0412* (2013.01); *G09G 3/3648* (2013.01); *G09G 2356/00* (2013.01)

(58) Field of Classification Search
  None
  See application file for complete search history.

(56) References Cited

U.S. PATENT DOCUMENTS 4,639,720 A * 1/1987 Rympalski et al. ........... 345/174
2010/0091846 A1* 4/2010 Suzuki et al. ............. 375/240.12

FOREIGN PATENT DOCUMENTS

JP    8-286170    11/1996
JP    2011-95621    5/2011

* cited by examiner

*Primary Examiner* — David D Davis
(74) *Attorney, Agent, or Firm* — Oblon, McClelland, Maier & Neustadt, L.L.P.

(57) ABSTRACT

According to one embodiment, a display apparatus includes signal lines, and pixels. Each of the pixels includes a pixel electrode and a pixel control switch, and being classified into any of pixel groups. Each of the pixel groups includes a memory, and a sensor circuit which is configured to provide data for a detection signal to the memory when detecting the input information. The pixel control switch is configured to switch the voltage level of the pixel electrode in accordance with data for the display signal input via the signal line and the data for the detection signal input from the memory.

12 Claims, 30 Drawing Sheets

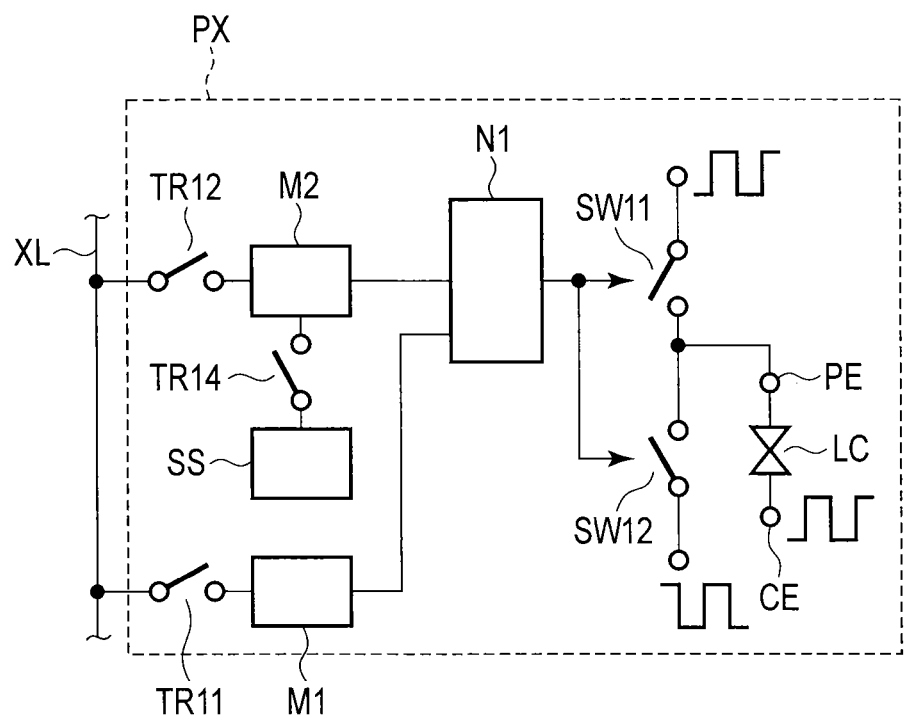
F I G. 2

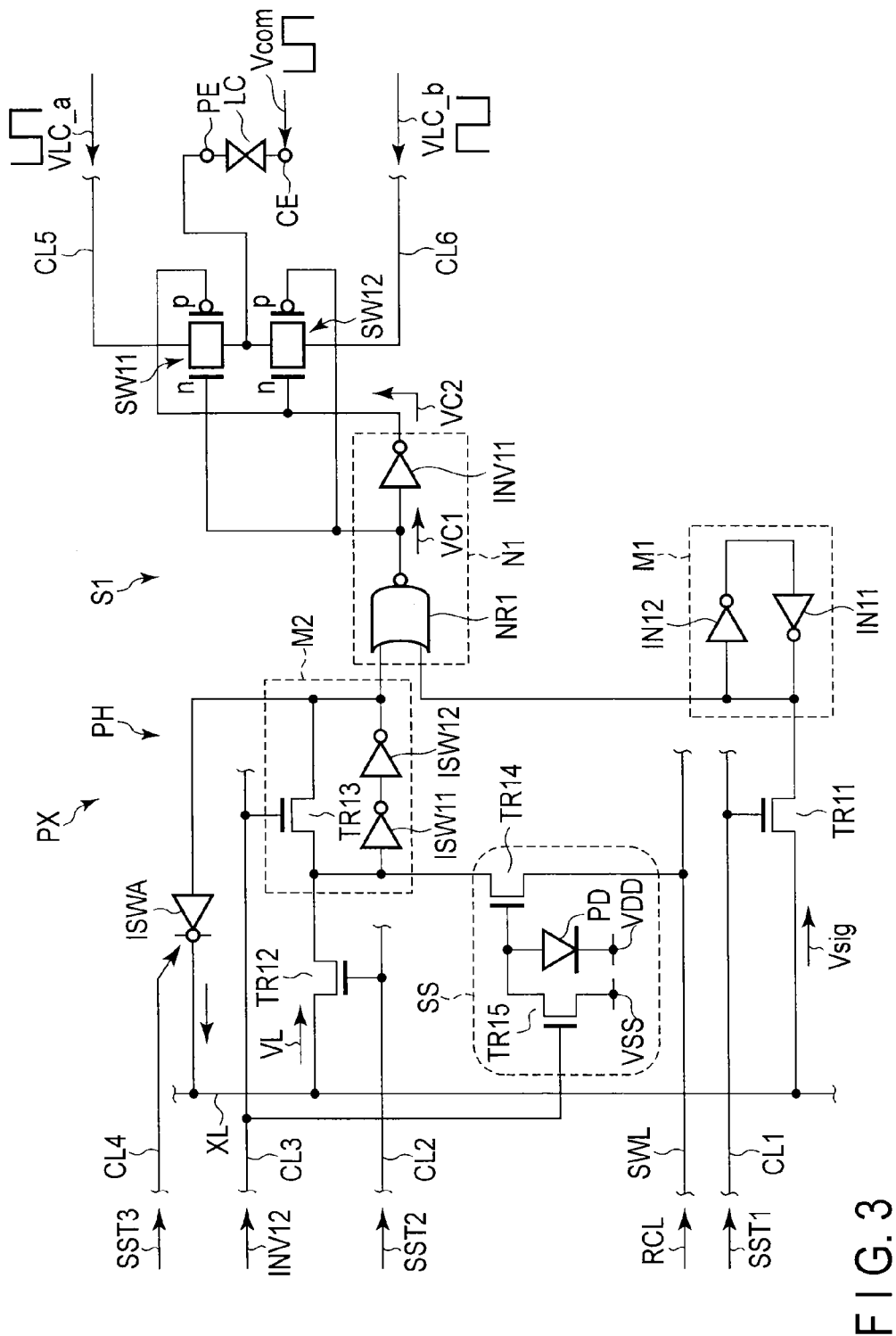
F I G. 3

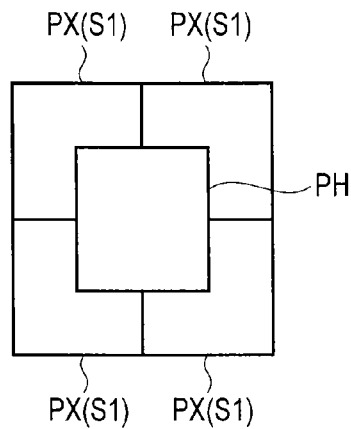
F I G. 5
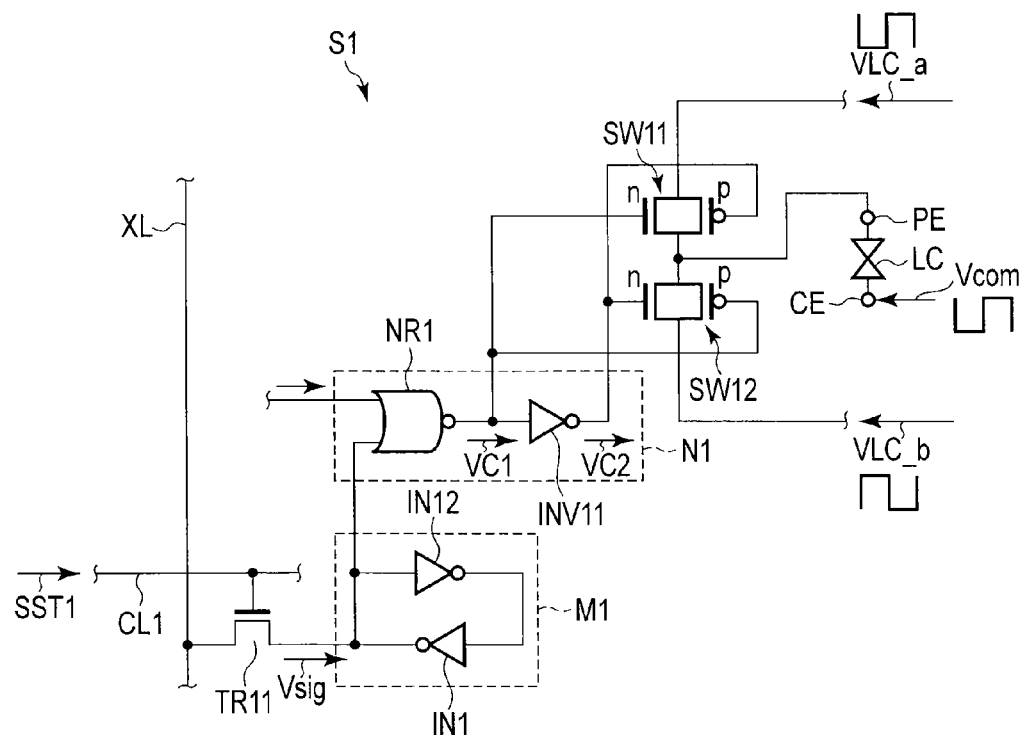
F I G. 6

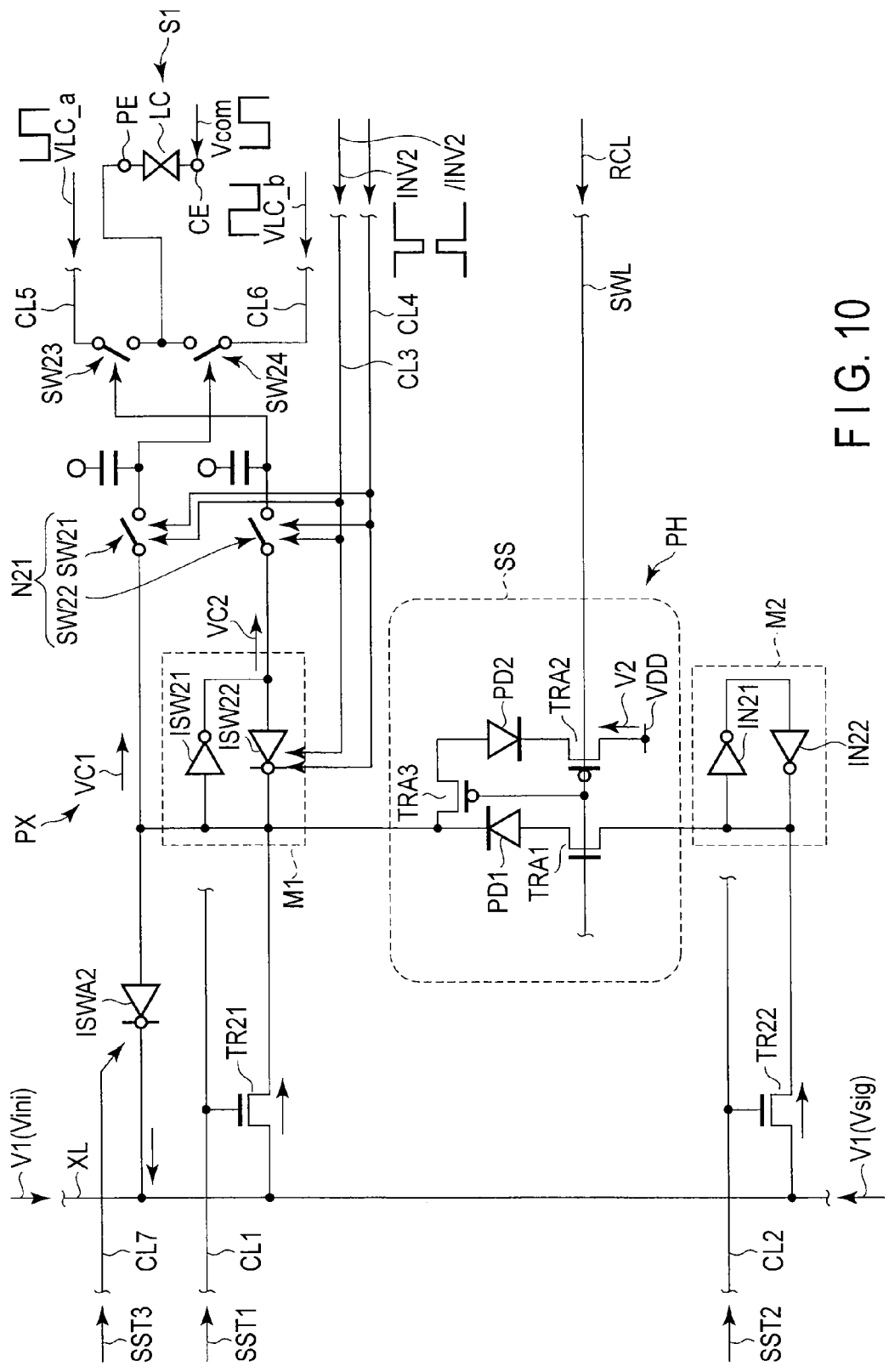
F I G. 10

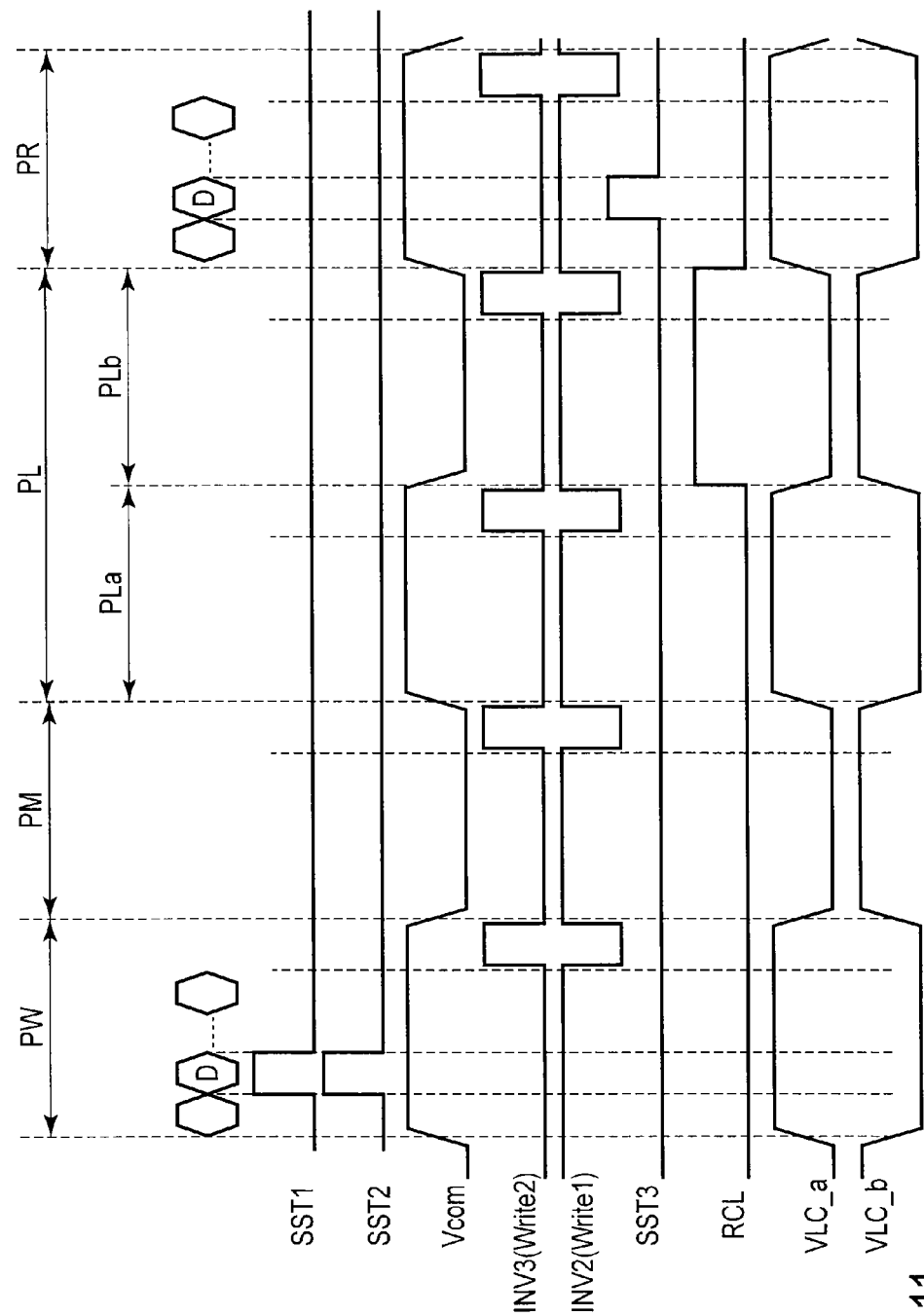
F I G. 11

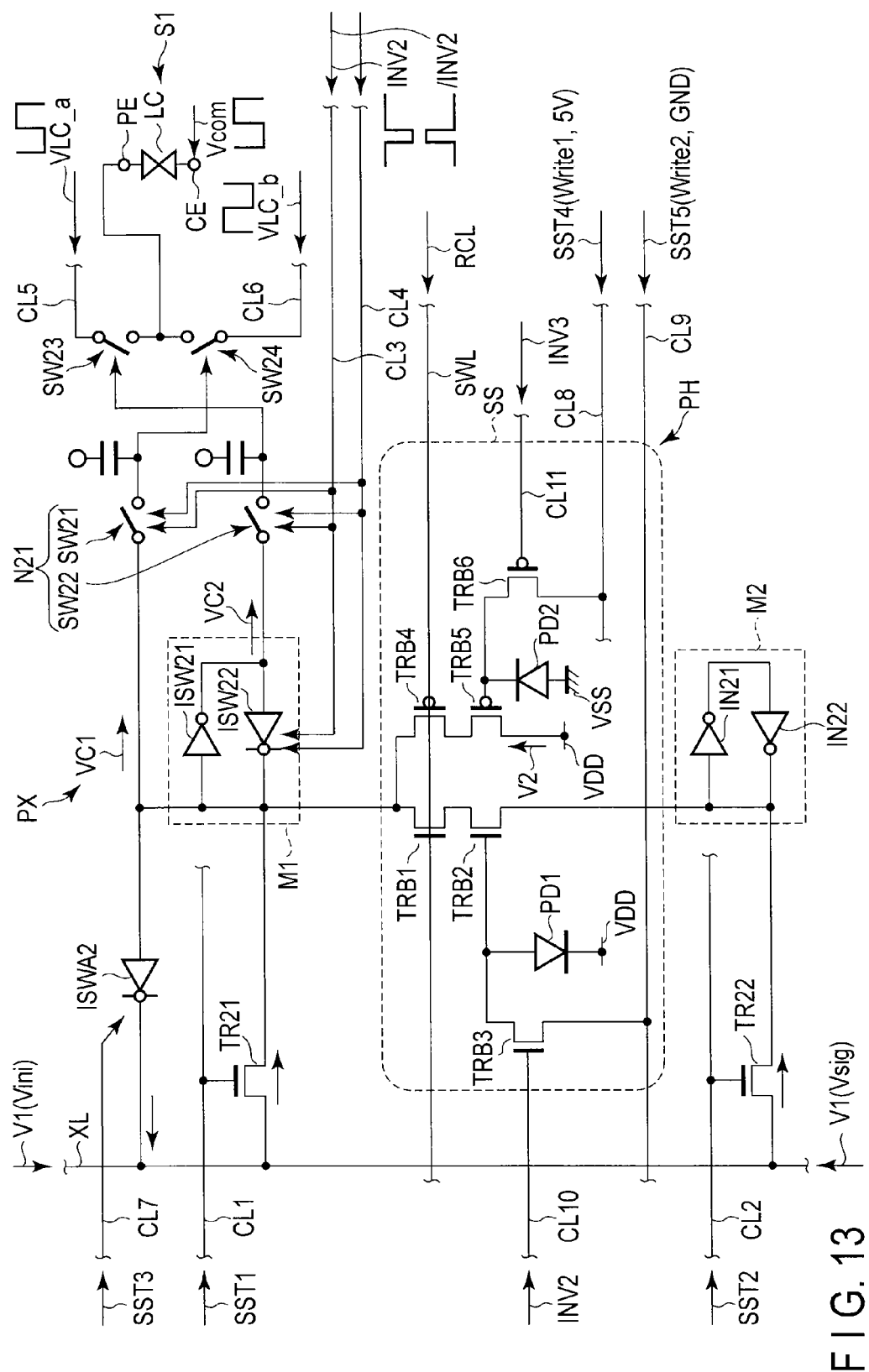
F I G. 13

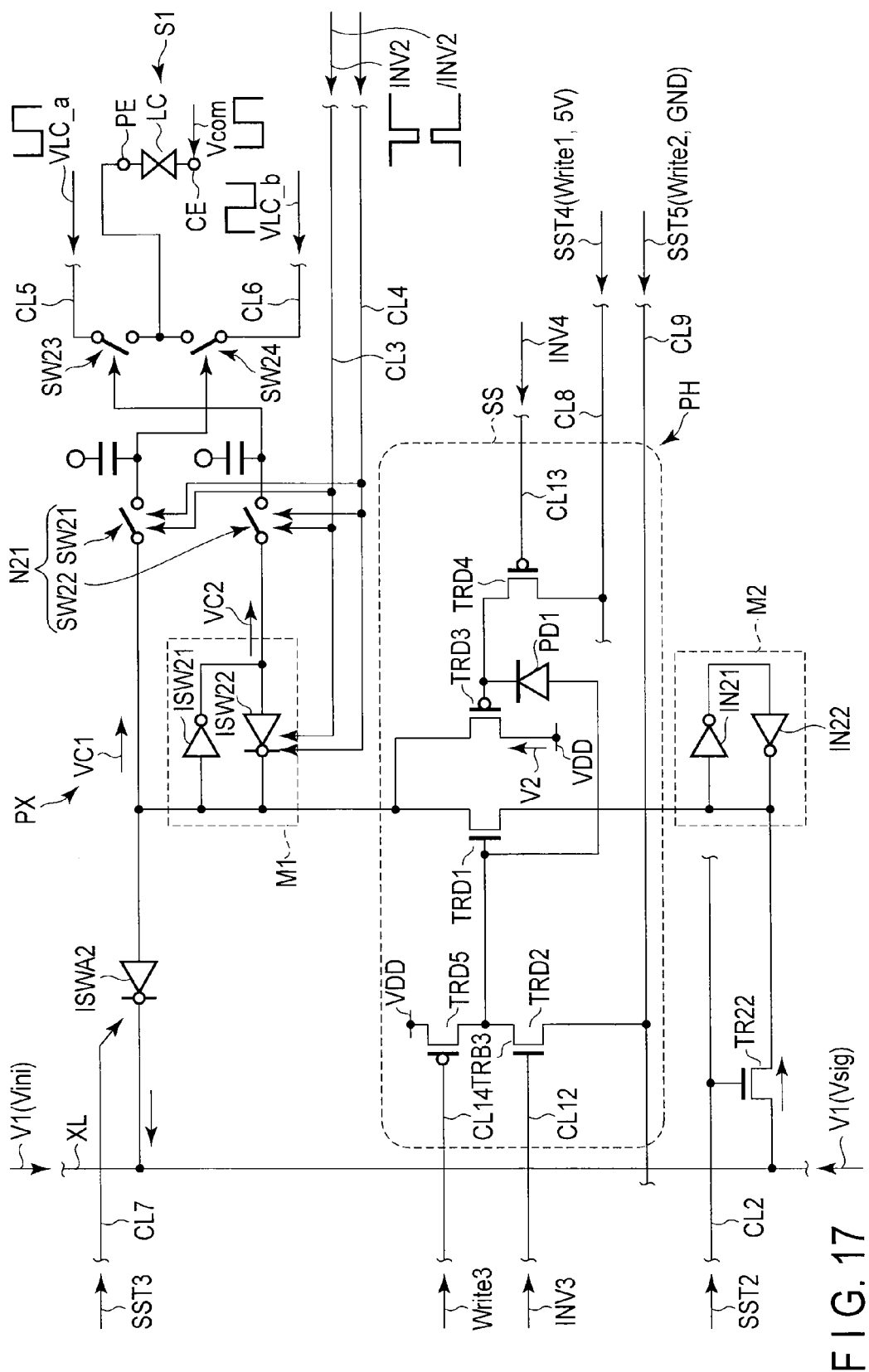
F I G. 17

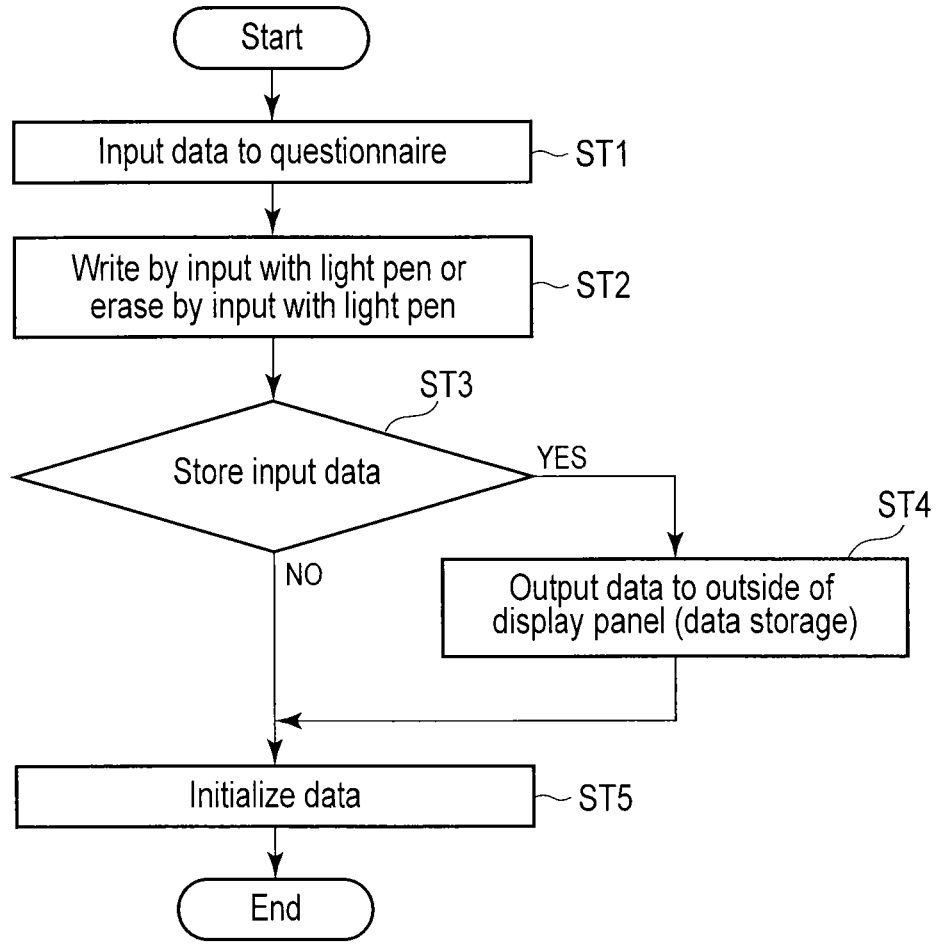
F I G. 19

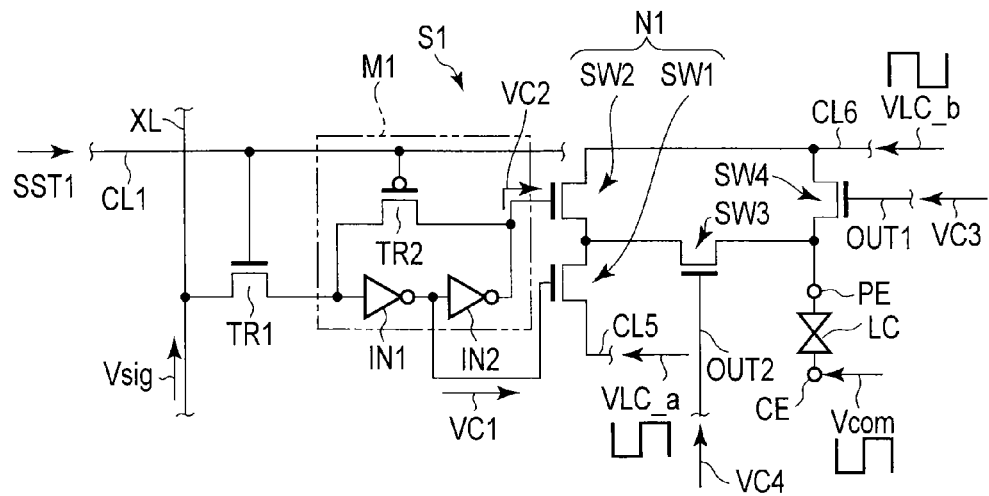
F I G. 24
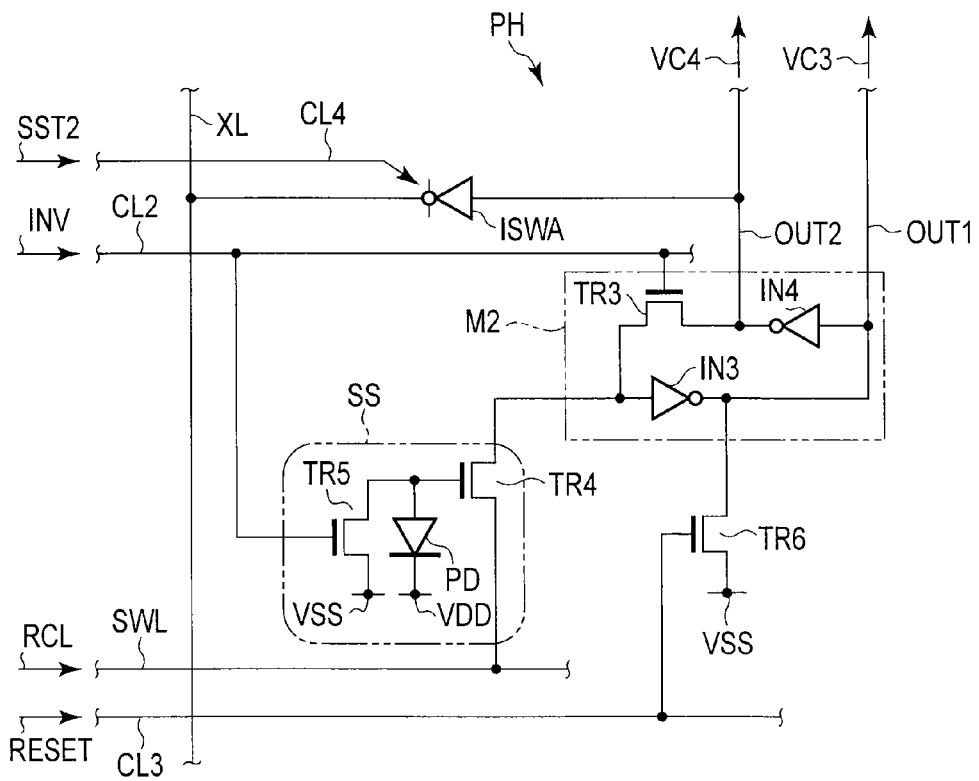
F I G. 25

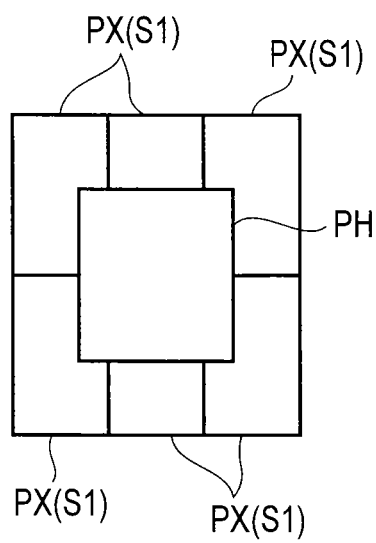
F I G. 26

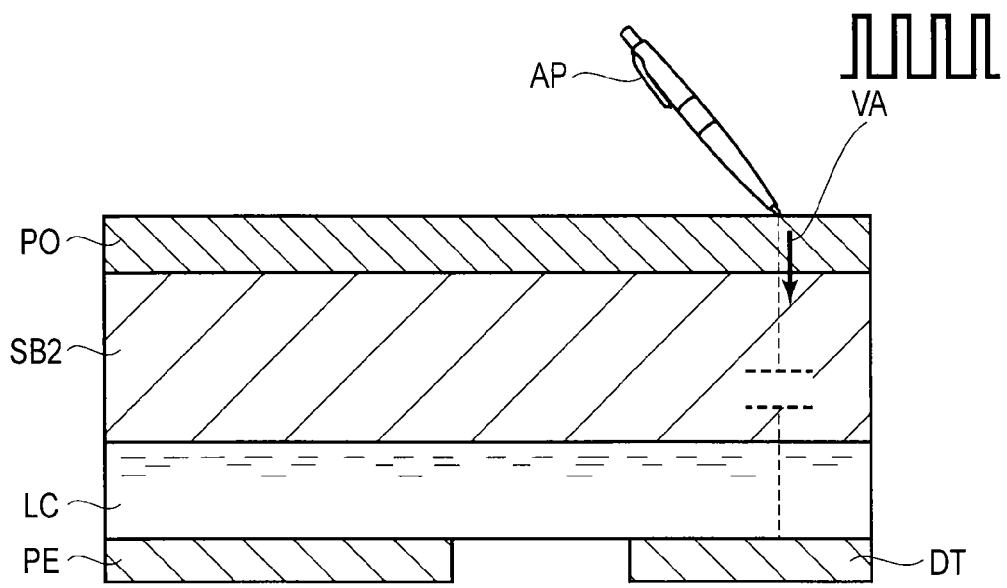
F I G. 28

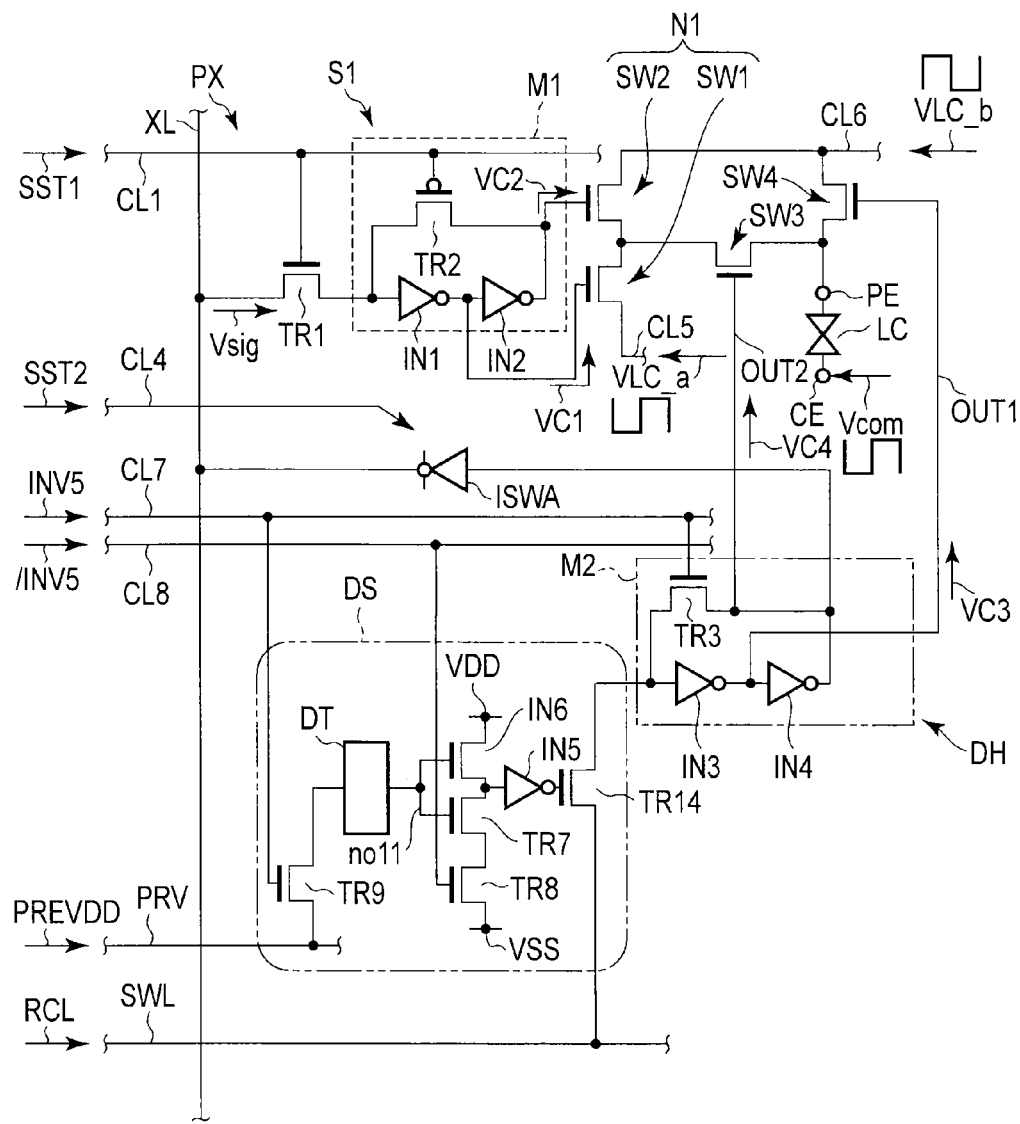
F I G. 31

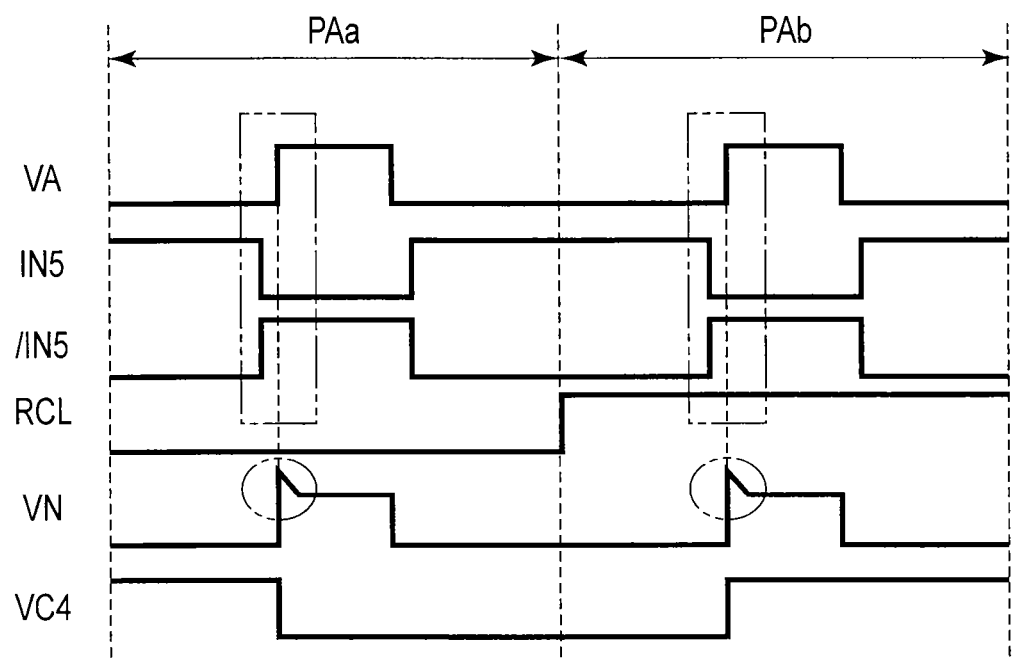
F I G. 32

DISPLAY APPARATUS AND METHOD OF DRIVING THE SAME

CROSS-REFERENCE TO RELATED APPLICATIONS

This application is based upon and claims the benefit of priority from prior Japanese Patent Applications No. 2011-068870, filed Mar. 25, 2011, No. 2011-068871, filed Mar. 25, 2011, and No. 2012-053465, filed Mar. 9, 2012, the entire contents all of which are incorporated herein by reference.

FIELD

Embodiments described herein relate generally to a display apparatus and a method of driving the same.

BACKGROUND

Display apparatuses such as a liquid crystal display apparatus and an organic EL display apparatus are characterized by being small in weight and thickness, and are therefore mounted on various electronic devices. An active matrix display apparatus is provided with a display unit comprising display pixels arranged in matrix form.

Reduced power consumption is demanded in devices equipped with the display apparatuses. As a small-sized liquid crystal display apparatus which is low in power consumption and high in image quality and which is easy to manufacture, there has heretofore been suggested a liquid crystal display apparatus equipped with a memory element for holding, as data, the state of a write voltage supplied to a pixel electrode from a signal line via a pixel switch.

In the meantime, for example, in a device such as a personal computer and a portable electronic device that is equipped with a display apparatus, information can be input by operating operational buttons, a keyboard, and a mouse to display characters and figures.

BRIEF DESCRIPTION OF THE DRAWINGS

FIG. 2 is a circuit diagram schematically showing a pixel of the display apparatus according to the first embodiment;

FIG. 3 is a diagram showing an equivalent circuit of the pixel according to the first embodiment;

FIG. 5 is a schematic diagram showing the configuration of a pixel in a display apparatus according to a second embodiment in which one photosensor control circuit is provided for every four pixels;

FIG. 6 is a circuit diagram showing a video display pixel circuit according to the second embodiment shown in FIG. 5;

FIG. 10 is a diagram showing an equivalent circuit of the pixel according to the third embodiment;

FIG. 11 is a timing chart showing various control signals and a counter voltage in a method of driving the display apparatus according to the third embodiment;

FIG. 13 is a diagram showing an equivalent circuit of a pixel in a display apparatus according to a fourth embodiment;

FIG. 17 is a diagram showing an equivalent circuit of a pixel in a display apparatus according to a seventh embodiment;

FIG. 19 is a flowchart showing an example of how to use the display apparatuses according to the third, fourth, fifth, sixth, and seventh embodiments;

FIG. 24 is a circuit diagram showing a video display pixel circuit in a display apparatus according to a ninth embodiment;

FIG. 25 is a circuit diagram showing a photosensor control circuit in the display apparatus according to the ninth embodiment;

FIG. 26 is a schematic circuit diagram showing a modification of the configuration of a pixel in the display apparatus according to the ninth embodiment in which one photosensor control circuit is provided for every six pixels;

FIG. 28 is a schematic sectional view showing the display apparatus and an AC pen according to the tenth embodiment and showing a pixel electrode, a detection electrode, a liquid crystal layer, a counter substrate and a polarizer of the display apparatus;

FIG. 31 is a diagram showing an equivalent circuit of a pixel in a display apparatus according to an eleventh embodiment;

FIG. 32 is a timing chart showing various control signals, an AC signal, an output signal, and a node potential in a method of driving the display apparatus according to the eleventh embodiment.

DETAILED DESCRIPTION

In general, according to one embodiment, there is provided a display apparatus comprising: a plurality of signal lines configured to be provided with display signals; and a plurality of pixels, each of the pixels comprising a pixel electrode and a pixel control switch, being connected to one of the signal lines, and being classified into any of a plurality of pixel groups, wherein each of the pixel groups comprises a memory, and a sensor circuit which is configured to detect input information and to provide data for a detection signal to the memory when detecting the input information. The pixel control switch is configured to switch the voltage level of the pixel electrode in accordance with data for the display signal input via the signal line and the data for the detection signal input from the memory.

According to another embodiment, there is provided a method of driving a display apparatus, the display apparatus comprising a plurality of signal lines configured to be provided with display signals, and a plurality of pixels, each of the pixels comprising a pixel electrode and a pixel control switch, being connected to one of the signal lines, and being classified into any of pixel groups, each of the pixel groups comprising a memory, and a sensor circuit which is configured to detect input information and to provide data for a detection signal to the memory when detecting the input information. The pixel control switch is configured to switch the voltage level of the pixel electrode in accordance with data for the display signal input via the signal line and the data for the detection signal input from the memory. The method comprises, in a period of writing the display signal, providing the display signal to the signal line, and switching the voltage level of the pixel electrode in accordance with the data for the display signal, and in a period of detecting the input information after the period of writing the display signal, storing the data for the detection signal in the memory when the input information is detected, and switching the voltage level of the pixel electrode in accordance with the data for the display signal input from the memory.

Hereinafter, a display apparatus and a method of driving the display apparatus according to a first embodiment will be described in detail with reference to the drawings. In this embediment, the display apparatus is a reflective liquid crystal display apparatus, and is adapted to a normally white mode.

Figure 1:
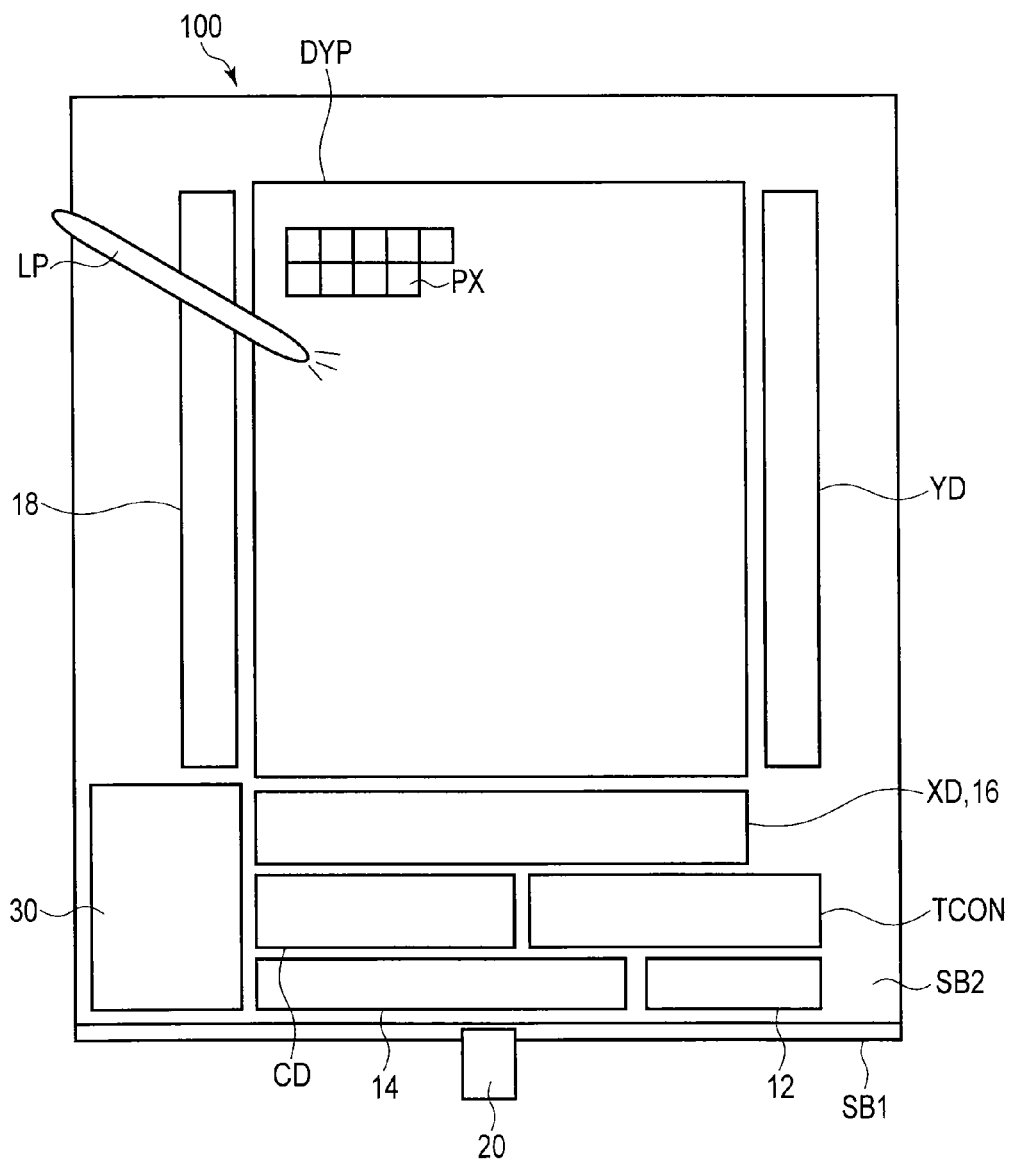
FIG. 1 is a plan view schematically showing a display apparatus according to a first embodiment.

As shown in FIG. 1, a display apparatus 100 according to the present embodiment comprises an array substrate SB1, a counter substrate SB2, and a display unit DYP which comprises pixels (display pixels) PX arranged in matrix form. The array substrate SB1 and counter substrate SB2 are a pair of transparent insulating substrates arranged opposite to each other. A liquid crystal layer LC (FIG. 2) is held between the array substrate SB1 and the counter substrate SB2.

In a region that surrounds the display unit DYP of the array substrate SB1, there are arranged a power supply 12, an I/F processing circuit 14, an X-driver XD, a Y-driver YD, a converter circuit 16, a memory operating circuit 18, a timing controller TCON, a COM driver CD, and an automatic photosensor timing adjustment circuit 30. A flexible substrate 20 is electrically connected to one end of the array substrate SB1. The display apparatus 100 receives external signals via the flexible substrate 20, and externally outputs signals. The memory operating circuit 18 controls the operation of a second memory M2 described later.

As shown in FIG. 1, FIG. 2, and FIG. 3, each of the pixels PX of the display unit DYP comprises, on the side of the array substrate SB1, a pixel electrode PE, a first memory M1, the second memory M2, a photosensor circuit SS as a sensor circuit, a display signal control circuit N1, and pixel control switches (SW11 and SW12).

The pixel electrode PE is located on a base layer (not shown) including an uneven surface, includes an uneven surface along the base layer, and is made of a light-reflecting conducting material. For example, the pixel electrode PE is made of aluminum. The pixel electrode PE includes an opening (not shown) facing a later-described photodiode PD.

This pixel electrode PE is provided so that light which has entered the display unit DYP of the array substrate SB1 through the liquid crystal layer LC from the side of the counter substrate SB2 is reflected by the pixel electrode PE toward the counter substrate SB2. One photodiode PD is provided in each of the pixels PX, which prevents the increase in the size of the opening of the pixel electrode PE. That is, the reduction of a light reflection area can be inhibited.

The reflective liquid crystal display apparatus requires no backlight unit, and is therefore small in size and weight and can reduce the power consumption. Moreover, in the reflective liquid crystal display apparatus, the pixel electrode PE can be formed on, for example, the first memory M1 or the second memory M2, so that the degree of freedom in designing is not restricted.

In the counter substrate SB2, the display unit DYP includes a counter electrode CE located to face the pixel electrodes PE. A counter voltage Vcom is supplied to the counter electrode CE from the COM driver CD at the array substrate SB1.

On the array substrate SB1, there are formed first transistors TR11 as first writing switches, signal lines XL arranged to extend along a column direction in which the pixels PX are arranged, first control wirings CL1, first inverters IN11, and second inverters IN12.

The signal lines XL are connected to the pixels PX. The signal lines XL are electrically connected on one end to the X-driver XD and the converter circuit 16. A video signal Vsig for video data or an optical write signal VL as a write signal for optical writing data is provided to the signal lines XL from the X-driver XD. The video signal Vsig is used as a first display signal. The optical write signal VL is used as a second display signal.

The first display signal is not exclusively the video signal Vsig, and may be an image signal (video signal) indicating characters and figures written in the past, or may be a signal corresponding to white display. In this embodiment, the optical write signal VL is a signal corresponding to white display.

Although described later, a voltage (signal) equivalent (corresponding) to a voltage (signal) applied to the pixel electrode PE is supplied to the converter circuit 16 via a later-described clocked inverter ISWA and the signal line XL. The first control wiring lines CL1 are electrically connected on one end to the Y-driver YD.

The first transistor TR11 is an N-type thin film transistor comprising a polysilicon layer as a semiconductor layer. The first transistor TR11 includes a gate electrode electrically connected to the first control wiring CL1, a source electrode electrically connected to the signal line XL, and a drain electrode electrically connected to the first memory M1. A control signal SST1 output from the Y-driver YD to control the operation of the first transistor TR11 is provided to the gate electrode of the first transistor TR11 via the first control wiring CL1. Thus, the first transistor TR11 provides the video signal Vsig to the first memory M1, and switches whether to write data for the video signal Vsig into the first memory M1.

The first memory M1 is a static random access memory (SRAM) as a static memory. The first memory M1 holds the data for the video signal Vsig. The first memory M1 comprises the first inverter IN11 and the second inverter IN12. The first inverter IN11 includes an input terminal, and an output terminal connected to the drain electrode of the first transistor TR11 and to the display signal control circuit N1.

The second inverter IN12 includes an input terminal connected to the output terminal of the first inverter IN11, and an output terminal connected to the input terminal of the first inverter IN11. The second inverter IN12 is connected to the first inverter IN11 in a circular form (loop form).

The voltage level of the video signal Vsig output to the display signal control circuit N1 by the first memory M1 is 0 V corresponding to white display or 5 V corresponding to black display.

On the array substrate SB1, there are formed second transistors TR12 as second writing switches, second control wirings CL2, third control wirings CL3, third inverters ISW11, fourth inverters ISW12, and third transistors TR13 as loop current control switches. The second control wirings CL2 are electrically connected on one end to the Y-driver YD. The third control wirings CL3 are electrically connected on one end to the memory operating circuit 18.

The second transistor TR12 is an N-type thin film transistor comprising a polysilicon layer as a semiconductor layer. The second transistor TR12 includes a gate electrode electrically connected to the second control wiring CL2, a source electrode electrically connected to the signal line XL, and a drain electrode electrically connected to the second memory M2. A control signal SST2 output from the Y-driver YD to control the operation of the second transistor TR12 is provided to the gate electrode of the second transistor TR12 via the second control wiring CL2. Thus, the second transistor TR12 provides the optical write signal VL to the second memory M2, and switches whether to write data for the optical write signal VL into the second memory M2.

In this embodiment, the signal line XL provided with the video signal Vsig and signal line XL provided with the optical write signal VL are shared. The first transistor TR11 and the second transistor TR12 are independently controlled.

The second memory M2 is an SRAM as a static memory. The second memory M2 holds the data for the optical write signal VL. The second memory M2 comprises the third inverter ISW11, the fourth inverter ISW12, and the third transistor TR13 that are connected in a loop form.

The third inverter ISW11 includes an input terminal connected to the drain electrode of the second transistor TR12 and the photosensor circuit SS, and an output terminal. The fourth inverter ISW12 includes an input terminal connected to the output terminal of the third inverter ISW11, and an output terminal connected to the display signal control circuit N1.

The third transistor TR13 is an N-type thin film transistor comprising a polysilicon layer as a semiconductor layer. The third transistor TR13 includes a gate electrode electrically connected to the third control wiring CL3, a source electrode electrically connected to the input terminal of the third inverter ISW11, and a drain electrode electrically connected to the output terminal of the fourth inverter ISW12.

A second memory control signal INV12 output from the memory operating circuit 18 to control the operation of the third transistor TR13 is provided to the gate electrode of the third transistor TR13 via the third control wiring CL3. The third transistor TR13 thereby controls a current that loops the third inverter ISW11 and the fourth inverter ISW12.

The voltage level of the optical write signal VL or a control signal RCL output to the display signal control circuit N1 by the second memory M2 is 0 V corresponding to white display or 5 V corresponding to black display. Here, the control signal RCL is used as a detection signal.

On the array substrate SB1, there are formed fifth inverters INV11 as latch circuits, NOR circuits NR1, and a first output switch SW11 and a second output switch SW12 of the pixel control switch.

The display signal control circuit N1 is connected between the first memory M1 and the second memory M2, and the pixel control switch. The display signal control circuit N1 performs a logical operation on the basis of the data for the video signal Vsig, and the data for the optical write signal VL or the control signal (light pen switch control signal) RCL, and outputs output signals VC1 and VC2 which are logical operation results.

More specifically, the display signal control circuit N1 includes the fifth inverter INV11 and the NOR circuit NR1. The fifth inverter INV11 includes an output terminal connected to the pixel control switch, and an input terminal. The output terminal of the fifth inverter INV11 is connected to the gate electrode of the P-type transistor of the first output switch SW11 and the gate electrode of the N-type transistor of the second output switch SW12.

The NOR circuit NR1 includes a first input terminal connected to the second memory M2, a second input terminal connected to the first memory M1, and an output terminal connected to the input terminal of the fifth inverter INV11 and the pixel control switch.

The first input terminal of the NOR circuit NR1 is connected to the output terminal of the fourth inverter ISW12. The second input terminal of the NOR circuit NR1 is connected to the output terminal of the first inverter IN11. The output terminal of the NOR circuit NR1 is connected to the gate electrode of the N-type transistor of the first output switch SW11 and the gate electrode of the P-type transistor of the second output switch SW12.

The voltage level of the output signal VC1 output to the pixel control switch by the NOR circuit NR1 is 0 V corresponding to black display or 5 V corresponding to white display. The voltage level of the output signal VC2 output to the pixel control switch by the fifth inverter INV11 is 0 V corresponding to black display or 5 V corresponding to white display.

On the array substrate SB1, there are formed fifth control wiring CL5 and sixth control wiring CL6. The fifth control wiring CL5 and the sixth control wiring CL6 each include one end electrically connected to the Y-driver YD.

The pixel control switch (SW11 and SW12) is connected between the display signal control circuit N1 (the first memory M1 and the second memory M2) and the pixel electrode PE. The pixel control switch (SW11 and SW12) switches the voltage levels of the control signals provided to the pixel electrode PE in accordance with the data for the output signals VC1 and VC2 input from the display signal control circuit N1 (the data for the video signal Vsig input from the first memory M1, or the data for the optical write signal VL or the control signal RCL input from the second memory M2).

More specifically, the source electrode of the N-type transistor and the source electrode of the P-type transistor of the first output switch SW11 are connected to the fifth control wiring CL5. The source electrode of the N-type transistor and the source electrode of the P-type transistor of the second output switch SW12 are connected to the sixth control wiring CL6.

The first output switch SW11 switches whether to provide the pixel electrode PE with a control signal VLC_a input from the Y-driver YD via the fifth control wiring CL5, in accordance with the output signal VC1 input from the NOR circuit NR1 and the output signal VC2 input from the fifth inverter INV11.

The second output switch SW12 switches whether to provide the pixel electrode PE with a control signal VLC_b input from the Y-driver YD via the sixth control wiring CL6, in accordance with the output signal VC1 input from the NOR circuit NR1 and the output signal VC2 input from the fifth inverter INV11.

The control signal VLC_a or the control signal VLC_b is provided to the pixel electrode PE. Here, the control signal VLC_a has a waveform in phase with that of the counter voltage Vcom and corresponds to white display, and the control signal VLC_b has a waveform in reverse phase to that of the counter voltage Vcom and corresponds to black display.

On the array substrate SB1, there are formed the photodiodes PD which are photosensors as sensors, fourth transistors TR14 as rewriting switches, fifth transistors TR15 as switches for controlling a leakage path, and control wirings SWL. The control wirings SWL are electrically connected on one end to the Y-driver YD.

The photosensor circuit SS is connected to the second memory M2. The photosensor circuit SS detects input information. The photosensor circuit SS provides the data for the control signal RCL to the second memory M2 when detecting input information. That is, the data in the second memory M2 can be rewritten to the data for the control signal RCL. More specifically, the photosensor circuit SS can rewrite the data in the second memory M2 to the data for the control signal RCL by detecting the illumination of incident light.

The photosensor circuit SS comprises the photodiode PD, the fourth transistor TR14, and the fifth transistor TR15.

The photodiode PD includes an anode, and a cathode connected to a high potential power supply VDD as a power supply. The photodiode PD generates a leakage current in accordance with the illumination of incident light.

The fourth transistor TR14 is an N-type thin film transistor comprising a polysilicon layer as a semiconductor layer. The fourth transistor TR14 includes a gate electrode electrically connected to the anode of the photodiode PD, a source electrode electrically connected to the control wiring SWL, and a drain electrode electrically connected to the input terminal of the third inverter ISW11. The fourth transistor TR14 switches whether to output the control signal RCL to the second memory M2.

The control signal RCL is also used as a third display signal or a fourth display signal.

When the data in the second memory M2 is rewritten to the data for the control signal RCL, the photosensor circuit SS rewrites the data in the second memory M2 to data for the third display signal. Alternatively, the photosensor circuit SS writes the fourth display signal at the same level as the optical write signal VL, erases the data for the third display signal rewritten in the second memory M2, and restores the data in the second memory M2 to the data for the optical write signal VL.

In response to the generation of the leakage current in the photodiode PD, a power supply voltage (high-level voltage) is provided to the gate electrode of the fourth transistor TR14 from the high potential power supply VDD. Accordingly, the fourth transistor TR14 is switched to a conducting state, and outputs the control signal RCL input from the control wiring SWL to the input terminal of the third inverter ISW11.

The fifth transistor TR15 is an N-type thin film transistor comprising a polysilicon layer as a semiconductor layer. The fifth transistor TR15 includes a gate electrode electrically connected to the third control wiring CL3, a source electrode electrically connected to a low potential power supply VSS (ground potential) as a power supply, and a drain electrode electrically connected to the anode of the photodiode PD. The fifth transistor TR15 switches whether to form a path for the leakage current generated in the photodiode PD. The fifth transistor TR15 is switched to a conducting state such that the fourth transistor TR14 can be switched to a nonconducting state.

On the array substrate SB1, there are formed the clocked inverters ISWA as output inverters, and fourth control wirings CL4. The fourth control wirings CL4 are electrically connected on one end to the Y-driver YD.

The clocked inverter ISWA includes an input terminal connected to the output terminal of the fourth inverter ISW12 of the second memory M2, and an output terminal connected to the signal line XL.

A control signal SST3 output from the Y-driver YD is input to the clocked inverter ISWA, and the operation of the clocked inverter ISWA is controlled. The clocked inverter ISWA can output the data in the second memory M2 to the signal line XL. The data in the second memory M2 output to the signal line XL is output to the outside of a panel via the X-driver XD and the converter circuit 16.

The pixel PX including the configuration described above can be roughly classified into a video display pixel circuit S1 and a photosensor control circuit PH as a sensor control circuit. The video display pixel circuit S1 includes the first transistor TR11, the first memory M1, the display signal control circuit N1, and the pixel control switch (SW11 and SW12). The photosensor control circuit PH includes the second transistor TR12, the second memory M2, and the photosensor circuit SS.

Now, the operation of the display apparatus 100 is described. The operation of the display apparatus 100 is controlled by the timing controller TCON. In the display apparatus 100 according to the present embodiment, characters and figures are written into the display unit DYP in accordance with positional information input by applying light to the display unit DYP with a light pen (pen-shaped light). When the power supply is activated, a signal (0 V) corresponding to white display is supplied to the signal line XL as an initial signal. The initial signal is different from the video signal Vsig and the optical write signal VL.

Figure 4:
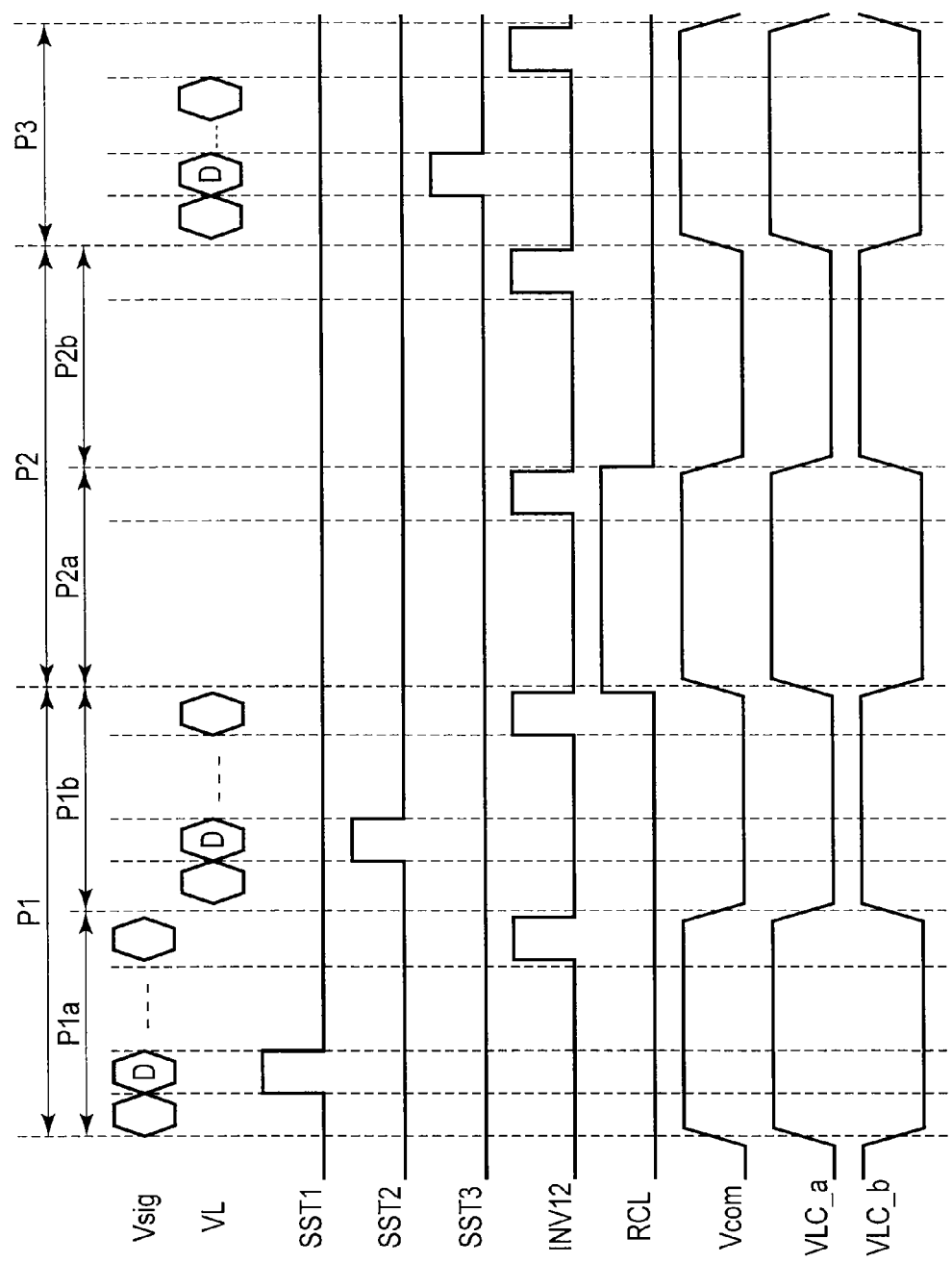
FIG. 4 is a timing chart showing a video signal, an optical write signal, various other signals, and a counter voltage in a method of driving the display apparatus according to the first embodiment.

As shown in FIG. 4, the operation of the display apparatus 100 is divided into a display signal writing operation in a display signal writing period P1, a control signal RCL rewriting operation in a control signal RCL rewriting period P2, and a reading operation in a reading period P3. The display signal writing operation is divided into a first display signal writing operation in a first display signal writing period P1a, and a second display signal writing operation in a second display signal writing period P1b.

The control signal RCL rewriting period P2 can be said to be an input information detecting period. The control signal RCL rewriting operation is divided into an optical writing operation (writing operation) in an optical writing period P2a (writing period), and an optical erasing operation (erasing operation) in an optical erasing period P2b (erasing period).

The series of operations (operation periods) described above are arranged and shown for convenience in FIG. 4, and are not exclusively repeated in the shown order. Although described later, a user switches to the optical writing operation or the optical erasing operation. Therefore, for example, the display apparatus 100 may operate without the optical erasing operation, and may operate to alternately repeat the optical writing operation and the optical erasing operation more than once.

As shown in FIG. 3 and FIG. 4, in writing with a light pen LP, the control signal RCL provided to the control wiring SWL in the optical writing period P2a is at a high level (5 V). When the high-level control signal RCL is provided to the control wiring line SWL, the high-level control signal RCL is provided to the source electrode of the fourth transistor TR14.

The voltage level of the counter voltage Vcom applied to the counter electrode CE alternately switches between a high-level voltage and a low-level voltage at given periods. The voltage levels of the control signals VLC_a and VLC_b alternately switch between a high-level voltage and a low-level voltage at given periods to correspond to the period at which the voltage level of the counter voltage Vcom is switched.

The control signal VLC_a and the control signal VLC_b are controlled to be at levels opposite to each other. That is, in a period in which the voltage level of the counter voltage Vcom is high, the voltage level of the control signal VLC_a is high, and the voltage level of the control signal VLC_b is low. In a period in which the voltage level of the counter voltage Vcom is low, the voltage level of the control signal VLC_b is high, and the voltage level of the control signal VLC_a is low. In the optical writing period P2a, the voltage level of the control signal SST3 provided to the clocked inverter ISWA is low.

In order to write with the light pen LP, first, the first transistor TR11 is switched to a conducting state by the control signal SST1, and the video signal Vsig at 0 V corresponding to white display is supplied to the first memory M1. In the meantime, the second transistor TR12 is switched to a conducting state by the control signal SST2, and the optical write signal VL at 0 V corresponding to white display is supplied to the second memory M2. The first transistor TR11 and the second transistor TR12 are switched to a nonconducting state (off) after signals are provided to the first memory M1 and the second memory M2 from the signal line XL.

If the voltage level of the second memory control signal INV12 provided to the third control wiring CL3 is switched to a high level, the fifth transistor TR15 is switched to a conducting state, and the gate electrode of the fourth transistor TR14 and the anode of the photodiode PD is connected to the low potential power supply VSS (ground potential).

Accordingly, the fourth transistor TR14 is switched to a nonconducting state (the source electrode and the drain electrode are insulated from each other), and the control signal RCL is not supplied to the second memory M2 from the control wiring SWL. At the same time, as the third transistor TR13 of the second memory M2 is switched to a conducting state, the second memory M2 is looped, and the data is held therein.

The voltage level of the second memory control signal INV12 is then switched to a low level. Thus, for example, when light is applied to the photodiode PD of the photosensor circuit SS from the light pen LP, a leakage current runs through the photodiode PD in accordance with the illumination of the light, a high-level voltage is provided to the gate electrode of the fourth transistor TR14 from the high potential power supply VDD, and the fourth transistor TR14 is switched to a conducting state, so that the high-level (5 V) control signal RCL is provided to the second memory M2 from the control wiring SWL.

At the same time, if the voltage level of the second memory control signal INV12 provided to the third control wiring line CL3 is switched to a low level, the third transistor TR13 is switched to a nonconducting state. Therefore, if the voltage level of the input terminal (gate electrode) side of the third inverter ISW11 is low (0 V) for white display, a high level (5 V) of the control signal RCL is easily written into the second memory M2, and the second memory M2 is rewritten to data for black display.

If the voltage level of the second memory control signal INV12 is then switched to a high level, the third transistor TR13 is switched to a conducting state, the second memory M2 is looped, and the data (5 V) is held therein.

When a signal (0 V) corresponding to white display is supplied to the signal line XL as an initial signal upon the application of power, the first and second input terminals of the NOR circuit NR1 of the display signal control circuit N1 are provided with a low-level (0 V) signal corresponding to white display from the first memory M1 (the output terminal of the first inverter IN11) and with a low-level (0 V) signal corresponding to white display from the second memory M2 (the output terminal of the fourth inverter ISW12). The NOR circuit NR1 outputs the high-level (5 V) output signal VC1 from the output terminal, and the fifth inverter INV11 outputs the low-level (0 V) output signal VC2 from the output terminal. The first output switch SW11 and the second output switch SW12 are thus controlled, so that the control signal VLC_a is selected, and the control signal VLC_a at a voltage level corresponding to white display is provided to the pixel electrode PE.

When the output signal of the second memory M2 (the fourth inverter ISW12) is rewritten to a high level (5 V) from a low level (0 V) by input with the light pen LP, a high-level signal is provided to the first input terminal of the NOR circuit NR1. Accordingly, the NOR circuit NR1 outputs the low-level (0 V) output signal VC1, and the fifth inverter INV11 outputs the high-level (5 V) output signal VC2. The first output switch SW11 and the second output switch SW12 are thus controlled, so that the control signal VLC_b is selected, and the control signal VLC_b at a voltage level (5 V) corresponding to black display is provided to the pixel electrode PE.

When the high-level (5 V) signal is provided to one of the first input terminal and the second input terminal of the NOR circuit NR1, the pixel control switches (SW11 and SW12) are controlled to switch to black display, and the control signal VLC_b is provided to the pixel electrode PE. If the data for the video signal Vsig in the first memory M1 is at a high level (5 V), the black display is set before writing with the light pen LP.

The display apparatus 100 can normally store data in pixel memories (the first memory M1 and the second memory M2), and therefore its frequency can be decreased to 1 Hz or less, for example. This enables lower power consumption in the display apparatus 100. The rewriting with the light pen LP can be controlled by the second memory control signal INV12 independently of the control signals VLC_a and VLC_b. The frequency of the second memory control signal INV12 is different from the frequencies of the control signals VLC_a and VLC_b, and can therefore be set to a frequency suitable for handwriting input. If the second memory control signal INV12 is adapted to the use of the light pen LP, the frequency of the second memory control signal INV12 has only to be increased during the use of the light pen LP, which enables both lower power consumption and handwriting input.

In order to erase the characters and figures written in the display unit DYP with the light pen LP, the low-level (0 V) control signal RCL is provided to the source electrode of the fourth transistor TR14 via the control wiring SWL in the optical erasing period P2b.

Here, the user can operate an interface such as a button mounted on the display apparatus 100 (provided in the display apparatus 100) to switch to writing or erasing in the display unit DYP. An external command signal corresponding to the user operation is provided to the timing controller TCON via the flexible substrate 20. The timing controller TCON switches the control signal RCL in accordance with the provided command signal.

The erasing is basically the same as the writing (black display) with the light pen LP, and the difference is whether the voltage level of the control signal RCL provided to the source electrode of the fourth transistor TR14 is the high level (5 V) for optical writing or the low level (0 V) for optical erasing.

When the second memory control signal INV12 is at a high level, the data held in the second memory M2 is in a state equal to that during the writing with the light pen (black display), and the fourth transistor TR14 is in a nonconducting state, so that data is not written into the second memory M2. Moreover, as the third transistor TR13 of the second memory M2 is in a conducting state, the second memory M2 is looped and is holding data.

Now, if the second memory control signal INV12 is at a low level, for example, light is applied to the photodiode PD of the photosensor circuit SS from the light pen LP. A leakage current runs through the photodiode PD in accordance with the illumination of the light, a high-level voltage is provided to the gate electrode of the fourth transistor TR14 from the high potential power supply VDD, and the fourth transistor TR14 is switched to a conducting state. The low-level control signal RCL is then provided to the second memory M2 from the control wiring SWL.

At the same time, the low-level second memory control signal INV12 is provided to the third control wiring line CL3, and the third transistor TR13 is switched to a nonconducting state. The low-level (0 V) control signal RCL is provided to the input terminal of the third inverter ISW11. Therefore, if the voltage level of the input terminal side of the third inverter ISW11 is high (5 V) for black display, the data in the second memory M2 is rewritten to data for white display. If the second memory control signal INV12 then reaches a high level, the third transistor TR13 is switched to a conducting state, the second memory M2 is looped, and the data is held therein.

A low-level (0 V) signal is then provided to the first input terminal of the NOR circuit NR1 from the fourth inverter ISW12 of the second memory M2. The first output switch SW11 and the second output switch SW12 of the pixel control switch are controlled by the output signals VC1 and VC2, and the control signal VLC_a corresponding to white display is provided to the pixel electrode PE.

When data for black display is held in the first memory M1, a high-level video signal Vsig is provided to the second input terminal of the NOR circuit NR1, and the control signal VLC_b corresponding to black display is provided to the pixel electrode PE by the output signals VC1 and VC2. Thus, even if the low-level signal is provided to the first input terminal of the NOR circuit NR1, the control signal VLC_a corresponding to white display is not provided to the pixel electrode PE.

As described above, the black display by the video signal Vsig is configured to be unerasable by, for example, the light pen LP. Thus, characters (data) written on images of cartoons or an electronic newspaper with the light pen LP can be erased without erasing the original image (the video signal Vsig).

In this way, the signal provided to the pixel electrode PE is switched to the control signal VLC_a corresponding to white display from the control signal VLC_b corresponding to black display. Therefore, the characters and figures written in the display unit DYP are erased by applying light to the written characters and figures from the light pen LP. This is enabled by changing the voltage level of the control signal RCL, thereby permitting the simplification of a pixel circuit.

Now, in order to output (read) the signal in the second memory M2 written/erased with the light pen LP, the voltage level of the second memory control signal INV12 is switched to a high level and the second memory M2 is looped to fix the data in the second memory M2.

Further, the high-level control signal SST3 is provided to the clocked inverter ISWA, and the signal stored in the second memory M2 is provided to the signal line XL via the clocked inverter ISWA and then provided to the converter circuit 16.

The Y-driver YD sequentially switches the voltage level of the control signal SST3 to a high level for each row of the pixels PX, and the signal stored in the second memory M2 is provided to the converter circuit 16 for each row of the pixels PX. The converter circuit 16 converts the signal input in parallel for each row of the pixels PX to a serial signal. The signal may be divided into bits and thus processed to enhance resolution. The serial signal converted by the converter circuit 16 is output to the exterior via the flexible substrate 20.

If the externally output signal is then stored in an unshown storage medium, the characters and figures written in the display unit DYP can be saved. If the externally output signal is supplied to, for example, a printer, the characters and figures written in the display unit DYP can be printed and output on paper.

Although the signal corresponding to white display is first supplied to the pixel electrode PE in writing with the light pen LP in the case described above, the signal first supplied to the pixel electrode PE may be a signal other than the signal corresponding to white display.

For example, when the signal output to the exterior via the flexible substrate 20 is stored in an external memory, the signal stored in the external memory may be provided to the X-driver XD via the flexible substrate 20 and the I/F processing circuit 14, and an initial screen may be formed by using video display data for cartoons or an electronic newspaper or optical writing data for the characters and figures written in the past.

As data is written into the first memory M1 and the second memory M2 in the pixel PX via the signal line XL, the video signal Vsig and the optical write signal VL are transferred at separate times. In order to first provide the video signal Vsig, the first transistor TR11 is switched to a conducting state by the control signal SST1, and the video signal Vsig at a voltage level (0 V) corresponding to white display for video display is provided to the first memory M1 from the signal line XL. The Y-driver YD sequentially switches the voltage level of the control signal SST1 to a high level for each row of the pixels PX, and transfers the data for the video signal Vsig to the first memory M1 for each row of the pixels PX. The first transistor TR11 is switched to a nonconducting state (off) after the video signal Vsig is provided to the first memory M1 from the signal line XL.

Further, in order to supply the data for the optical write signal VL, the second transistor TR12 is switched to a conducting state by the control signal SST2, and the optical write signal VL at a voltage level (0 V) corresponding to white display for optical writing is provided to the second memory M2 from the signal line XL. The Y-driver YD sequentially switches the voltage level of the control signal SST2 to a high level for each row of the pixels PX, and transfers the data for the optical write signal VL to the second memory M2 for each row of the pixels PX. The second transistor TR12 is switched to a nonconducting state (off) after the optical write signal VL is provided to the second memory M2 from the signal line XL.

For example, the data for the video signal Vsig is not provided to the pixels PX, and the data for the optically rewritten signal (optical write signal VL) is only provided to the second memory M2. This allows the optically rewritten data alone to be paged. As described above, the data for the video signal Vsig and the data for the optical write signal VL are independently managed, so that the user can erase part of the characters and figures optically written in the past, or can additionally write by overwriting.

According to the display apparatus having the above-described configuration and the method of driving the display apparatus in the first embodiment, a signal is written into the pixel electrode PE by applying light to the display unit DYP with the light pen LP, so that the signal line XL is only driven when a display screen is switched. Therefore, when a still image is displayed, the X-driver XD has only to drive the signal line XL at the initial screen writing, thereby allowing lower power consumption.

As the photodiode PD (the photosensor control circuit PH) is disposed in each of the pixels PX, input positional information can be precisely detected. The information detected by the photodiode PD can be processed within the pixels PX without even being transferred to an external IC, so that the processing speed can be enhanced. Further, it is possible to provide the display apparatus 100 which is high in the speed of processing the input positional information and which can be easily used by every user in every scene, and the method of driving the display apparatus.

Next, a display apparatus and a method of driving the display apparatus according to a second embodiment will be described. It is to be noted that the configuration according to this embodiment is the same in other respects as that according to the first embodiment described above and that like components are provided with like reference signs and are not described in detail.

As shown in FIG. 5, nowadays, higher definition is required for display apparatuses of, for example, electronic books and smartphones, and the simplification of the pixel circuit is also required in the present display apparatus 100 for higher definition. When the required input resolution of the optical write signal VL is not as high as that of the video signal Vsig, one photosensor control circuit PH may be configured to control four pixels PX (video display pixel circuits S1).

Accordingly, the resolution of a video (image) based on the optical write signal VL and the input with the light pen LP is reduced by half as compared to the first embodiment described above, but the resolution of a video based on the video signal Vsig can be increased.

The pixels PX are classified into any of the pixel groups. That is, the pixels PX constitute pixel groups comprising adjacent pixels PX. In this embodiment, a pixel group comprises four pixels PX. The (four) pixels PX of the pixel group are shared the photosensor control circuit PH.

The circuit configuration of the display apparatus 100 is described below.

Figure 7:
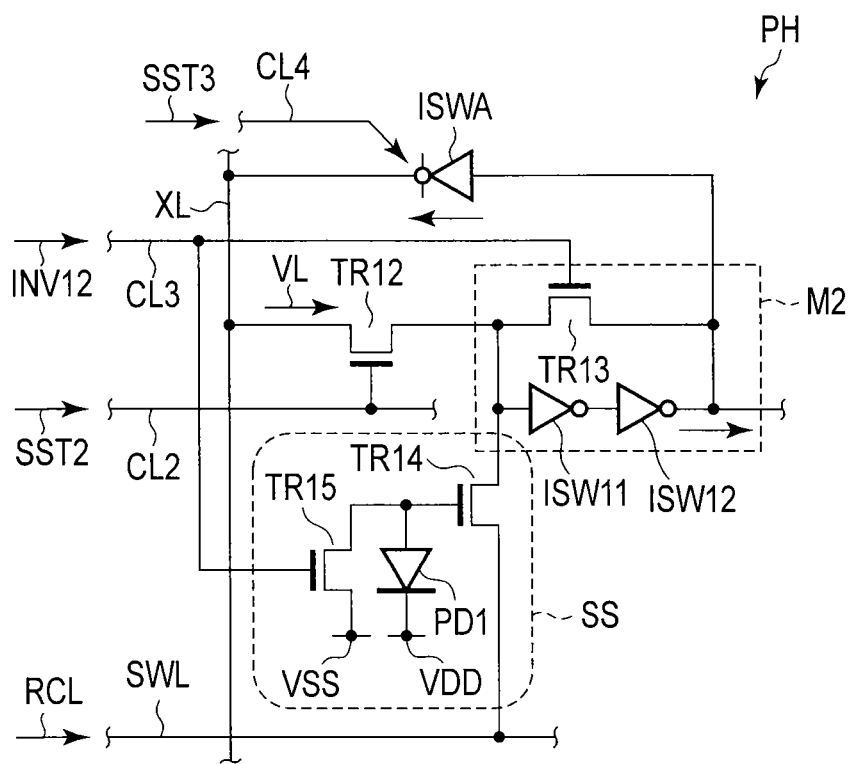
FIG. 7 is a circuit diagram showing a photosensor control circuit according to the second embodiment shown in FIG. 5.

As shown in FIG. 5, FIG. 6, and FIG. 7, the video display pixel circuit S1 includes a first transistor TR11, a first memory M1, a display signal control circuit N1, and pixel control switch (SW11 and SW12). The first memory M1 holds data for the video signal Vsig. The display signal control circuit N1 controls signals provided from the first memory M1 and the second memory M2 to output signals for controlling the pixel control switch (SW11 and SW12). The pixel control switch (SW11 and SW12) controls the voltage level of the pixel electrode PE.

The photosensor control circuit PH includes the second transistor TR12, the second memory M2, the photosensor circuit SS, and the clocked inverter ISWA. The second memory M2 holds the optical write signal VL or the control signal RCL. The photosensor circuit SS includes a photodiode PD, and controls the photodiode PD. The clocked inverter ISWA provides the data held in the second memory M2 to the exterior.

By way of example, each of the pixels PX of the pixel group includes one video display pixel circuit S1, and each pixel group includes one photosensor control circuit PH.

The video signal Vsig and the optical write signal VL are described below. The first transistor TR11 of the video display pixel circuit S1 is switched to a conducting state by the control signal SST1, and the video signal Vsig is provided to the first memory M1 of the video display pixel circuit S1 from the signal line XL. The Y-driver YD sequentially switches the voltage level of the control signal SST1 to a high level for each row of the display pixels PX, and transfers the data to the first memory M1 for each row of the pixels PX.

The second transistor TR12 of the photosensor control circuit PH is then switched to a conducting state by the control signal SST2, and the optical write signal VL is provided to the second memory M2 from the signal line XL. The Y-driver YD sequentially switches the voltage level of the control signal SST2 to a high level for each row of the display pixels PX, and transfers the data to the second memory M2 for each row of the pixels PX. The number of the signal lines XL provided with the optical write signal VL is half the number of the signal lines XL provided with the video signal Vsig.

When the optical write signal VL corresponding to black display is provided to the second memory M2 from the signal line XL or when the control signal RCL corresponding to black display is provided to the second memory M2 from the photosensor circuit SS by the application of light with the light pen LP, a high-level (5 V) signal corresponding to black display is provided to the first input terminals of the NOR circuits NR1 of four video display pixel circuits S1 from the fourth inverter ISW12 of one photosensor control circuit PH. In this case, the output signal VC1 of the NOR circuit NR1 and the output signal VC2 of the fifth inverter INV11 are at a voltage level (0 V) corresponding to black display irrespective of the voltage level of the video signal Vsig provided to the second input terminal of the NOR circuit NR1 from the video display pixel circuit S1. The pixel control switch (SW11 and SW12) are then controlled, and the control signal VLC_b corresponding to black display is provided to the pixel electrode PE.

When the optical write signal VL corresponding to white display is provided to the second memory M2 from the signal line XL or when the control signal RCL corresponding to white display is provided to the second memory M2 from the photosensor circuit SS by the application of light with the light pen LP, a low-level (0 V) signal corresponding to white display is provided to the first input terminals of the NOR circuits NR1 of the four video display pixel circuits S1 from the fourth inverter ISW12 of one photosensor control circuit PH.

In this case, the output signal VC1 of the NOR circuit NR1 and the output signal VC2 of the fifth inverter INV11 is set at a voltage level (0 V) for black display or a voltage level (5 V) for white display in accordance with the voltage level of the video signal Vsig provided to the second input terminal of the NOR circuit NR1 from each video display pixel circuit S1.

The pixel control switch (SW11 and SW12) are then controlled, and the control signal VLC_a corresponding to white display or the control signal VLC_b corresponding to black display is provided to the pixel electrode PE.

The configuration described above simplifies the photosensor control circuit PH and enables the video signal Vsig to be adapted to higher-definition videos (images).

The display apparatus 100 independently manages the data in the second memory M2 and the data in the first memory M1 input to, for example, the external memory with the light pen LP. Therefore, when the data is viewed, for example, by the unshown external display apparatus (PC), it is necessary to generate data composed of the data (video display data) in the first memory M1 and the data (optical writing data) in the second memory M2.

According to the display apparatus having the above-described configuration and method of driving the display apparatus according to the second embodiment, it is possible to provide the display apparatus 100 which is high in the speed of processing input positional information and which can be easily used by every user in every scene, and the method of driving the display apparatus.

The first and second embodiments described above are illustrative only and are not intended to limit the scope of the invention. Modifications can be made to the components according to the first and second embodiments described above without departing from the spirit thereof. Further, various inventions can be made by properly combining the components disclosed in the embodiments described above. For example, some of all the components shown in the embodiments may be eliminated. Moreover, components in different embodiments may be suitably combined together.

For example, the display apparatus 100 is not exclusively the reflective liquid crystal display apparatus that requires no backlight unit, and may be a transmissive liquid crystal display apparatus. The sensor provided in the photosensor control circuit PH has only to be one photodiode PD and requires no other sensors, thereby contributing to the improvement of the opening ratio of the pixel.

The display apparatus 100 is not exclusively the liquid crystal display apparatus adapted to the normally white mode, and may be a liquid crystal display apparatus adapted to a normally black mode.

Furthermore, the display apparatus 100 is not exclusively the liquid crystal display apparatus, and is applicable to various display apparatuses such as an organic EL display apparatus. In this case, advantageous effects similar to those in the embodiments described above are obtained.

For example, the organic EL display apparatus is configured so that the initial screen shows black display in the entire display unit DYP and shows, for example, white display in parts of the pixels PX that are irradiated by the light pen LP. In this case, a voltage is applied so that red, blue, and green organic EL elements emit light via photosensor circuits when irradiated by the light pen LP. In the case of the organic EL display apparatus, a common electrode facing the pixel electrode does not need to be driven by an alternating current.

The first memory M1 and the second memory M2 are not exclusively storage elements (e.g., one-bit SRAM). If the number of memories is increased, tone display is possible in addition to white display and black display. If the first memory M1 and the second memory M2 comprise dynamic random access memories (DRAM), multi-tone display is possible.

Means for inputting to the display apparatus is not exclusively the light pen LP, and has only to be anything that emits light.

The sensor provided in the photosensor control circuit PH is not exclusively the photodiode, and may be any sensor that can substitute for the photodiode.

Each pixel group may include two pixels PX, three pixels PX, or five or more pixels PX.

Next, matters associated with the first and second embodiments described above and modifications thereof are shown in (1) to (16):

(1) A display apparatus comprising:
signal lines to be provided with at least one of a first display signal and a second display signal; and
pixels connected to the signal lines,
wherein each of the pixels comprises a pixel electrode,
a first memory which holds data for the first display signal,
a first writing switch which is connected between the signal line provided with the first display signal and the first memory and switches whether to write the data for the first display signal into the first memory,
a second memory which holds data for the second display signal,
a second writing switch which is connected between the signal line provided with the second display signal and the second memory and switches whether to write the data for the second display signal into the second memory,
a sensor circuit which is connected to the second memory and rewrites the data in the second memory to data for a detection signal by detecting an input information, and
a pixel control switch which is connected between the first and second memories and the pixel electrode, and switches the level of a voltage applied to the pixel electrode in accordance with the data for the first display signal input from the first memory and the data for the second display signal or the detection signal input from the second memory.

(2) The display apparatus according to (1), further comprising:
a display signal control circuit which is connected between the first and second memories and the pixel control switch, performs a logical operation on the basis of the data for the first display signal, and the data for the second display signal or the detection signal, and outputs an output signal that is a logical operation result,
wherein the pixel control switch switches the level of the voltage applied to the pixel electrode in accordance with data for the output signal input from the display signal control circuit.

(3) The display apparatus according to (1) or (2), wherein the sensor circuit is a photosensor circuit, and is configured to rewrite the data in the second memory to the data for the detection signal by detecting the illumination of incident light.

(4) The display apparatus according to any one of (1) to (3), wherein when rewriting the data in the second memory to the data for the detection signal, the sensor circuit rewrites the data in the second memory to data for a third display signal, or
writes a fourth display signal at the same level as the second display signal, erases the data for the third display signal rewritten in the second memory, and restores the data in the second memory to the data for the second display signal.

(5) The display apparatus according to any one of (1) to (4), wherein the first display signal is a video signal,
the second display signal is a write signal,
the signal line provided with the first display signal and the signal line provided with the second display signal are shared, and
the first writing switch and the second writing switch are independently controlled.

(6) The display apparatus according to any one of (1) to (4), wherein the first memory comprises a first inverter including an output terminal connected to the first writing switch and the pixel control switch, and a second inverter circularly connected to the first inverter.

(7) The display apparatus according to any one of (1) to (5), wherein the second memory comprises a first inverter including an input terminal connected to the second writing switch and the sensor circuit, a second inverter including an input terminal connected to an output terminal of the first inverter and an output terminal connected to the pixel control switch, and a loop current control switch which is connected between the input terminal of the first inverter and the output terminal of the second inverter, and controls a current that loops the first inverter and the second inverter.

(8) The display apparatus according to any one of (1) to (4), wherein the sensor circuit comprises a photosensor which generates a leakage current in accordance with the illumination of incident light, a rewriting switch which is connected to the photosensor and switches whether to output the detection signal to the second memory, and a leakage path control switch which is connected to the photosensor and switches whether to form a path for the leakage current generated in the photosensor.

(9) The display apparatus according to (2), wherein the display signal control circuit comprises an inverter including an output terminal connected to the pixel control switch, and a NOR circuit including a first input terminal connected to the second memory, a second input terminal connected to the first memory, and an output terminal connected to a input terminal of the inverter and the pixel control switch.

(10) The display apparatus according to any one of (1) to (4), further comprising:

an output inverter which includes an input terminal connected to the second memory and an output terminal connected to the signal line provided with the second display signal, and is configured to output the data in the second memory to the signal line.

(11) The display apparatus according to (1), wherein the pixels constitute pixel groups comprising adjacent pixels, and the pixels of the pixel group share the second memory, the second writing switch, and the sensor circuit which switches.

(12) The display apparatus according to (10), further comprising:

an X-driver which is connected to the signal lines and switches between the first signal and the second signal and then provides the same to the signal lines;

a Y-driver which drives the first writing switch, the second memory, the second writing switch, the sensor circuit, and the output inverter;

a memory operating circuit which controls the operation of the second memory;

a converter circuit which is connected to the signal lines and converts signals supplied in parallel from the signal lines to serial signals and then outputs the serial signals; and a controller which controls the operations of the X-driver, the Y-driver, and the converter circuit.

(13) A method of driving a display apparatus, the display apparatus comprising signal lines to be provided with at least one of a first display signal and a second display signal, and pixels connected to the signal lines, each of the pixels comprising a pixel electrode, a first memory which holds data for the first display signal, a first writing switch which is connected between the signal line provided with the first display signal and the first memory and switches whether to write the data for the first display signal into the first memory, a second memory which holds data for the second display signal, a second writing switch which is connected between the signal line provided with the second display signal and the second memory and switches whether to write the data for the second display signal into the second memory, a sensor circuit which is connected to the second memory and rewrites the data in the second memory to data for a detection signal by detecting an input information, and a pixel control switch which is connected between the first and second memories and the pixel electrode, and switches the level of a voltage applied to the pixel electrode in accordance with the data for the first display signal input from the first memory and the data for the second display signal or the detection signal input from the second memory, the method comprising:

in a period of writing the first display signal, providing the first display signal to the signal line provided with the first display signal; and switching the first writing switch to a conducting state, writing the data for the first display signal into the first memory, and switching the level of the voltage applied to the pixel electrode in accordance with the data for the first display signal input from the first memory.

(14) The method of driving the display apparatus according to (13), the display apparatus further comprising a display signal control circuit, the display signal control circuit comprising an inverter including an output terminal connected to the pixel control switch, and a NOR circuit including a first input terminal connected to the second memory, a second input terminal connected to the first memory, and an output terminal connected to the input terminal of the inverter and the pixel control switch, the method comprising:

in a period of writing the second display signal, providing the second display signal to the signal line provided with the second display signal, and switching the second writing switch to a conducting state, writing the data for the second display signal into the second memory, and switching the level of the voltage applied to the pixel electrode in accordance with the data for the second display signal input from the second memory; and in a period of rewriting the detection signal after the period of writing the first display signal and the period of writing the second display signal, rewriting the data in the second memory to the data for the detection signal by detecting the input information, wherein in the period of rewriting the detection signal, the NOR circuit and the inverter output the output signal corresponding to black display to the pixel control switch when the first display signal provided to the display signal control circuit and one of the second display signal and the detection signal are black display signals.

(15) The display apparatus driving method according to (14), wherein in the period of rewriting the detection signal, the data in the second memory is rewritten to data for the detection signal corresponding to a white display when the first display signal is the white display signal, the second display signal is the black display signal, and the detection signal is the white display signal, and the NOR circuit and the inverter output the output signal corresponding to the white display to the pixel control switch.

(16) A method of driving a display apparatus, the display apparatus comprising signal lines to be provided with at least one of a first display signal and a second display signal, and pixels connected to the signal lines, each of the pixels comprising a pixel electrode, a first memory which holds data for the first display signal, a first writing switch which is connected between the signal line provided with the first display signal and the first memory and switches whether to write the data for the first display signal into the first memory, a second memory which holds data for the second display signal, a second writing switch which is connected between the signal line provided with the second display signal and the second memory and switches whether to write the data for the second display signal into the second memory, a sensor circuit which is connected to the second memory and rewrites the data in the second memory to data for a detection signal by detecting an input information, and a pixel control switch which is connected between the first and second memories and the pixel electrode, and switches the level of a voltage applied to the pixel electrode in accordance with the data for the first display signal input from the first memory and the data for the second display signal or the detection signal input from the second memory, the method comprising:

in a period of writing the second display signal, providing the second display signal to the signal line provided with the second display signal, and switching the second writing switch to a conducting state, writing the data for the second display signal into the second memory, and switching the level of the voltage applied to the pixel electrode in accordance with the data for the second display signal input from the second memory; and in a period of rewriting the detection signal after the period of writing the second display signal, rewriting the data in the second memory to the data for the detection signal by detecting the input information, wherein when the data in the second memory is rewritten to the data for the detection signal, the level of the voltage applied to the pixel electrode is switched in accordance with the data for the detection signal input from the second memory.

Hereinafter, a display apparatus and a display apparatus driving method according to a third embodiment will be described in detail with reference to the drawings. In this embodiment, the display apparatus is a reflective liquid crystal display apparatus, and is adapted to a normally white mode.

Figure 8:
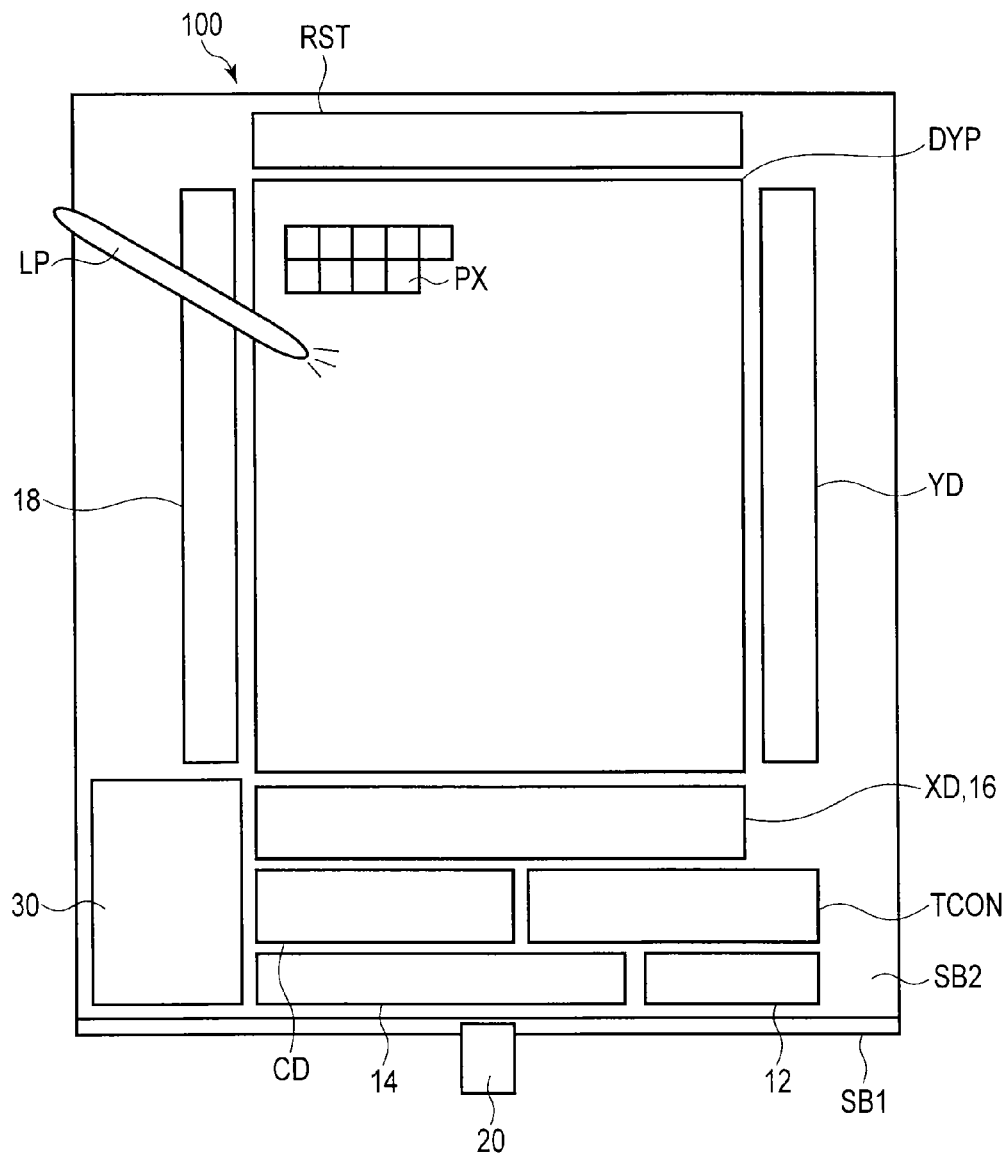
FIG. 8 is a plan view schematically showing a display apparatus according to a third embodiment.

As shown in FIG. 8, a display apparatus 100 according to the present embodiment further comprises a reset circuit RST disposed in a region that surrounds a display unit DYP of an array substrate SB1, in contrast to FIG. 1. A memory operating circuit 18 controls the operation of a first memory M1 described later. In other respects, the illustration in FIG. 8 is the same as the illustration in FIG. 1 and is not explained.

Figure 9:
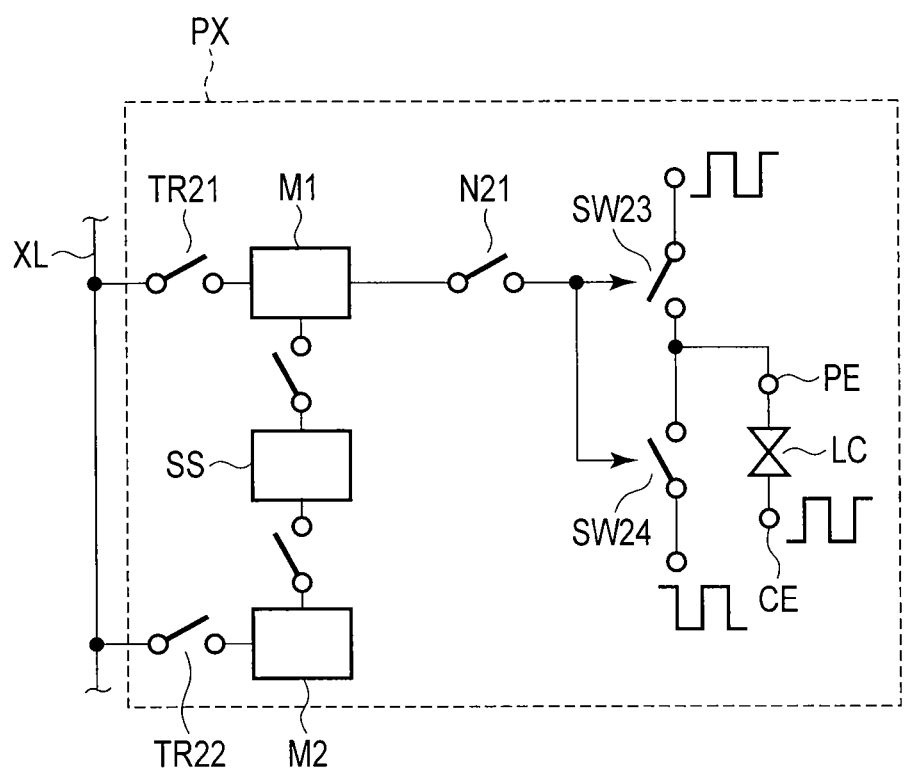
FIG. 9 is a circuit diagram schematically showing a pixel of the display apparatus according to the third embodiment.

As shown in FIG. 8, FIG. 9, and FIG. 10, each of pixels PX of the display unit DYP comprises, on the side of the array substrate SB1, a pixel electrode PE, the first memory M1, a second memory M2, a photosensor circuit SS as a sensor circuit, a signal control switch N21, and pixel control switch (SW23 and SW24).

The pixel electrode PE includes an opening (not shown) facing a first photodiode PD1 and a second photodiode PD2 that will be described later. In other respects, the pixel electrode PE has the same configuration as that in the first embodiment described above.

The use of such a reflective liquid crystal display apparatus (pixel electrode PE) makes it possible to provide advantageous effects similar to those in the first embodiment described above.

A counter substrate SB2 has the same configuration as that in the first embodiment described above.

On the array substrate SB1, there are formed first writing switches TR21, signal lines XL arranged to extend along a column direction in which the pixels PX are arranged, first control wirings CL1, third control wirings CL3, fourth control wirings CL4, first inverters ISW21, and second inverters ISW22.

The signal lines XL are connected to the pixels PX. The signal lines XL are electrically connected on one end to an X-driver XD and a converter circuit 16. A first display signal V1 is provided to the signal lines XL from the X-driver XD. The first display signal V1 provided from the X-driver XD may be a video signal Vsig for video data.

The first display signal V1 provided from the X-driver XD is not exclusively the above-mentioned signal. Various signals can be used, such as an image signal (video signal) indicating characters and figures written in the past.

The signal lines XL are electrically connected on the other end to the reset circuit RST. The first display signal V1 is provided to the signal lines XL from the reset circuit RST. The first display signal V1 provided from the reset circuit RST may be an initial signal Vini which is a signal corresponding to white display. The first display signal V1 output by the X-driver XD or the reset circuit RST is used as a display signal.

A voltage (signal) equivalent (corresponding) to a voltage (signal) applied to the pixel electrode PE is supplied to the converter circuit 16 from the first memory M1 via a later-described output inverter ISWA2 and the signal line XL. The first control wirings CL1 are electrically connected on one end to a Y-driver YD.

The first writing switch TR21 is an N-type thin film transistor comprising a polysilicon layer as a semiconductor layer. The first writing switch TR21 includes a gate electrode electrically connected to the first control wiring CL1, a source electrode electrically connected to the signal line XL, and a drain electrode electrically connected to the first memory M1. A control signal SST1 output from Y-driver YD to control the operation of the first writing switch TR21 is provided to the gate electrode of the first writing switch TR21 via the first control wiring CL1. Thus, the first writing switch TR21 switches whether to provide data for the first display signal V1 to the first memory M1.

The first memory M1 is a static random access memory (SRAM) as a static memory. The data in the first memory M1 is rewritten to the provided first display signal V1 or a later-described second display signal V2, and the first memory M1 holds data. The first memory M1 comprises the first inverter ISW21 and the second inverter ISW22.

The first inverter ISW21 includes an input terminal connected to the drain electrode of the first writing switch TR21 and the photosensor circuit SS, and an output terminal connected to the signal control switch N21.

The second inverter ISW22 includes an input terminal connected to the signal control switch N21, and an output terminal connected to the drain electrode of the first writing switch TR21 and the photosensor circuit SS. The second inverter ISW22 is a clocked inverter connected to the first inverter ISW21 in a circular form (loop form).

The first memory M1 outputs an output signal VC1 and an output signal VC2 to the signal control switch N21. The output signal VC1 is the first display signal V1 at 0 V corresponding to white display or 5 V corresponding to black display, or is the second display signal V2 at 5 V corresponding to black display. The waveform of the output signal VC2 is a reversed-phase waveform of the output signal VC1. Here, the voltage level of the output signal VC2 is 5 V in a period in which the voltage level of the output signal VC1 is 0 V, and the voltage level of the output signal VC2 is 0 V in a period in which the voltage level of the output signal VC1 is 5 V.

The third control wiring CL3 and the fourth control wiring CL4 are electrically connected on one end to the memory operating circuit 18. The third control wiring CL3 and the fourth control wiring CL4 are connected to the second inverter ISW22. A first control signal INV2 and a second control signal /INV2 are provided to the second inverter ISW22 from the memory operating circuit 18 via the third control wiring CL3 and the fourth control wiring CL4. The waveform of the second control signal /INV2 is a reversed-phase waveform of the first control signal INV2. Thus, the first inverter ISW21 and the second inverter ISW22 are driven under the control of the first control signal INV2 and the second control signal /INV2.

On the array substrate SB1, there are formed second writing switch TR22, second control wirings CL2, third inverters IN21, and fourth inverters IN22. The second control wirings CL2 are electrically connected on one end to the Y-driver YD.

The second writing switch TR22 is an N-type thin film transistor comprising a polysilicon layer as a semiconductor layer. The second writing switch TR22 includes a gate electrode electrically connected to the second control wiring CL2, a source electrode electrically connected to the signal line XL, and a drain electrode electrically connected to the second memory M2. A control signal SST2 output from the Y-driver YD to control the operation of the second writing switch TR22 is provided to the gate electrode of the second writing switch TR22 via the second control wiring CL2. Thus, the second transistor TR22 switches whether to provide the first display signal V1 to the second memory M2.

In this embodiment, the first writing switch TR21 and the second writing switch TR22 are independently controlled by the control signals SST1 and SST2, but may be controlled together.

The second memory M2 is an SRAM as a static memory. The second memory M2 holds the data for the first display signal V1 provided thereto. The second memory M2 comprises the third inverter IN21 and the fourth inverter IN22.

The third inverter IN21 includes an input terminal connected to the drain electrode of the second writing switch TR22 and the photosensor circuit SS, and an output terminal. The fourth inverter IN22 includes an input terminal connected to the output terminal of the third inverter IN21, and an output terminal connected to the input terminal of the third inverter IN21, the drain electrode of the second writing switch TR22, and the photosensor circuit SS. The fourth inverter IN22 is connected to the third inverter IN21 in a loop form.

The second memory M2 outputs, to the photosensor circuit SS, the first display signal V1 at 0 V corresponding to white display or 5 V corresponding to black display.

On the array substrate SB1, there are formed signal control switches N21, the first output switch SW23 and the second output switch SW24 of pixel control switch, fifth control wirings CL5, and sixth control wirings CL6. The fifth control wiring CL5 and the sixth control wiring CL6 each have one end electrically connected to the Y-driver YD.

The signal control switch N21 is connected between the first memory M1 and the pixel control switch, and switches whether to provide the pixel control switch with the first display signal V1 or the second display signal V2 output from the first memory M1.

More specifically, the signal control switch N21 includes a first switch SW21 and a second switch SW22.

The first switch SW21 comprises an N-type thin film transistor, and includes a source electrode connected to the output terminal of the second inverter ISW212, a drain electrode connected to the second output switch SW24, and a gate electrode connected to the third control wiring CL3 and the fourth control wiring CL4. The first switch SW21 switches whether to provide the output signal VC1 to the second output switch SW24.

The second switch SW22 comprises an N-type thin film transistor, and includes a source electrode connected to the output terminal of the first inverter ISW21, a drain electrode connected to the first output switch SW23, and a gate electrode connected to the third control wiring CL3 and the fourth control wiring CL4. The second switch SW22 switches whether to provide the output signal VC2 to the first output switch SW23.

The first control signal INV2 and the second control signal /INV2 are provided to the first switch SW21 and the second switch SW22 from the memory operating circuit 18 via the third control wiring CL3 and the fourth control wiring CL4. Thus, the first switch SW21 and the second switch SW22 are driven under the control of the first control signal INV2 and the second control signal /INV2.

As described above, the signal control switch N21 and the second inverter ISW22 are driven under the control of the same control signals (the first control signal INV2 and the second control signal /INV2).

The pixel control switch is connected between the signal control switch N21 (first memory M1) and the pixel electrode PE. The pixel control switch switches the voltage level of the control signal provided to the pixel electrode PE in accordance with the data for the first display signal V1 or data for the second display signal V2 input from the signal control switch N21 (first memory M1).

More specifically, the first output switch SW23 comprises an N-type thin film transistor, and includes a source electrode connected to the fifth control wiring CL5, a drain electrode connected to the pixel electrode PE, and a gate electrode connected to the drain electrode of the second switch SW22.

The first output switch SW23 switches whether to provide the pixel electrode PE with a control signal VLC_a input from the Y-driver YD via the fifth control wiring CL5, in accordance with the output signal VC2 input from the first memory M1 via the second switch SW22.

The second output switch SW24 comprises an N-type thin film transistor, and includes a source electrode connected to the sixth control wiring CL6, a drain electrode connected to the pixel electrode PE, and a gate electrode connected to the drain electrode of the first switch SW21.

The second output switch SW24 switches whether to provide the pixel electrode PE with a control signal VLC_b input from the Y-driver YD via the sixth control wiring CL6, in accordance with the output signal VC1 input from the first memory M1 via the first switch SW21.

The control signal VLC_a or the control signal VLC_b is provided to the pixel electrode PE. Here, the control signal VLC_a has a waveform in phase with that of the counter voltage Vcom and corresponds to white display, and the control signal VLC_b has a waveform in reverse phase to that of the counter voltage Vcom and corresponds to black display.

On the array substrate SB1, there are formed the first photodiode PD1 and the second photodiode PD2 which are photosensors as sensors, first output control switches TRA1, second output control switches TRA2, third output control switches TRA3, and control wirings SWL. The control wirings SWL are electrically connected on one end to the Y-driver YD.

The photosensor circuit SS is connected to the first memory M1. In this embodiment, the photosensor circuit SS is also connected to the second memory M2.

The photosensor circuit SS detects input information. The photosensor circuit SS can provide the data for the second display signal V2 or the data for the first display signal V1 to the first memory M1 when detecting input information. More specifically, the photosensor circuit SS detects the illumination of incident light and can thereby provide the data for the second display signal V2 or the data for the first display signal V1 to the first memory M1.

The photosensor circuit SS comprises the first photodiode PD1, the second photodiode PD2, the first output control switch TRA1, the second output control switch TRA2, and the third output control switch TRA3.

The first photodiode PD1 includes an anode connected to the first output control switch TRA1, and a cathode connected to the input terminal of the first inverter ISW21 (first memory M1). The second photodiode PD2 includes a cathode connected to the second output control switch TRA2, and an anode connected to the third output control switch TRA3. The first photodiode PD1 and the second photodiode PD2 generate a leakage current in accordance with the illumination of incident light.

The first output control switch TRA1 is an N-type thin film transistor comprising a polysilicon layer as a semiconductor layer. The first output control switch TRA1 includes a source electrode connected to the output terminal of the fourth inverter IN22 (second memory M2), a drain electrode connected to the anode of the first photodiode PD1, and a gate electrode connected to the control wiring SWL. The first output control switch TRA1 switches whether to provide the anode of the first photodiode PD1 with the data for the first display signal V1 held in the second memory M2, in accordance with the control signal RCL provided via the control wiring SWL.

The second output control switch TRA2 is a P-type thin film transistor comprising a polysilicon layer as a semiconductor layer. The second output control switch TRA2 includes a source electrode connected to a high potential power supply VDD as a power supply, a drain electrode connected to the cathode of the second photodiode PD2, and a gate electrode connected to the control wiring SWL. The second output control switch TRA2 switches whether to provide the cathode of the second photodiode PD2 with a 5 V power supply voltage provided from the high potential power supply VDD, that is, the second display signal V2, in accordance with the control signal RCL provided via the control wiring SWL. Here, the second display signal V2 is used as a detection signal.

The third output control switch TRA3 is a P-type thin film transistor comprising a polysilicon layer as a semiconductor layer. The third output control switch TRA3 includes a source electrode connected to the anode of the second photodiode PD2, a drain electrode connected to the input terminal of the first inverter ISW21 (first memory M1), and a gate electrode connected to the control wiring SWL. The third output control switch TRA3 switches whether to conduct the anode of the second photodiode PD2 and the input terminal of the first inverter ISW21 in accordance with the control signal RCL provided via the control wiring SWL.

The first output control switch TRA1, and the second and third output control switches TRA2 and TRA3 are turned to a conducting state in different periods.

When the low-level (0 V) control signal RCL is provided to the control wiring SWL, the first output control switch TRA1 is switched to a nonconducting state, and the second output control switch TRA2 and the third output control switch TRA3 are switched to a conducting state.

At the same time, the second photodiode PD2 generates a leakage current, so that the second display signal (detection signal) V2 is provided to the first memory M1 via the second output control switch TRA2, the second photodiode PD2, and the third output control switch TRA3. As a result, the data in the first memory M1 is rewritten to the data for the second display signal V2.

When the high-level (5 V) control signal RCL is provided to the control wiring SWL, the first output control switch TRA1 is switched to a conducting state, and the second output control switch TRA2 and the third output control switch TRA3 are switched to a nonconducting state.

At the same time, the first photodiode PD1 generates a leakage current, so that the first display signal V1 is provided to the first memory M1 from the second memory M2 via the first output control switch TRA1 and the first photodiode PD1. As a result, the data in the first memory M1 is rewritten to the data for the first display signal V1. For example, the data for the second display signal V2 rewritten in the first memory M1 is erased, and the data in the first memory M1 can be restored to the data for the first display signal V1.

On the array substrate SB1, there are formed the output inverters ISWA2 and seventh control wirings CL7. The seventh control wirings CL7 are electrically connected on one end to the Y-driver YD.

The output inverter ISWA2 is a clocked inverter. The output inverter ISWA2 includes an input terminal connected to the output terminal of the second inverter ISW22 of the first memory M1, and an output terminal connected to the signal line XL.

A control signal SST3 output from the Y-driver YD is input to the output inverter ISWA2 via the seventh control wiring CL7, and the operation of the output inverter ISWA2 is controlled. The output inverter ISWA2 can output the data in the first memory M1 to the signal line XL. The data in the first memory M1 output to the signal line XL is output to the outside of a panel via the X-driver XD and the converter circuit 16. The converter circuit 16 converts the signals supplied in parallel from the signal line XL to serial signals and then outputs the serial signals.

The Y-driver YD drives the first and second writing switches TR21 and TR22, the first to third output control switches TRA1 to TRA3, and the output inverter ISWA2. A timing controller TCON as a controller controls the operations of the X-driver XD, the Y-driver YD, and the converter circuit 16.

The pixel PX having the configuration described above can be roughly classified into a video display pixel circuit S1 and a photosensor control circuit PH as a sensor control circuit. The video display pixel circuit S1 includes the first writing switch TR21, the first memory M1, the signal control switch N21, and the pixel control switch (SW23 and SW24). The photosensor control circuit PH includes the second transistor TR22, the second memory M2, and the photosensor circuit SS.

Now, the operation of the display apparatus 100 is described. The operation of the display apparatus 100 is controlled by the timing controller TCON. In the display apparatus 100 according to the present embodiment, characters and figures are written into the display unit DYP in accordance with positional information input by applying light to the display unit DYP with a light pen (pen-shaped light) LP. When the power supply is activated, the initial signal Vini at 0 V corresponding to white display is supplied to the signal line XL.

As shown in FIG. 11, the operation of the display apparatus 100 is divided into a first display signal writing operation in a first display signal V1 writing period PW, a memory operation in a memory period PM, an optical rewriting operation (rewriting operation) in an optical rewriting period PL (rewriting period), and a reading operation in a reading period PR.

The optical rewriting period PL can be said to be an input information detecting period. The optical rewriting operation is divided into an optical writing operation (second display signal rewriting operation) in an optical writing period PLa (second display signal V2 rewriting period), and an optical erasing operation (second display signal erasing operation) in an optical erasing period PLb (second display signal V2 erasing period).

The series of operations (operation periods) described above are arranged and shown for convenience in FIG. 11, and are not exclusively repeated in the shown order. Although described later, a user switches to the optical writing operation or the optical erasing operation. Therefore, for example, the display apparatus 100 may operate without the optical erasing operation, and may operate to alternately repeat the optical writing operation and the optical erasing operation more than once.

As shown in FIG. 10 and FIG. 11, in writing, the control signal RCL provided to the control wiring line SWL in the writing period PW is at a low level (0 V). When the low-level control signal RCL is provided to the first to third output control switches TRA1 to TRA3, the first output control switch TRA1 is switched to a nonconducting state, and the second and third output control switches TRA2 and TRA3 are switched to a conducting state.

The voltage level of the counter voltage Vcom applied to the counter electrode CE alternately switches between a high-level voltage and a low-level voltage at given periods. The voltage levels of the control signals VLC_a and VLC_b alternately switch between a high-level voltage and a low-level voltage at given periods to correspond to the period at which the voltage level of the counter voltage Vcom is switched.

The control signal VLC_a and the control signal VLC_b are controlled to be at levels opposite to each other. That is, in a period in which the voltage level of the counter voltage Vcom is high, the voltage level of the control signal VLC_a is high, and the voltage level of the control signal VLC_b is low. In a period in which the voltage level of the counter voltage Vcom is low, the voltage level of the control signal VLC_b is high, and the voltage level of the control signal VLC_a is low.

In the writing period PW, the voltage level of the control signal SST3 provided to the output inverter ISWA2 is low. The first control signal INV2 provided to the second inverter ISW22 is controlled so that its voltage level reaches a low level at every given period.

In the case of writing, first, the first writing switch TR21 and the second writing switch TR22 are switched to a conducting state by the control signal SST1 and the control signal SST2, and the first display signal V1 at 0 V corresponding to white display is supplied to the first memory M1 and the second memory M2. The first writing switch TR21 and the second writing switch TR22 are switched to a nonconducting state (off) after the first display signals V1 are respectively provided to the first memory M1 and the second memory M2 from the signal line XL.

At the same time, if the voltage level of the first control signal INV2 is switched to a high level, the first switch SW21 and the second switch SW22 are switched to a conducting state. Accordingly, the low-level (0 V) output signal VC1 is provided to the gate electrode of the second output switch SW24 from the first memory M1, and the high-level (5 V) output signal VC2 is provided to the gate electrode of the first output switch SW23 from the first memory M1, thereby controlling the first output switch SW23 and the second output switch SW24.

Thus, the first output switch SW23 is switched to a conducting state, and the second output switch SW24 is switched to a nonconducting state, so that the control signal VLC_a is selected, and the control signal VLC_a at a voltage level corresponding to white display is provided to the pixel electrode PE via the first output switch SW23.

In the case of optical writing, the control signal RCL provided to the control wiring line SWL in the optical writing period PLa is at a low level (0 V). When the low-level control signal RCL is provided to the first to third output control switches TRA1 to TRA3, the first output control switch TRA1 is switched to a nonconducting state, and the second and third output control switches TRA2 and TRA3 are switched to a conducting state.

If light is applied to the photosensor circuit SS by input with the light pen LP in the optical writing period PLa, a leakage current runs through the first photodiode PD1 and the second photodiode PD2. As a result, the data for the second display signal V2 at 5 V is provided to the first memory M1 via the second output control switch TRA2, the second photodiode PD2, and the third output control switch TRA3. In this case, the data in the first memory M1 is rewritten by the switch of the voltage level of the first control signal INV2 to a low level.

If the voltage level of the first control signal INV2 is then switched to a high level, the first switch SW21 and the second switch SW22 are switched to a conducting state. Accordingly, the high-level (5 V) output signal VC1 is provided to the gate electrode of the second output switch SW24 from the first memory M1, and the low-level (0 V) output signal VC2 is provided to the gate electrode of the first output switch SW23 from the first memory M1, thereby controlling the first output switch SW23 and the second output switch SW24.

Thus, the first output switch SW23 is switched to a nonconducting state, and the second output switch SW24 is switched to a conducting state, so that the control signal VLC_b is selected, and the control signal VLC_b at a voltage level corresponding to black display is provided to the pixel electrode PE via the second output switch SW24.

In this way, if light is applied to the photosensor circuit SS from the light pen LP, the signal applied to the pixel electrode PE is switched to the control signal VLC_b at a voltage level corresponding to black display in accordance with the period of the first control signal INV2.

When the data for the first display signal V1 in the first memory M1 is at a high level (5 V), black display is set before writing with the light pen LP.

Figure 12:
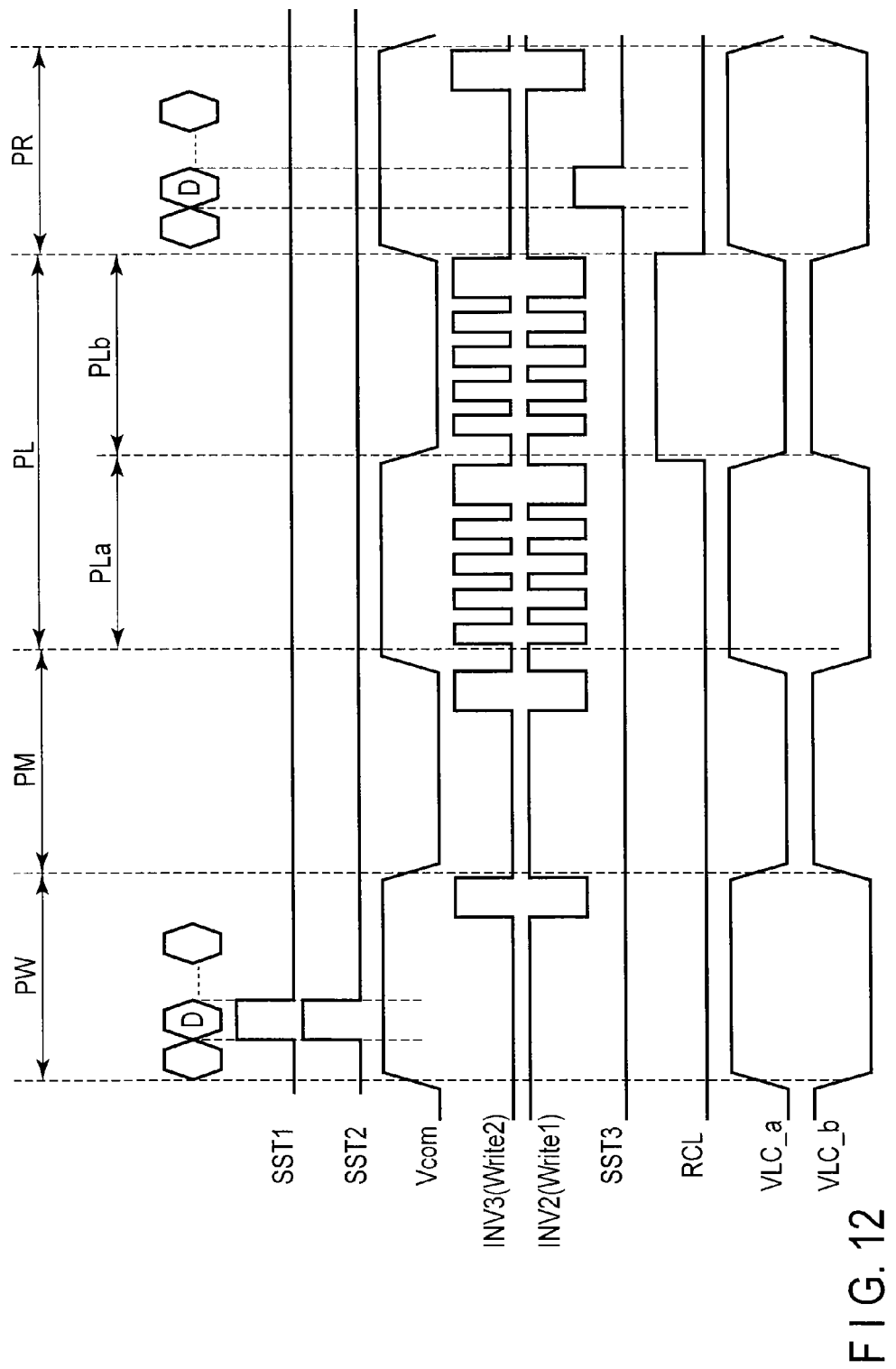
FIG. 12 is another timing chart showing various control signals and a counter voltage in the method of driving the display apparatus according to the third embodiment.

The display apparatus 100 can normally hold data in pixel memories (the first memory M1 and the second memory M2), and can therefore its frequency can be decreased to 1 Hz or less, for example. This enables lower power consumption in the display apparatus 100. As shown in FIG. 12, the rewriting with the light pen LP can be controlled by the first control signal INV2 independently of the control signals VLC_a and VLC_b. The frequency of the first control signal INV2 is different from the frequencies of the control signals VLC_a and VLC_b, and can therefore be set to a frequency suitable for handwriting input. If the first control signal INV2 is adapted to the use of the light pen LP, the frequency of the second control signal INV2 has only to be increased during the use of the light pen LP, which enables both lower power consumption and handwriting input.

In the case of optical erasing, the control signal RCL provided to the control wiring SWL in the optical erasing period PLb is at a high level (5 V). When the high-level control signal RCL is provided to the first to third output control switches TRA1 to TRA3, the first output control switch TRA1 is switched to a conducting state, and the second and third output control switches TRA2 and TRA3 are switched to a nonconducting state.

Here, the user can operate an interface such as a button mounted on the display apparatus 100 (provided in the display apparatus 100) to switch to optical writing or optical erasing in the display unit DYP. An external command signal corresponding to the user operation is provided to the timing controller TCON via a flexible substrate 20. The timing controller TCON switches the control signal RCL in accordance with the provided command signal.

In order to erase the characters and figures written in the display unit DYP, light is applied to the photosensor circuit SS by input with the light pen LP in the optical erasing period PLb, a leakage current runs through the first photodiode PD1 and the second photodiode PD2. As a result, the 0 V first display signal V1 corresponding to white display is provided to the first memory M1 from the second memory M2 via the first output control switch TRA1 and the first photodiode PD1. In this case, the data in the first memory M1 is rewritten by the switch of the voltage level of the first control signal INV2 to a low level.

If the first control signal INV2 is switched to a high level after the voltage level of the data held in the first memory M1 is rewritten to 0 V from 5 V (after the restoration to the data for the first display signal V1), the first switch SW21 and the second switch SW22 are switched to a conducting state. Accordingly, the low-level (0 V) output signal VC1 is provided to the gate electrode of the second output switch SW24 from the first memory M1, and the high-level (5 V) output signal VC2 is provided to the gate electrode of the first output switch SW23 from the first memory M1, thereby controlling the first output switch SW23 and the second output switch SW24.

Thus, the first output switch SW23 is switched to a conducting state, and the second output switch SW24 is switched to a nonconducting state, so that the control signal VLC_a is selected, and the control signal VLC_a at a voltage level corresponding to white display is provided to the pixel electrode PE via the first output switch SW23.

In this way, the signal supplied to the pixel electrode PE is switched to the control signal VLC_a corresponding to white display from the control signal VLC_b corresponding to black display. Therefore, the characters and figures written in the display unit DYP can be erased by applying light to the written characters and figures from the light pen LP.

The optical erasing (white display) with the light pen LP is basically the same as the optical writing (black display) with the light pen LP, and the difference is whether the voltage level of the control signal RCL provided to the control wiring SWL is the low level (0 V) for optical writing or the high level (5 V) for optical erasing.

As described above, the black display by the first display signal V1 is configured to be unerasable by, for example, the light pen LP. Thus, characters (data) written on images of cartoons or an electronic newspaper with the light pen LP can be erased without erasing the original image (the first display signal V1).

This is enabled by changing the voltage level of the control signal RCL, thereby permitting the simplification of a pixel circuit.

Reading is performed in the reading period PR. In order to output (read) data for the signal stored in the first memory M1, in particular, data for the signal stored in the first memory M1 after being written or erased with the light pen LP, the voltage level of the first control signal INV2 is switched to a high level and the data is looped to hold the data in the first memory M1. Even if the user erroneously uses the light pen LP in the reading period PR, the first photodiode PD1 and the second photodiode PD2 are switched off and nothing is written into the first memory M1 owing to the control by the first control signal INV2.

In this condition, the voltage level of the control signal SST3 input to the output inverter ISWA2 is switched to a high level, and the data for the first display signal V1 or data for the second display signal V2 stored in the first memory M1 is provided to the signal line XL via the output inverter ISWA2 and then provided to the converter circuit 16.

The Y-driver YD sequentially switches the voltage level of the control signal SST3 to a high level for each row of the pixels PX, and the signal stored in the first memory M1 is provided to the converter circuit 16 for each row of the pixels PX. The converter circuit 16 converts the signal input in parallel for each row of the pixels PX to a serial signal. The signal may be divided into bits and thus processed to enhance resolution. The serial signal converted by the converter circuit 16 is output to the exterior via the flexible substrate 20.

If the externally output signal is then stored in an unshown storage medium, the characters and figures written in the display unit DYP can be saved. If the externally output signal is supplied to, for example, a printer, the characters and figures written in the display unit DYP can be printed and output on paper.

Although the signal corresponding to white display is first supplied to the pixel electrode PE in writing with the light pen LP in the case described above, the signal first supplied to the pixel electrode PE may be a signal other than the signal corresponding to white display.

For example, when the signal output to the exterior via the flexible substrate 20 is stored in an external memory, the signal stored in the external memory may be provided to the X-driver XD via the flexible substrate 20 and an I/F processing circuit 14, and an initial screen may be formed. The characters and figures written in the past may be displayed on the screen in this way. In this case, the user can write information over the characters and figures written in the past, and additionally display the overwritten information on the screen.

According to the display apparatus having the above-described configuration and the method of driving the display apparatus in the third embodiment, a signal is written into the pixel electrode PE by applying light to the display unit DYP with the light pen LP, so that the signal line XL is only driven during the initial screen writing when the data for the first display signal V1 is still image data. Therefore, the X-driver XD only drives the signal line XL at the initial screen writing, thereby allowing lower power consumption.

As the first photodiode PD1 and the second photodiode PD2 (the photosensor control circuits PH) are disposed in each of the pixels PX, input positional information can be precisely detected. The information detected by the first photodiode PD1 and the second photodiode PD2 can be processed within the pixels PX without even being transferred to an external IC, so that the processing speed can be enhanced. Further, it is possible to provide the display apparatus 100 which is high in the speed of processing the input positional information and which can be easily used by every user in every scene, and the method of driving the display apparatus.

Next, a display apparatus and a method of driving the display apparatus according to a fourth embodiment will be described. It is to be noted that the configuration according to this embodiment is the same in other respects as that according to the third embodiment described above and that like components are provided with like reference signs and are not described in detail.

As shown in FIG. 13, a display apparatus 100 according to this embodiment is different from that of the display apparatus 100 according to the third embodiment in the configuration of the pixel PX, in particular, in the configuration of the photosensor circuit SS. The photosensor (photodiode) rewrites data in a first memory M1 via a switch (transistor) instead of directly rewriting the data in the first memory M1.

On an array substrate SB1, there are formed first output control switches TRB1, second output control switches TRB2, third output control switches TRB3, fourth output control switches TRB4, fifth output control switches TRB5, and sixth output control switches TRB6, instead of the first to third output control switches TRA1 to TRA3.

On the array substrate SB1, there are further formed eighth control wirings CL8, ninth control wirings CL9, tenth control wirings CL10, and eleventh control wirings CL11. The eighth control wirings CL8, the ninth control wirings CL9, the tenth control wirings CL10, and the eleventh control wirings CL11 are electrically connected on one end to a Y-driver YD.

The photosensor circuit SS is connected to the first memory M1. In this embodiment, the photosensor circuit SS is also connected to a second memory M2. The photosensor circuit SS can provide data for a second display signal V2 or data for a first display signal V1 to the first memory M1 when detecting input information. More specifically, the photosensor circuit SS detects the illumination of incident light and can thereby provide the data for the second display signal V2 or the data for the first display signal V1 to the first memory M1.

The photosensor circuit SS comprises a first photodiode PD1, a second photodiode PD2, the first output control switch TRB1, the second output control switch TRB2, the third output control switch TRB3, the fourth output control switch TRB4, the fifth output control switch TRB5, and the sixth output control switch TRB6.

The first photodiode PD1 includes an anode connected to the second output control switch TRB2, and a cathode connected to a high potential power supply VDD. A signal at a voltage level (5 V) that can switch the second output control switch TRB2 to a conducting state is provided to the cathode of the first photodiode PD1 from the high potential power supply VDD.

The second photodiode PD2 includes a cathode connected to the fifth output control switch TRB5, and an anode connected to a low potential power supply VSS (ground potential) as a power supply. A signal at a voltage level (0 V) that can switch the fifth output control switch TRB5 to a conducting state is provided to the anode of the second photodiode PD2 from the low potential power supply VSS.

The first photodiode PD1 and the second photodiode PD2 generate a leakage current in accordance with the illumination of incident light.

The first output control switch TRB1 is an N-type thin film transistor comprising a polysilicon layer as a semiconductor layer. The first output control switch TRB1 includes a source electrode connected to the second output control switch TRB2, a drain electrode connected to the input terminal (first memory M1) of a first inverter ISW21, and a gate electrode connected to a control wiring line SWL. The first output control switch TRB1 switches whether to conduct the second output control switch TRB2 and the first memory M1 in accordance with the control signal RCL provided via the control wiring SWL.

The second output control switch TRB2 is an N-type thin film transistor comprising a polysilicon layer as a semiconductor layer. The second output control switch TRB2 includes a source electrode connected to the output terminal of a fourth inverter IN22 (second memory M2), a drain electrode connected to the source electrode of the first output control switch TRB1, and a gate electrode connected to the anode of the first photodiode PD1. When the first photodiode PD1 generates a leakage current and a signal of 5 V is provided to the gate electrode from the high potential power supply VDD, the second output control switch TRB2 is switched to conduct the second memory M2 and the first output control switch TRB1.

The third output control switch TRB3 is an N-type thin film transistor comprising a polysilicon layer as a semiconductor layer. The third output control switch TRB3 includes a source electrode connected to the ninth control wiring CL9, a drain electrode connected to the gate electrode of the second output control switch TRB2, and a gate electrode connected to the tenth control wiring CL10.

The voltage level of a control signal SST5 provided to the ninth control wiring CL9 is normally 0 V (ground potential). The third output control switch TRB3 switches whether to conduct the gate electrode of the second output control switch TRB2 and the ninth control wiring CL9 at 0 V in accordance with a first control signal INV2 provided via the tenth control wiring CL10.

The control signal SST5 provided to the ninth control wiring CL9 is not exclusively 0 V, and can be switched to a level of the signal (control signal Write2) that prevents the leakage in the third output control switch TRB3.

The fourth output control switch TRB4 is a P-type thin film transistor comprising a polysilicon layer as a semiconductor layer. The fourth output control switch TRB4 includes a source electrode connected to the fifth output control switch TRB5, a drain electrode connected to the input terminal of the first inverter ISW21 (first memory M1), and a gate electrode connected to the control wiring SWL. The fourth output control switch TRB4 switches whether to conduct the fifth output control switch TRB5 and the first memory M1 in accordance with the control signal RCL provided via the control wiring SWL.

The fifth output control switch TRB5 is a P-type thin film transistor comprising a polysilicon layer as a semiconductor layer. The fifth output control switch TRB5 includes a source electrode connected to the high potential power supply VDD, a drain electrode connected to the source electrode of the fourth output control switch TRB4, and a gate electrode connected to the cathode of the second photodiode PD2. When the second photodiode PD2 generates a leakage current and a 0 V signal is provided to the gate electrode from the low potential power supply VSS, the fifth output control switch TRB5 is switched to conduct the high potential power supply VDD and the fourth output control switch TRB4.

That is, when a 0 V signal is provided to the gate electrode, the fifth output control switch TRB5 is switched to provide the fourth output control switch TRB4 with a 5 V power supply voltage provided from the high potential power supply VDD, that is, the second display signal V2. The second display signal V2 is used as a detection signal.

The sixth output control switch TRB6 is a P-type thin film transistor comprising a polysilicon layer as a semiconductor layer. The sixth output control switch TRB6 includes a source electrode connected to the eighth control wiring CL8, a drain electrode connected to the gate electrode of the fifth output control switch TRB5, and a gate electrode connected to the eleventh control wiring CL11.

The voltage level of a control signal SST4 provided to the eighth control wiring is normally 5 V. The sixth output control switch TRB6 switches whether to conduct the gate electrode of the fifth output control switch TRB5 and the eighth control wiring CL8 at 5 V in accordance with a control signal INV3 provided via the eleventh control wiring line CL11. Here, the waveform of the control signal INV3 is a reversed-phase waveform of the first control signal INV2.

The control signal SST4 provided to the eighth control wiring CL8 is not exclusively the 5 V signal, and can be switched to a level of the signal (control signal Write1) that prevents the leakage in the sixth output control switch TRB6.

The first output control switch TRB1, the second output control switch TRB2 and the third output control switch TRB3, and the fourth output control switch TRB4, the fifth output control switch TRB5 and the sixth output control switch TRB6 are switched to a conducting state in different periods.

When the low-level (0 V) control signal RCL is provided to the control wiring SWL, the first output control switch TRB1 is switched to a nonconducting state, and the fourth output control switch TRB4 is switched to a conducting state.

At the same time, the second photodiode PD2 generates a leakage current, so that the fifth output control switch TRB5 is switched to a conducting state, and the second display signal V2 is provided to the first memory M1 via the fifth output control switch TRB5 and the fourth output control switch TRB4. As a result, the data in the first memory M1 is rewritten to the data for the second display signal V2.

When the high-level (5 V) control signal RCL is provided to the control wiring SWL, the first output control switch TRB1 is switched to a conducting state, and the fourth output control switch TRB4 is switched to a nonconducting state.

In this case, when the second output control switch TRB2 is switched to a conducting state by the generation of a leakage current in the first photodiode PD1, the first display signal V1 is provided to the first memory M1 from the second memory M2 via the second output control switch TRB2 and the first output control switch TRB1. As a result, the data in the first memory M1 is rewritten to the data for the first display signal V1. For example, the data for the second display signal V2 rewritten in the first memory M1 is erased, and the data in the first memory M1 can be restored to the data for the first display signal V1.

According to the display apparatus having the above-described configuration and the method of driving the display apparatus in the fourth embodiment, it is possible to provide advantageous effects similar to those in the third embodiment described above. Moreover, the fourth embodiment is different from the first embodiment in the operation of rewriting the data in the first memory M1 with the light pen LP, thereby enabling more stable operation.

The first photodiode PD1 controls the gate electrode of the second output control switch TRB2, and the second photodiode PD2 controls the gate electrode of the fifth output control switch TRB5. This allows the first memory M1 to be easily rewritten, and also allows the first photodiode PD1 and the second photodiode PD2 to be reduced in size.

Consequently, it is possible to provide the display apparatus 100 which is high in the speed of processing the input positional information and which can be easily used by every user in every scene, and the method of driving the display apparatus.

Next, a display apparatus and a display apparatus driving method according to a fifth embodiment will be described. It is to be noted that the configuration according to this embodiment is the same in other respects as that according to the first embodiment described above and that like components are provided with like reference signs and are not described in detail.

Figure 14:
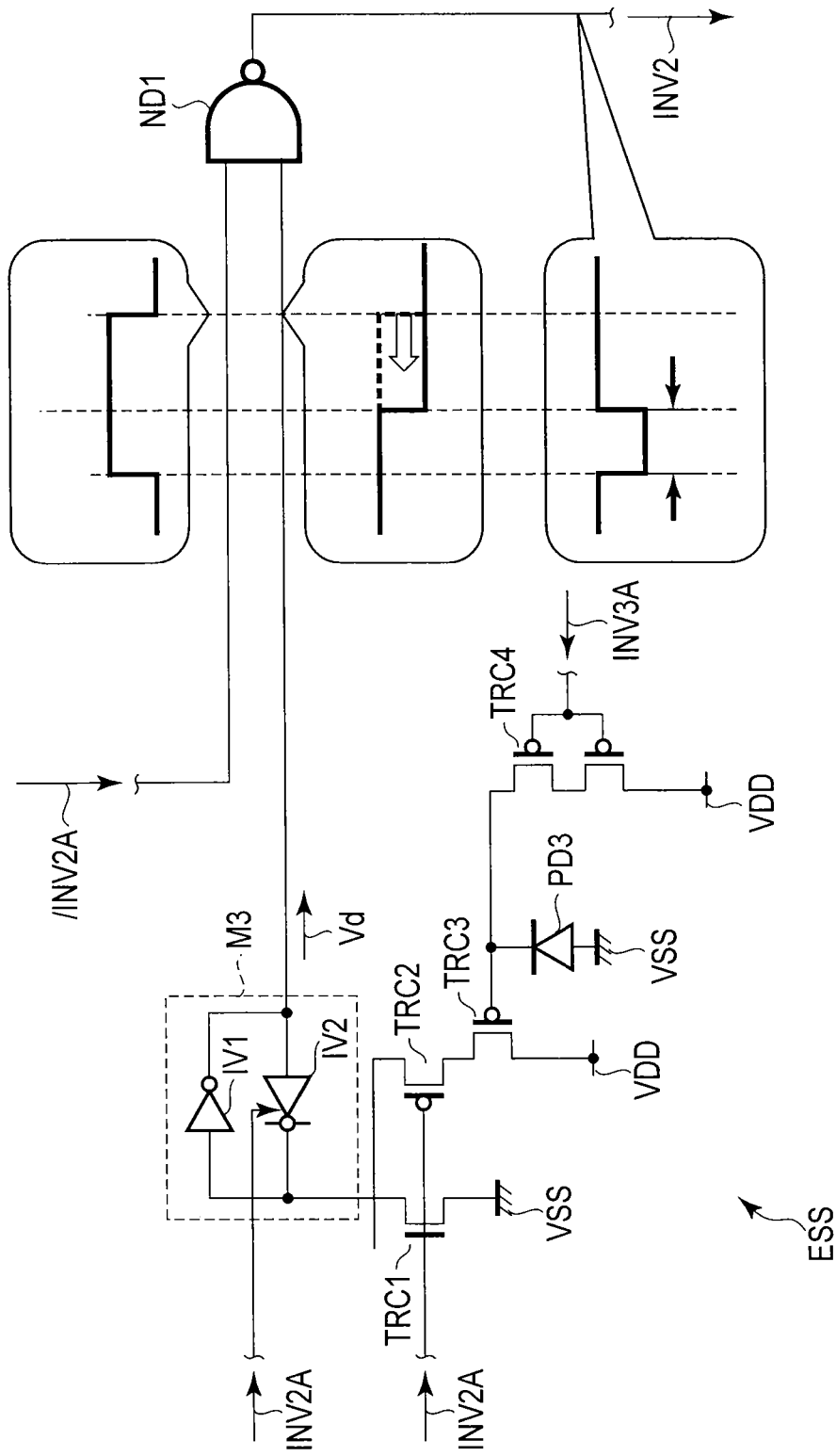
FIG. 14 is a circuit diagram showing the configuration of a memory operating circuit in a display apparatus according to a fifth embodiment.

As shown in FIG. 14, this embodiment is different from the first embodiment in the configuration of the memory operating circuit 18. The memory operating circuit 18 is configured to be able to adjust the period of the low level of a first control signal INV2 in accordance with the light environment around a display apparatus 100.

On an array substrate SB1, there are formed a fifth inverter IV1, a sixth inverter IV2, a third photodiode PD3, a first control switch TRC1, a second control switch TRC2, a third control switch TRC3, a fourth control switch TRC4, and a NAND circuit ND1 as a control circuit. The third photodiode PD3 is a photosensor as a sensor.

The third memory M3 is an SRAM as a static memory. The data in the third memory M3 is rewritten to data for a provided determination signal, and the third memory M3 holds data. The determination signal is a 0 V (ground potential) signal or a 5 V signal. The third memory M3 can output an output signal Vd. The waveform of the determination signal is a reversed-phase waveform of the output signal Vd. The third memory M3 comprises the fifth inverter IV1 and the sixth inverter IV2. The third memory M3 is constituted of elements similar to the elements constituting the first memory M1.

The fifth inverter IV1 and the sixth inverter IV2 are connected in a loop form. The sixth inverter IV2 is a clocked inverter. The sixth inverter IV2 includes an input terminal connected to the output terminal of the fifth inverter IV1, and an output terminal connected to the input terminal of the fifth inverter IV1. The data in the third memory M3 is rewritten by the switch of the voltage level of a control signal INV2A to a low level.

An environment light sensor circuit ESS comprises the third photodiode PD3, the first control switch TRC1, the second control switch TRC2, the third control switch TRC3, and the fourth control switch TRC4. The environment light sensor circuit ESS is constituted of elements similar to the elements constituting the photosensor circuit SS.

The third photodiode PD3 includes an anode connected to a low potential power supply VSS (ground potential), and a cathode connected to the third control switch TRC3. A signal at a voltage level (0 V) that can switch the third control switch TRC3 to a conducting state is provided to the anode of the third photodiode PD3 from the low potential power supply VSS. The third photodiode PD3 generates a leakage current in accordance with the illumination of incident environment light.

The first control switch TRC1 is an N-type thin film transistor comprising a polysilicon layer as a semiconductor layer. The first output control switch TRB1 includes a source electrode connected to the low potential power supply VSS, and a drain electrode connected to the input terminal of the fifth inverter IV1 (third memory M3). When the high-level control signal INV2A is provided to the gate electrode, the first control switch TRC1 is switched to provide the third memory M3 with a 0 V signal provided from the low potential power supply VSS.

The second control switch TRC2 is a P-type thin film transistor comprising a polysilicon layer as a semiconductor layer. The second control switch TRC2 includes a source electrode connected to the third control switch TRC3, and a drain electrode connected to the input terminal of the fifth inverter IV1 (third memory M3). When the low-level control signal INV2A is provided to the gate electrode, the second control switch TRC2 is switched to conduct the third control switch TRC3 and the third memory M3.

The third control switch TRC3 is a P-type thin film transistor comprising a polysilicon layer as a semiconductor layer. The third control switch TRC3 includes a source electrode connected to a high potential power supply VDD, a drain electrode connected to the source electrode of the second control switch TRC2, and a gate electrode connected to the cathode of the third photodiode PD3. When the third photodiode PD3 generates a leakage current and a 0 V signal is provided to the gate electrode from the low potential power supply VSS, the third control switch TRC3 is switched to conduct the high potential power supply VDD and the second control switch TRC2.

That is, when a 0 V signal is provided to the gate electrode, the third control switch TRC3 is switched to provide the second control switch TRC2 with a 5 V signal provided from the high potential power supply VDD.

When the second control switch TRC2 is switched to a conducting state, the 5 V signal provided from the high potential power supply VDD is provided to the third memory M3 via the third control switch TRC3 and the second control switch TRC2.

The fourth control switch TRC4 is a P-type comprising a polysilicon layer as a semiconductor layer, and is a double-gate thin film transistor. The fourth control switch TRC4 includes a source electrode connected to the high potential power supply VDD, and a drain electrode connected to the gate electrode of the third control switch TRC3. When a low-level control signal INV3A is provided to the gate electrode, the fourth control switch TRC4 is switched to provide the gate electrode of the third control switch TRC3 with a 5 V signal provided from the high potential power supply VDD.

The environment light sensor circuit ESS can provide the third memory M3 with data for the determination signal corresponding to the illumination of incident environment light.

The NAND circuit ND1 includes a first input terminal, a second input terminal, and an output terminal. A control signal /INV2A is provided to the first input terminal of the NAND circuit ND1 as a reference signal serving as the reference for the automatic adjustment of a first control signal INV2. The waveform of the control signal /INV2A is a reversed-phase waveform of the control signal INV2A.

The second input terminal of the NAND circuit ND1 is connected to the output terminal (third memory M3) of the fifth inverter IV1. The output signal Vd is provided to the second input terminal of the NAND circuit ND1 from the third memory M3.

The NAND circuit ND1 performs a logical operation on the basis of the data for the control signal /INV2A and the data for the output signal Vd provided from the third memory M3, and automatically adjust the first control signal INV2, and then outputs the automatically adjusted first control signal INV2.

The memory operating circuit 18 outputs the first control signal INV2 automatically adjusted in accordance with the environment light, and controls the operation of the first memory M1. The memory operating circuit 18 adjusts so that the period of the low level of the first control signal INV2 is shorter when the illumination of the environment light around the display apparatus 100 is higher.

According to the display apparatus having the above-described configuration and the method of driving the display apparatus in the fifth embodiment, it is possible to provide advantageous effects similar to those in the third embodiment described above.

Furthermore, the memory operating circuit 18 outputs the first control signal INV2 automatically adjusted in accordance with the environment light, and controls the operation of the first memory M1.

Consequently, it is possible to provide the display apparatus 100 which is high in the speed of processing the input positional information and which can be easily used by every user in every scene, and the method of driving the display apparatus.

Next, a display apparatus and a method of driving the display apparatus according to a sixth embodiment will be described. It is to be noted that the configuration according to this embodiment is the same in other respects as that according to the third embodiment described above and that like components are provided with like reference signs and are not described in detail.

Figure 15:
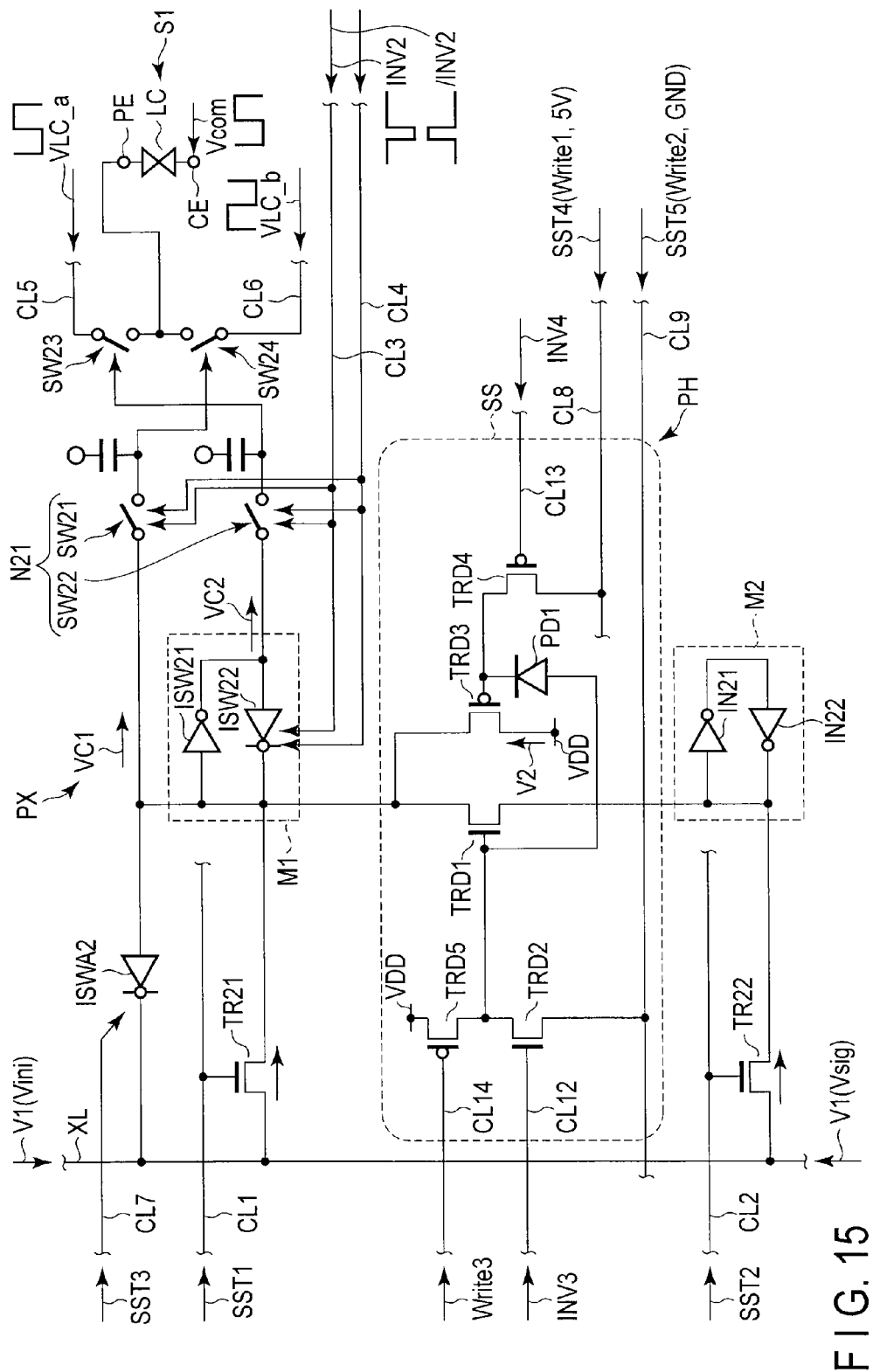
FIG. 15 is a diagram showing an equivalent circuit of a pixel in a display apparatus according to a sixth embodiment.

As shown in FIG. 15, a display apparatus 100 according to this embodiment is different from that of the display apparatus 100 according to the third embodiment in the configuration of the pixel PX, in particular, in the circuit configuration of the photosensor circuit SS. The photosensor (photodiode) rewrites data in a first memory M1 via a switch (transistor) instead of directly rewriting the data in the first memory M1. Moreover, one photodiode is provided in each of the pixels PX, which prevents the increase in the size of the opening of a pixel electrode PE. That is, the reduction of a light reflection area can be inhibited.

On an array substrate SB1, there are formed first output control switches TRD1, second output control switches TRD2, third output control switches TRD3, fourth output control switches TRD4, and fifth output control switches TRD5, instead of the first to third output control switches TRA1 to TRA3. The above-mentioned second photodiode PD2 is not formed on the array substrate SB1.

On the array substrate SB1, there are further formed eighth control wirings CL8, ninth control wirings CL9, twelfth control wirings CL12, thirteenth control wirings CL13, and fourteenth control wirings CL14. The eighth control wirings CL8, the ninth control wirings CL9, the twelfth control wirings CL12, the thirteenth control wirings CL13, and the fourteenth control wirings CL14 are electrically connected on one end to a Y-driver YD.

A control signal RCL and a control signal (collective erasing control signal) Write3 are calculated together with a first control signal INV2 in the Y-driver YD. Thus, control signals INV3 and INV4 are supplied from the Y-driver YD.

The photosensor circuit SS is connected to the first memory M1. In this embodiment, the photosensor circuit SS is also connected to a second memory M2. The photosensor circuit SS can provide data for a second display signal V2 or data for a first display signal V1 to the first memory M1 when detecting input information. More specifically, the photosensor circuit SS detects the illumination of incident light and can thereby provide the data for the second display signal V2 or the data for the first display signal V1 to the first memory M1. It goes without saying that the first display signal V1 is used as a display signal and that the second display signal V2 is used as a detection signal.

The photosensor circuit SS comprises a first photodiode PD1, the first output control switch TRD1, the second output control switch TRD2, the third output control switch TRD3, the fourth output control switch TRD4, and the fifth output control switch TRD5.

The first photodiode PD1 includes an anode connected to the first output control switch TRD1, the second output control switch TRD2, and the fifth output control switch TRD5, and a cathode connected to the third output control switch TRD3 and the fourth output control switch TRD4.

A control signal SST5 at a voltage level (0 V) that can switch the third output control switch TRD3 to a conducting state is provided to the anode of the first photodiode PD1 from the second output control switch TRD2 (the ninth control wiring CL9). Alternatively, a signal at a voltage level (5 V) that can switch the third output control switch TRD3 to a nonconducting state is provided to the anode of the first photodiode PD1 from the fifth output control switch TRD5 (a high potential power supply VDD).

A control signal SST4 at a voltage level (5 V) that can switch the first output control switch TRD1 to a conducting state is provided to the cathode of the first photodiode PD1 from the fourth output control switch TRD4 (the eighth control wiring CL8).

The first photodiode PD1 generates a leakage current in accordance with the illumination of incident light.

The first output control switch TRD1 is an N-type thin film transistor comprising a polysilicon layer as a semiconductor layer. The first output control switch TRD1 includes a source electrode connected to the output terminal (second memory M2) of a fourth inverter IN22, a drain electrode connected to the input terminal of a first inverter ISW21 (first memory M1), and a gate electrode connected to the second output control switch TRD2 and the fifth output control switch TRD5.

When a 5 V signal is provided to the gate electrode from the first photodiode PD1 (the 5 V eighth control wiring CL8), the first output control switch TRD1 is switched to conduct the second memory M2 and the first memory M1. This corresponds to a later-described optical erasing operation.

When a 5 V signal is provided to the gate electrode from the fifth output control switch TRD5 (the high potential power supply VDD), the first output control switch TRD1 is switched to conduct the second memory M2 and the first memory M1. This corresponds to a later-described collective erasing operation.

The second output control switch TRD2 is an N-type thin film transistor comprising a polysilicon layer as a semiconductor layer. The second output control switch TRD2 includes a source electrode connected to the ninth control wiring CL9, a drain electrode connected to the gate electrode of the first output control switch TRD1, and a gate electrode connected to the twelfth control wiring CL12.

The voltage level of the control signal SST5 provided to the ninth control wiring CL9 is normally 0 V (ground potential). The second output control switch TRD2 switches whether to conduct the ninth control wiring CL9 at 0 V, and the gate electrode of the first output control switch TRD1 and the anode of the first photodiode PD1 in accordance with the control signal INV3 provided via the twelfth control wiring CL12.

The control signal SST5 provided to the ninth control wiring CL9 is not exclusively 0 V, and can be switched to a level of the signal (control signal Write2) that prevents the leakage in the second output control switch TRD2.

The third output control switch TRD3 is a P-type thin film transistor comprising a polysilicon layer as a semiconductor layer. The third output control switch TRD3 includes a source electrode connected to the high potential power supply VDD, a drain electrode connected to the input terminal of the first inverter ISW21 (first memory M1), and a gate electrode connected to the cathode of the first photodiode PD1. When the first photodiode PD1 generates a leakage current and a 0 V signal is provided to the gate electrode from the second output control switch TRD2 (the ninth control wiring CL9 at 0 V), the third output control switch TRD3 is switched to conduct the high potential power supply VDD and the first memory M1.

That is, when a 0 V signal is provided to the gate electrode, the third output control switch TRD3 is switched to provide the first memory M1 with a 5 V power supply voltage provided from the high potential power supply VDD, that is, the second display signal V2.

The fourth output control switch TRD4 is a P-type thin film transistor comprising a polysilicon layer as a semiconductor layer. The fourth output control switch TRD4 includes a source electrode connected to the eighth control wiring CL8, a drain electrode connected to the gate electrode of the third output control switch TRD3, and a gate electrode connected to the thirteenth control wiring CL13.

The voltage level of the control signal SST4 provided to the eighth control wiring CL8 is normally V. The fourth output control switch TRD4 switches whether to conduct the eighth control wiring CL8 at 5 V, and the gate electrode of the third output control switch TRD3 and the cathode of the first photodiode PD1 in accordance with the control signal INV4 provided via the thirteenth control wiring CL13.

The control signal SST4 provided to the eighth control wiring CL8 is not exclusively the 5 V signal, and can be switched to a level of the signal (control signal Write1) that prevents the leakage in the fourth output control switch TRD4.

The fifth output control switch TRD5 is a P-type thin film transistor comprising a polysilicon layer as a semiconductor layer. The fifth output control switch TRD5 includes a source electrode connected to the high potential power supply VDD, a drain electrode connected to the gate electrode of the first output control switch TRD1, and a gate electrode connected to the fourteenth control wiring CL14.

The voltage level of the control signal Write3 provided to the fourteenth control wiring CL14 is normally 5 V. The fifth output control switch TRD5 switches whether to conduct the high potential power supply VDD, and the gate electrode of the first output control switch TRD1 and the anode of the first photodiode PD1 in accordance with the control signal Write3 provided via the fourteenth control wiring CL14.

The first output control switch TRD1 and the third output control switch TRD3 are switched to a conducting state in different periods.

When the second output control switch TRD2 is switched to a conducting state and the low-level (0 V) control signal SST5 is provided to the ninth control wiring CL9, the first output control switch TRD1 is switched to a nonconducting state.

At the same time, the first photodiode PD1 generates a leakage current, so that the third output control switch TRD3 is switched to a conducting state, and the second display signal V2 is provided to the first memory M1 via the third output control switch TRD3. As a result, the data in the first memory M1 is rewritten to the data for the second display signal V2.

When the fourth output control switch TRD4 is turned to a conducting state and the high-level (5 V) control signal SST4 is provided to the eighth control wiring CL8, the third output control switch TRD3 is turned to a nonconducting state.

At the same time, the first photodiode PD1 generates a leakage current, so that the first output control switch TRD1 is switched to a conducting state, and the first display signal V1 in the second memory M2 is provided to the first memory M1 via the first output control switch TRD1. As a result, the data in the first memory M1 is rewritten to the data for the first display signal V1 (optical erasing). For example, the data for the second display signal V2 rewritten in the first memory M1 is erased, and the data in the first memory M1 can be restored to the data for the first display signal V1.

Furthermore, the fifth output control switch TRD5 is switched to a conducting state, so that the first output control switch TRD1 is switched to a conducting state, and the first display signal V1 in the second memory M2 is provided to the first memory M1 via the first output control switch TRD1. As a result, the data in the first memory M1 is rewritten to the data for the first display signal V1 (collective erasing). Moreover, this is enabled without the application of light. For example, the data for the second display signal V2 rewritten in the first memory M1 is erased, and the data in the first memory M1 can be restored to the data for the first display signal V1.

Now, the operation of the display apparatus 100 is described. The operation of the display apparatus 100 is controlled by the timing controller TCON. In the display apparatus 100 according to the present embodiment, characters and figures are written into the display unit DYP in accordance with positional information input by applying light to the display unit DYP with a light pen (pen-shaped light) LP. When the power supply is activated, the initial signal Vini at 0 V corresponding to white display is supplied to the signal line XL.

Figure 16:
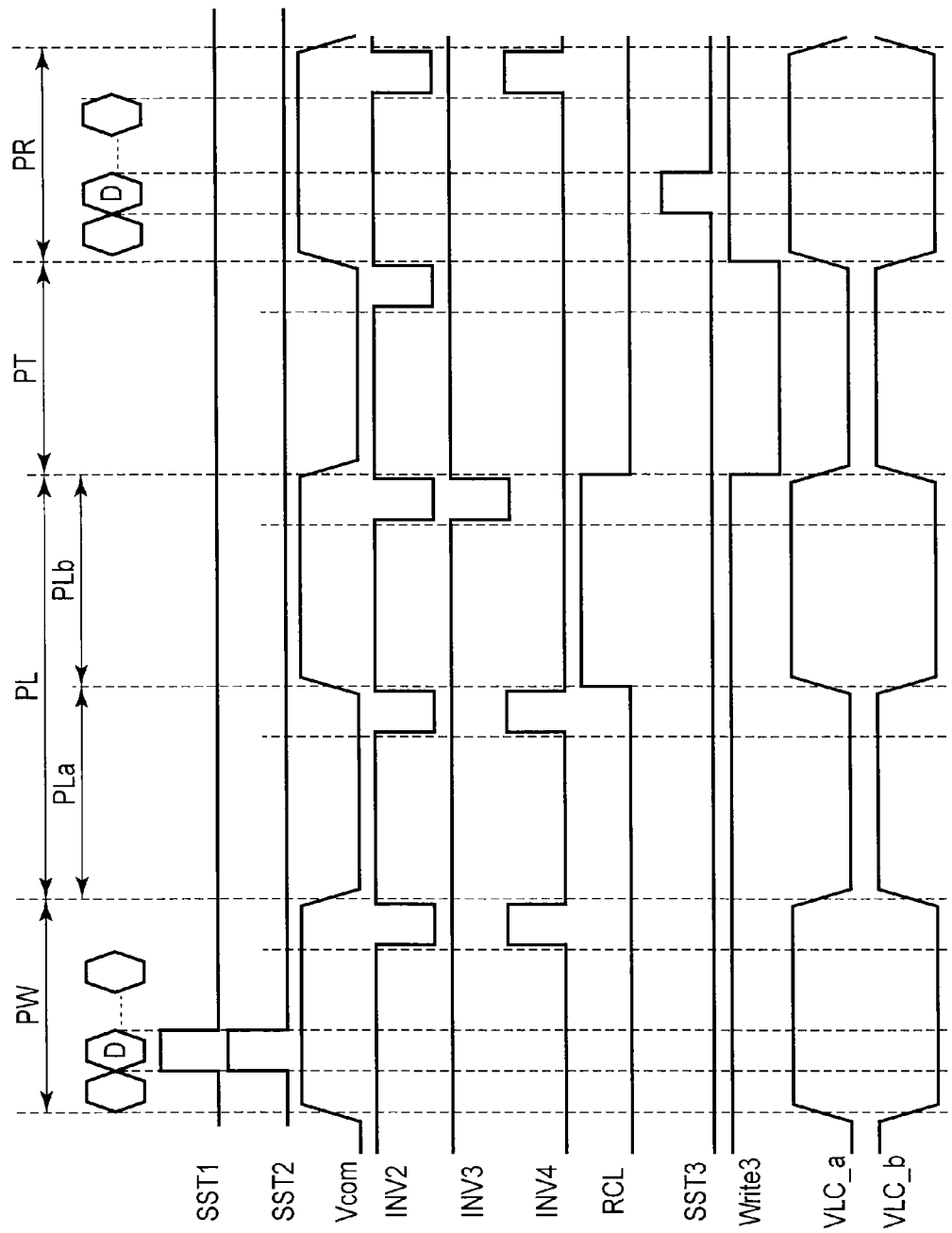
FIG. 16 is a timing chart showing various control signals and a counter voltage in a method of driving the display apparatus according to the sixth embodiment.

As shown in FIG. 16, the operation of the display apparatus 100 is divided into a first display signal writing operation in a first display signal V1 writing period PW, an optical rewriting operation (rewriting operation) in an optical rewriting period PL (rewriting period), a collective erasing operation in a collective erasing period PT, and a reading operation in a reading period PR.

The optical rewriting period PL can be said to be an input information detecting period. The optical rewriting operation is divided into an optical writing operation (second display signal rewriting operation) in an optical writing period PLa (second display signal V2 rewriting period), and an optical erasing operation (second display signal erasing operation) in an optical erasing period PLb (second display signal V2 erasing period).

The series of operations (operation periods) described above are arranged and shown for convenience in FIG. 16, and are not exclusively repeated in the shown order. Although described later, a user switches to the optical writing operation or the optical erasing operation. Moreover, the collective erasing operation is selected by the user and performed accordingly. Therefore, for example, the display apparatus 100 may operate without the optical erasing operation, and may operate to alternately repeat the optical writing operation and the optical erasing operation more than once.

As shown in FIG. 15 and FIG. 16, in writing, when the control signal RCL reaches a low level (0 V) in the writing period PW, the high-level control signal INV3 is provided to the twelfth control wiring CL12, the second output control switch TRD2 is switched to a conducting state, and the low-level (0 V) control signal SST5 is provided to the gate electrode of the first output control switch TRD1 and the anode of the first photodiode PD1. As a result, the first output control switch TRD1 is switched to a nonconducting state.

The low-level control signal INV4 is provided to the thirteenth control wiring line CL13, the fourth output control switch TRD4 is switched to a conducting state, and the high-level (5 V) control signal SST4 is provided to the gate electrode of the third output control switch TRD3. As a result, the third output control switch TRD3 is switched to a nonconducting state.

In a period in which the first control signal INV2 is at a high level and the control signal INV4 is at a low level, the first memory M1 performs a memory operation.

The voltage level of the counter voltage Vcom applied to the counter electrode CE alternately switches between a high-level voltage and a low-level voltage at given periods. The voltage levels of the control signals VLC_a and VLC_b alternately switch between a high-level voltage and a low-level voltage at given periods to correspond to the period at which the voltage level of the counter voltage Vcom is switched.

The control signal VLC_a and the control signal VLC_b are controlled to be at levels opposite to each other. That is, in a period in which the voltage level of the counter voltage Vcom is high, the voltage level of the control signal VLC_a is high, and the voltage level of the control signal VLC_b is low. In a period in which the voltage level of the counter voltage Vcom is low, the voltage level of the control signal VLC_b is high, and the voltage level of the control signal VLC_a is low.

In the writing period PW, the voltage level of the control signal SST3 provided to the output inverter ISWA2 is low. The first control signal INV2 provided to the second inverter ISW22 is controlled so that its voltage level reaches a low level at every given period.

In the case of writing, first, the first writing switch TR21 and the second writing switch TR22 are switched to a conducting state by the control signal SST1 and the control signal SST2, and the first display signal V1 at 0 V corresponding to white display is supplied to the first memory M1 and the second memory M2. The first writing switch TR21 and the second writing switch TR22 are switched to a nonconducting state (off) after the first display signals V1 are respectively provided to the first memory M1 and the second memory M2 from the signal line XL.

At the same time, if the voltage level of the first control signal INV2 is switched to a high level, the first switch SW21 and the second switch SW22 are switched to a conducting state. Accordingly, the low-level (0 V) output signal VC1 is provided to the gate electrode of the second output switch SW24 from the first memory M1, and the high-level (5 V) output signal VC2 is provided to the gate electrode of the first output switch SW23 from the first memory M1, thereby controlling the first output switch SW23 and the second output switch SW24.

Thus, the first output switch SW23 is switched to a conducting state, and the second output switch SW24 is switched to a nonconducting state, so that the control signal VLC_a is selected, and the control signal VLC_a at a voltage level corresponding to white display is provided to the pixel electrode PE via the first output switch SW23.

In the case of optical writing, in the optical writing period PLa, the second output control switch TRD2 is switched to a conducting state by the control signal INV3, the fourth output control switch TRD4 is switched to a conducting state by the control signal INV4, and the fifth output control switch TRD5 is switched to a nonconducting state by the control signal Write3.

The low-level (0 V) control signal SST5 is provided to the gate electrode of the first output control switch TRD1 and the anode of the first photodiode PD1. As a result, the first output control switch TRD1 is switched to a nonconducting state.

If light is applied to the photosensor circuit SS by input with the light pen LP in the optical writing period PLa, a leakage current runs through the first photodiode PD1. As a result, the low-level control signal SST5 is provided to the gate electrode of the third output control switch TRD3 via the first photodiode PD1, the third output control switch TRD3 is switched to a conducting state, and the data in the second display signal V2 at 5 V is provided to the first memory M1 via the third output control switch TRD3. In this case, the data in the first memory M1 is rewritten by the switch of the voltage level of the first control signal INV2 to a low level.

If the voltage level of the first control signal INV2 is then switched to a high level, the first switch SW21 and the second switch SW22 are switched to a conducting state. Accordingly, the high-level (5 V) output signal VC1 is provided to the gate electrode of the second output switch SW24 from the first memory M1, and the low-level (0 V) output signal VC2 is provided to the gate electrode of the first output switch SW23 from the first memory M1, thereby controlling the first output switch SW23 and the second output switch SW24.

Thus, the first output switch SW23 is switched to a nonconducting state, and the second output switch SW24 is switched to a conducting state, so that the control signal VLC_b is selected, and the control signal VLC_b at a voltage level corresponding to black display is provided to the pixel electrode PE via the second output switch SW24.

In this way, if light is applied to the photosensor circuit SS from the light pen LP, the signal applied to the pixel electrode PE is switched to the control signal VLC_b at a voltage level corresponding to black display in accordance with the period of the first control signal INV2.

When the data for the first display signal V1 in the first memory M1 is at a high level (5 V), black display is set before writing with the light pen LP.

The display apparatus 100 can normally hold data in pixel memories (the first memory M1 and the second memory M2), and can therefore its frequency can be decreased to 1 Hz or less, for example. This enables lower power consumption in the display apparatus 100. As shown in FIG. 12, the rewriting with the light pen LP can be controlled by the first control signal INV2 independently of the control signals VLC_a and VLC_b. The frequency of the first control signal INV2 is different from the frequencies of the control signals VLC_a and VLC_b, and can therefore be set to a frequency suitable for handwriting input. If the first control signal INV2 is adapted to the use of the light pen LP, the frequency of the second control signal INV2 has only to be increased during the use of the light pen LP, which enables both lower power consumption and handwriting input.

In the case of optically erasing the characters and figures written in the display unit DYP, the control signal RCL is at a high level (5 V) in the optical erasing period PLb. As a result, the low-level control signal INV4 is provided to the thirteenth control wiring line CL13, and the fourth output control switch TRD4 is switched to a conducting state.

The high-level (5 V) control signal SST4 is provided to the gate electrode of the third output control switch TRD3 and the cathode of the first photodiode PD1. As a result, the third output control switch TRD3 is switched to a nonconducting state.

Here, the user can operate an interface such as a button mounted on the display apparatus 100 (provided in the display apparatus 100) to switch to optical writing or optical erasing in the display unit DYP. An external command signal corresponding to the user operation is provided to the timing controller TCON via a flexible substrate 20. The timing controller TCON switches the control signal RCL in accordance with the provided command signal.

The control signal INV3 is supplied synchronously with the first control signal INV2. In a period in which the first control signal INV2 and the control signal INV3 are at a high level, the first memory M1 performs a memory operation, the high-level control signal INV3 is provided to the twelfth control wiring CL12 to switch the second output control switch TRD2 to a conducting state, and the low-level (0 V) control signal SST5 is provided to the gate electrode of the first output control switch TRD1 and the anode of the first photodiode PD1.

If light is then applied to the photosensor circuit SS by input with the light pen LP in the optical erasing period PLb, a leakage current runs through the first photodiode PD1. As a result, the high-level (5 V) control signal SST4 is provided to the gate electrode of the first output control switch TRD1, the first output control switch TRD1 is switched to a conducting state, and the 0 V first display signal V1 corresponding to white display is provided to the first memory M1 from the second memory M2 via the first output control switch TRD1. In this case, the data in the first memory M1 is rewritten by the switch of the voltage level of the first control signal INV2 to a low level.

If the first control signal INV2 is switched to a high level after the voltage held in the first memory M1 is rewritten to 0 V from 5 V (after the restoration to the data for the first display signal V1), a first switch SW21 and a second switch SW22 are switched to a conducting state. Accordingly, the low-level (0 V) output signal VC1 is provided to the gate electrode of a second output switch SW24 from the first memory M1, and the high-level (5 V) output signal VC2 is provided to the gate electrode of a first output switch SW23 from the first memory M1, thereby controlling the first output switch SW23 and the second output switch SW24.

Thus, the first output switch SW23 is switched to a conducting state, and the second output switch SW24 is switched to a nonconducting state, so that the control signal VLC_a is selected, and the control signal VLC_a at a voltage level corresponding to white display is provided to the pixel electrode PE via the first output switch SW23.

In this way, the signal supplied to the pixel electrode PE is switched to the control signal VLC_a corresponding to white display from the control signal VLC_b corresponding to black display. Therefore, the characters and figures written in the display unit DYP can be erased by applying light to the written characters and figures from the light pen LP.

As appreciated from the above explanation, the configuration of the pixel PX described above allows the same photodiode to be used for the optical writing and the optical erasing, and can lead to a high-definition pixel. Moreover, the leakage current of one photodiode can be reduced in each of the pixels PX, which enables a further reduction in power consumption.

The optical erasing (white display) with the light pen LP is basically the same as the optical writing (black display), and the difference is whether the voltage level of the control signal RCL is the low level (0 V) for optical writing or the high level (5 V) for optical erasing.

As described above, the black display by the first display signal V1 is configured to be unerasable by, for example, the light pen LP. Thus, characters (data) written on images of cartoons or an electronic newspaper with the light pen LP can be erased without erasing the original image (the first display signal V1).

This is enabled by changing the voltage level of the control signal RCL, thereby permitting the simplification of a pixel circuit.

In the collective erasing for collectively erasing the characters written in the display unit DYP, the second output control switch TRD2 is switched to a nonconducting state by the control signal INV3, the fourth output control switch TRD4 is switched to a conducting state by the control signal INV4, and the fifth output control switch TRD5 is switched to a conducting state by the control signal Write3, in the collective erasing period PT.

The high-level (5 V) control signal SST4 is provided to the gate electrode of the third output control switch TRD3 and the cathode of the first photodiode PD1. As a result, the third output control switch TRD3 is switched to a nonconducting state.

In the meantime, a high-level (5 V) signal is also provided to the gate electrode of the first output control switch TRD1 and the anode of the first photodiode PD1 from the high potential power supply VDD. As the high-level (5 V) signal is provided to both the anode and cathode of the first photodiode PD1, the first photodiode PD1 does not operate.

The first output control switch TRD1 is switched to a conducting state, so that the data for the first display signal V1 is written into the first memory M1 from the second memory M2, and the first memory M1 is set to an initial state before the optical writing.

In the collective erasing operation, all the pixels PX may be collectively erased, but the selected pixels PX alone may be collectively erased.

The data in the first memory M1 is rewritten by the switch of the voltage level of the first control signal INV2 to a low level.

If the voltage level of the first control signal INV2 is then switched to a high level, the first switch SW21 and the second switch SW22 are switched to a conducting state. Accordingly, the low-level (0 V) output signal VC1 is provided to the gate electrode of the second output switch SW24 from the first memory M1, and the high-level (5 V) output signal VC2 is provided to the gate electrode of the first output switch SW23 from the first memory M1, thereby controlling the first output switch SW23 and the second output switch SW24.

Thus, the first output switch SW23 is switched to a conducting state, and the second output switch SW24 is switched to a nonconducting state, so that the control signal VLC_a is selected, and the control signal VLC_a at a voltage level corresponding to white display is provided to the pixel electrode PE via the first output switch SW23.

Reading is performed in the reading period PR. In order to output (read) data for the signal stored in the first memory M1, in particular, data for the signal stored in the first memory M1 after written or erased with the light pen LP, the voltage levels of the first control signal INV2, the control signal INV3, and the control signal Write3 are switched to a high level, and the voltage level of the control signal INV4 is switched to a low level. Thus, the first output control switch TRD1 and the third output control switch TRD3 are switched to a nonconducting state, the first memory M1 performs a memory operation, and writing/reading functions are stopped.

In this condition, the voltage level of the control signal SST3 input to the output inverter ISWA2 is switched to a high level, and the data for the first display signal V1 or data for the second display signal V2 stored in the first memory M1 is provided to the signal line XL via the output inverter ISWA2 and then provided to the converter circuit 16.

The Y-driver YD sequentially switches the voltage level of the control signal SST3 to a high level for each row of the pixels PX, and the signal stored in the first memory M1 is provided to the converter circuit 16 for each row of the pixels PX. The converter circuit 16 converts the signal input in parallel for each row of the pixels PX to a serial signal. It goes without saying that the signal may be divided into bits and thus processed to enhance resolution. The serial signal converted by the converter circuit 16 is output to the exterior via the flexible substrate 20.

If the externally output signal is then stored in an unshown storage medium, the characters and figures written in the display unit DYP can be saved. If the externally output signal is supplied to, for example, a printer, the characters and figures written in the display unit DYP can be printed and output on paper.

Although the signal corresponding to white display is first supplied to the pixel electrode PE in writing with the light pen LP in the case described above, the signal first supplied to the pixel electrode PE may be a signal other than the signal corresponding to white display.

For example, when the signal output to the exterior via the flexible substrate 20 is stored in an external memory, the signal stored in the external memory may be provided to the X-driver XD via the flexible substrate 20 and an I/F processing circuit 14, and an initial screen may be formed. The characters and figures written in the past may be displayed on the screen in this way. In this case, the user can write information over the characters and figures written in the past, and additionally display the overwritten information on the screen.

According to the display apparatus having the above-described configuration and the method of driving the display apparatus in the sixth embodiment, it is possible to provide advantageous effects similar to those in the third embodiment described above. The sensor provided in the photosensor control circuit PH includes only to be one photodiode PD1 and requires no other sensors, thereby contributing to the improvement in the opening ratio of the pixel.

Consequently, it is possible to provide the display apparatus 100 which is high in the speed of processing the input positional information and which can be easily used by every user in every scene, and the method of driving the display apparatus.

Next, a display apparatus and a method of driving the display apparatus according to a seventh embodiment will be described. It is to be noted that the configuration according to this embodiment is the same in other respects as that according to the sixth embodiment described above and that like components are provided with like reference signs and are not described in detail.

As shown in FIG. 17, a display apparatus 100 according to this embodiment is different from that of the display apparatus 100 according to the sixth embodiment in the configuration of the pixel PX. The pixel PX is formed without the first writing switch TR21. Accordingly, a first control wiring CL1 provided with a control signal SST1 is not formed on an array substrate SB1.

Figure 18:
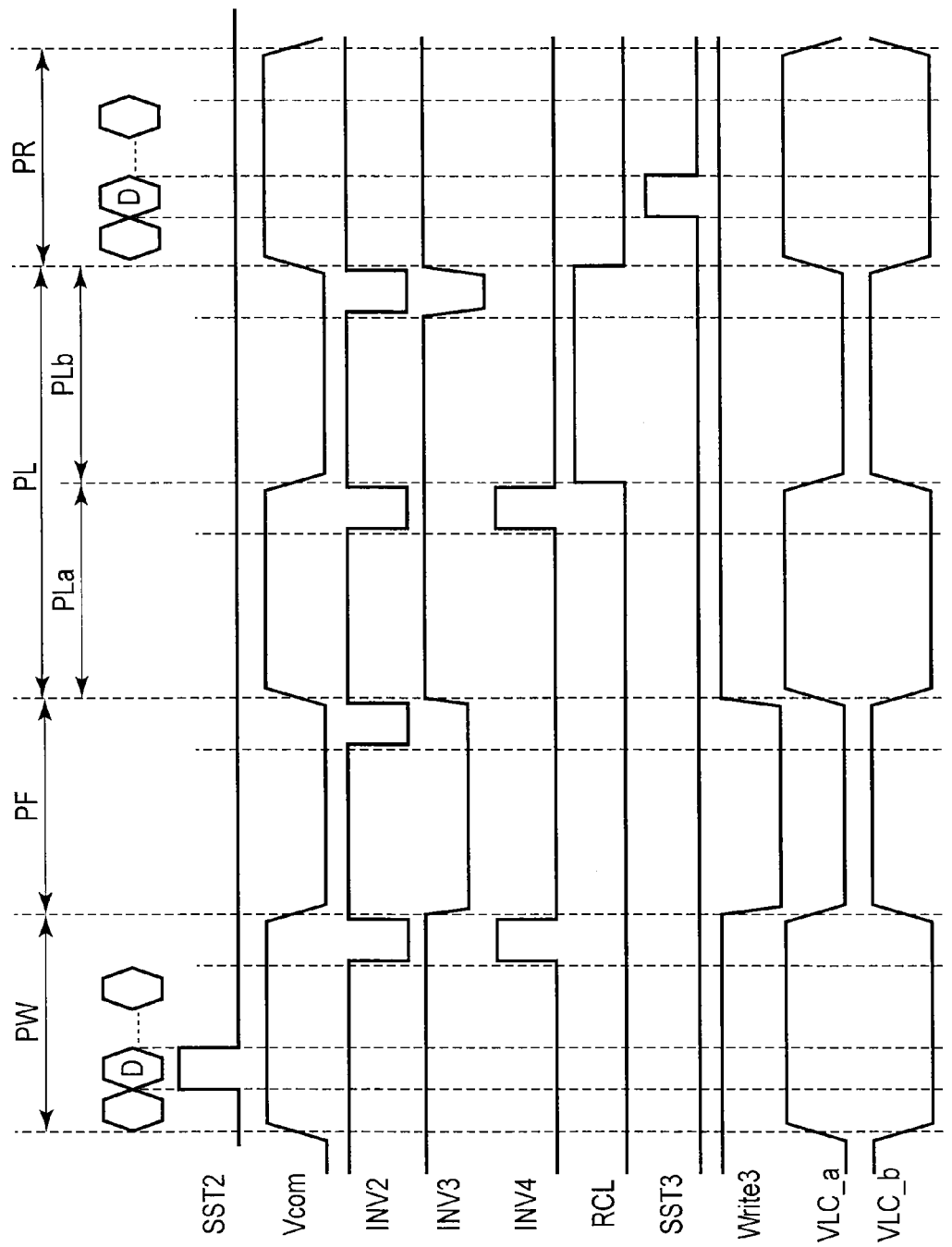
FIG. 18 is a timing chart showing various control signals and a counter voltage in a method of driving the display apparatus according to the seventh embodiment.

As shown in FIG. 18, the operation of the display apparatus 100 is divided into a first display signal writing operation in a first display signal V1 writing period PW, a format operation in a first memory M1 format period PF, an optical rewriting operation (rewriting operation) in an optical rewriting period PL (rewriting period), and a reading operation in a reading period PR.

The optical rewriting period PL can be said to be an input information detecting period. The optical rewriting operation is divided into an optical writing operation (second display signal rewriting operation) in an optical writing period PLa (second display signal V2 rewriting period), and an optical erasing operation (second display signal erasing operation) in an optical erasing period PLb (second display signal V2 erasing period).

The series of operations (operation periods) described above are arranged and shown for convenience in FIG. 18, and are not exclusively repeated in the shown order. A user switches to the optical writing operation or the optical erasing operation. Therefore, for example, the display apparatus 100 may operate without the optical erasing operation, and may operate to alternately repeat the optical writing operation and the optical erasing operation more than once.

As shown in FIG. 17 and FIG. 18, in writing, a second writing switch TR22 is switched to a conducting state by a control signal SST2, and a 0 V first display signal V1 corresponding to white display is supplied to a second memory M2 in the writing period PW.

In the format period PF as the subsequent timing, the collective erasing function shown in the sixth embodiment is used to collectively provide data for the first display signal V1 to the first memory M1 from the second memory M2 and collectively update the data in the first memory M1. The data in the first memory M1 can be updated in all the pixels PX.

According to the display apparatus having the above-described configuration and the method of driving the display apparatus in the seventh embodiment, it is possible to provide advantageous effects similar to those in the sixth embodiment described above. The format operation described above can reduce the load of writing into the memories (the first memory M1 and the second memory M2), and improve display failures such as writing unevenness. Moreover, it is possible to obtain considerable improvements such as the reduction in the number of elements (first writing switches TR21) of the pixel PX and the number of wirings (first control wirings CL1).

Consequently, it is possible to provide the display apparatus 100 which is high in the speed of processing the input positional information and which can be easily used by every user in every scene, and the method of driving the display apparatus.

Next, an example of how to use the display apparatuses 100 according to the third, fourth, fifth, sixth, and seventh embodiments is described. For example, the display apparatus 100 can be used as an electronic writing member that substitutes for a questionnaire or an application form. In the example shown in FIG. 19, the display apparatus 100 is used in place of a questionnaire.

As shown in FIG. 19, when the use of the display apparatus 100 is started, questionnaire data is first input to the first memory M1 and the second memory M2 of the pixel PX in step ST1. As a result, the questionnaire can be displayed in the screen.

Furthermore, in step ST2, data is written or erased by inputting data with the light pen LP. Thus, the filling of the questionnaire is completed. In step ST3 after the completion of the input with the light pen LP, it is then judged whether to store the data input to the first memory M1 in a memory outside a display panel.

To store the data input to the first memory M1 in the memory outside the display panel (step ST3), the process moves to step ST4. In step ST4, the data input to the first memory M1 is stored in the external memory (data storage). Further, in step ST5, to initialize the questionnaire (erase the data entered in the questionnaire), the data is provided to the first memory M1 from the second memory M2 in the pixel PX, and the data in the first memory M1 is initialized. Thus, the display apparatus 100 is set to a condition (screen) that can be used as a questionnaire again, and the use of the display apparatus 100 ends.

When the data input to the first memory M1 is not stored in the memory outside the display panel (step ST3), the process moves to step ST5, and the use of the display apparatus 100 ends.

The display apparatus 100 can construct data as long as the data in the questionnaire is updated, so that the display apparatus 100 can be used as a low-power-consumption electronic writing member.

The third, fourth, fifth, sixth, and seventh embodiments described above are illustrative only and are not intended to limit the scope of the invention. Modifications can be made to the components according to the third, fourth, fifth, sixth, and seventh embodiments described above without departing from the spirit thereof. Further, various inventions can be made by properly combining the components disclosed in the embodiments described above. For example, some of all the components shown in the embodiments may be eliminated. Moreover, components in different embodiments may be suitably combined together.

Figure 20:
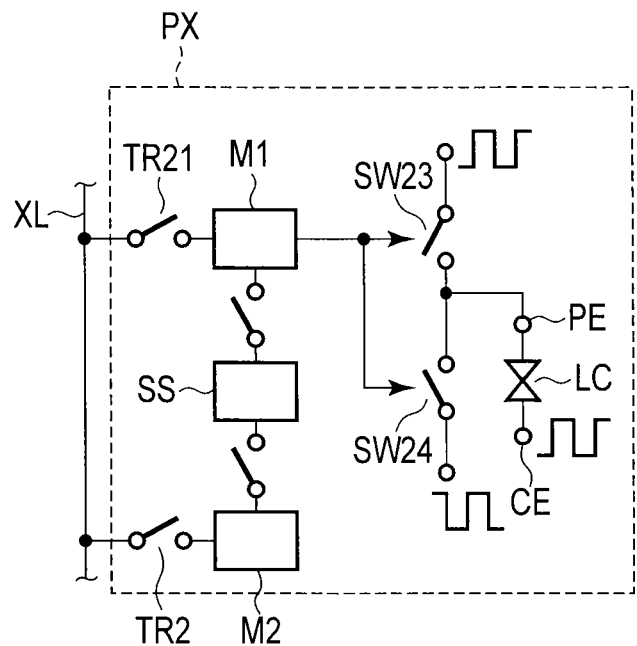
FIG. 20 is a circuit diagram schematically showing a modification of the pixel of the display apparatuses according to the third, fourth, fifth, sixth, and seventh embodiments.

For example, as shown in FIG. 20, the pixel PX may be formed without using the signal control switch N21.

Figure 21:
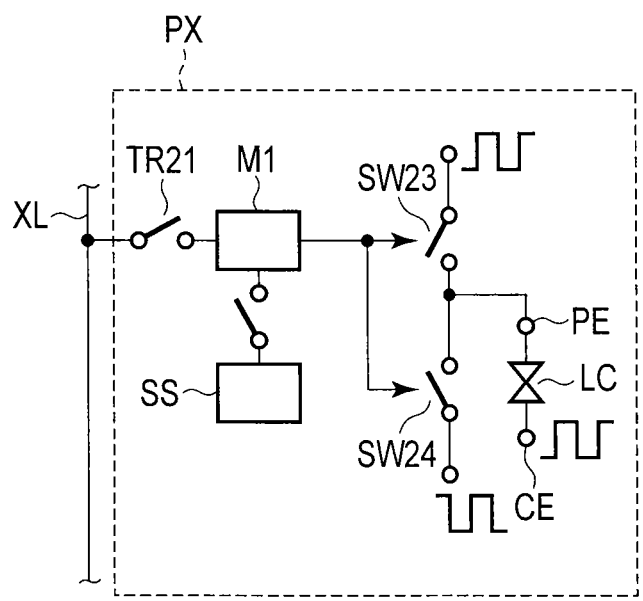
FIG. 21 is a circuit diagram schematically showing another modification of the pixel of the display apparatuses according to the third, fourth, fifth, sixth, and seventh embodiments.

Moreover, as shown in FIG. 21, the pixel PX may be formed without using the second memory M2 (the second writing switch TR22).

When the above-described display apparatus 100 is mounted on a device that comprises a memory capable of storing information regarding more than one screen, the screens in which characters and figures have been written in the past can be sequentially called from the memory, and the display (screen) in the display unit DYP can be switched to resemble turning pages in a notebook.

In this case, a page forward button and a page backward button are provided as an interface of the device equipped with the display apparatus 100. If the user operates these buttons, signals are supplied to the display apparatus 100 from the memory to switch the display of the screens.

The pixels PX constitute pixel groups comprising adjacent pixels PX. The pixel group may share one photosensor control circuit PH. In this case, the pixels PX (video display pixel circuits S1) are controlled by one photosensor control circuit PH. This is particularly advantageous when there is no demand for high definition and allows for simplification of a pixel circuit. In this case, each of the pixel groups may be constituted of two or more pixels PX.

The display apparatus 100 is not exclusively the reflective liquid crystal display apparatus that requires no backlight unit, and may be a transmissive liquid crystal display apparatus.

The display apparatus 100 is not exclusively the liquid crystal display apparatus adapted to the normally white mode, and may be a liquid crystal display apparatus adapted to a normally black mode.

Furthermore, the display apparatus 100 is not exclusively the liquid crystal display apparatus, and is applicable to various display apparatuses such as an organic EL display apparatus. In this case, advantageous effects similar to those in the embodiments described above are obtained.

For example, the organic EL display apparatus is configured so that the initial screen shows black display in the entire display unit DYP and shows, for example, white display in parts of the pixels PX that are irradiated by the light pen LP. In this case, a voltage is applied so that red, blue, and green organic EL elements emit light via photosensor circuits when irradiated by the light pen LP. In the case of the organic EL display apparatus, a common electrode facing the pixel electrode does not need to be driven by an alternating current.

The first memory M1 and the second memory M2 are not exclusively storage elements (e.g., one-bit SRAM). If the number of memories is increased, tone display is possible in addition to white display and black display. If the first memory M1 and the second memory M2 comprise dynamic random access memories (DRAM), multi-tone display is possible.

The first inverter ISW21 may be a clocked inverter.

Means for inputting to the display apparatus is not exclusively the light pen LP, and has only to be anything that emits light.

The sensor provided in the photosensor control circuit PH is not exclusively the photodiode, and may be any sensor that can substitute for the photodiode.

Next, matters associated with the third, fourth, fifth, sixth, and seventh embodiments described above and modifications thereof are shown in (1) to (16):

(1) A display apparatus comprising:
signal lines to be provided with a first display signal; and
pixels connected to the signal lines,
wherein each of the pixels comprises
a pixel electrode,
a first memory which rewrites to data for the first display signal or a second display signal provided thereto and holds the data,
a writing switch which is connected between the signal line and the first memory and switches whether to provide the data for the first display signal to the first memory,
a sensor circuit which is connected to the first memory and configured to provide the data for the second display signal to the first memory by detecting input information, and
a pixel control switch which is connected between the first memory and the pixel electrode and switches the level of a voltage applied to the pixel electrode in accordance with the data for the first display signal or the data for the second display signal input from the first memory.

(2) The display apparatus according to (1), further comprising:
a second memory which is connected to the sensor circuit and holds the data for the first display signal provided thereto; and
an additional writing switch which is connected between the signal line and the second memory and switches whether to provide the data for the first display signal to the second memory,
wherein the sensor circuit is configured to provide the data for the second display signal or the data for the first display signal to the first memory by detecting the input information.

(3) The display apparatus according to (2), further comprising:
a signal control switch which is connected between the first memory and the pixel control switch and switches whether to provide the pixel control switch with the first display signal or the second display signal output from the first memory.

(4) The display apparatus according to (3), wherein the first memory comprises a first inverter which includes an input terminal connected to the writing switch, and a second inverter which includes an output terminal connected to the writing switch and is a clocked inverter circularly connected to the first inverter, and
the signal control switch and the second inverter are driven under the control of a common control signal.

(5) The display apparatus according to (1), wherein the sensor circuit comprises a photodiode including an anode connected to the first memory and a cathode to be provided with the second display signal, and is configured to provide the data for the second display signal to the first memory by detecting the illumination of incident light.

(6) The display apparatus according to any one of (2) to (4), wherein the sensor circuit comprises
a first photodiode including an anode and a cathode which is connected to the first memory,
a second photodiode including a cathode and an anode which is connected to the first memory,
a first output control switch which is connected between the second memory and the anode of the first photodiode and switches whether to provide the data for the first display signal held in the second memory to the anode of the first photodiode,
a second output control switch which is connected to the cathode of the second photodiode and switches whether to provide the second display signal provided thereto to the cathode of the second photodiode, and
a third output control switch which is connected between the anode of the second photodiode and the first memory, and
the first output control switch, and the second and third output control switches are switched to a conducting state in different periods.

(7) The display apparatus according to any one of (2) to (4), wherein the sensor circuit comprises
a first output control switch which is formed by a transistor and includes a source electrode connected to the second memory, a drain electrode connected to the first memory and a gate electrode,
a second output control switch which is formed by a transistor and includes a source electrode provided with the second display signal and a drain electrode connected to the first memory and a gate electrode,
a first photodiode including an anode connected to the gate electrode of the first output control switch and a cathode provided with a signal that is configured to switch the first output control switch to a conducting state, and
a second photodiode including a cathode connected to the gate electrode of the second output control switch and an anode provided with a signal that is configured to switch the second output control switch to a conducting state, and
the first output control switch and second output control switch are switched to a conducting state in different periods.

(8) The display apparatus according to (4), further comprising:
an X-driver which is connected to the signal lines and provides the first display signal to the signal lines;
a Y-driver which drives the writing switch and the pixel control switch;
a memory operating circuit which controls the operation of the first memory;
a converter circuit which is connected to the signal lines and converts signals supplied in parallel from the signal lines to serial signals and then outputs the serial signals; and
a controller which controls the operations of the X-driver, the Y-driver, and the converter circuit.

(9) The display apparatus according to (4), further comprising:
a memory operating circuit which outputs the control signal automatically adjusted in accordance with environment light and controls the operation of the first memory.

(10) The display apparatus according to (9), wherein the memory operating circuit comprises
a third memory which is formed of elements similar to elements forming the first memory and holds data for the detection signal provided thereto,
an environment light sensor circuit which is formed of elements similar to elements forming the sensor circuit, includes a photodiode and is configured to provide the third memory with the data for the detection signal corresponding to the illumination of incident environment light, and
a control circuit which is connected to the third memory, performs a logical operation on the basis of data for a reference signal serving as the reference for the automatic adjustment of the control signal and on the basis of data for an output signal provided from the third memory, and outputs the automatically adjusted control signal.

(11) The display apparatus according to any one of (2) to (4), wherein the sensor circuit comprises a first output control switch which is formed by a transistor and includes a source electrode connected to the second memory, a drain electrode connected to the first memory and a gate electrode, a second output control switch which is formed by a transistor and includes a source electrode provided with the second display signal, a drain electrode connected to the first memory and a gate electrode, a photodiode including a cathode connected to the gate electrode of the second output control switch and an anode provided with a signal that is configured to switch the second output control switch to a conducting state, and a third output control switch which switches whether to provide the gate electrode of the first output control switch with a provided signal that is configured to switch the first output control switch to a conducting state, and the first output control switch and second output control switch are switched to a conducting state in different periods.

(12) The display apparatus according to (1), wherein the sensor circuit is connected between the writing switch and the first memory and configured to provide the first memory with the data for the first display signal or the data for the second display signal that is provided to the sensor circuit.

(13) A method of driving a display apparatus, the display apparatus comprising signal lines to be provided with a first display signal, and pixels connected to the signal lines, each of the pixels comprising a pixel electrode, a first memory which rewrites to data for the first display signal or a second display signal provided thereto and holds the data, a writing switch which is connected between the signal line and the first memory and switches whether to provide the data for the first display signal to the first memory, a sensor circuit which is connected to the first memory and configured to provide data for the second display signal to the first memory by detecting a input information, and a pixel control switch which is connected between the first memory and the pixel electrode and switches the level of a voltage applied to the pixel electrode in accordance with the data for the first display signal or the data for the second display signal input from the first memory, the method comprising:

in a period of writing the first display signal,
providing the first display signal to the signal line;
switching the writing switch to a conducting state, writing the data for the first display signal into the first memory, and switching the level of the voltage applied to the pixel electrode in accordance with the data for the first display signal input from the first memory; and in a period of writing the second display signal after the period of writing the first display signal,
switching the writing switch to a nonconducting state, providing the data for the second display signal to the first memory by detecting the input information in the sensor circuit, rewriting the data in the first memory to the data for the second display signal, and switching the level of the voltage applied to the pixel electrode in accordance with the data for the second display signal input from the first memory.

(14) The method of driving the display apparatus according to (13), the display apparatus further comprising a second memory which is connected to the sensor circuit and holds the data for the first display signal provided thereto, and an additional writing switch which is connected between the signal line and the second memory and switches whether to provide the data for the first display signal to the second memory, wherein in the period of writing the first display signal,
the additional writing switch is further switched to a conducting state, and the data for the first display signal is written into the second memory, and in a period of erasing the second display signal after the period of writing the second display signal,
the input information is detected by the sensor circuit to provide the data for the first display signal in the second memory to the first memory, the data for the second display signal rewritten in the first memory is erased, the data in the first memory is restored to the data for the first display signal, and the level of the voltage applied to the pixel electrode is switched in accordance with the data for the first display signal input from the first memory.

(15) The method of driving display apparatus according to (13), the display apparatus further comprising an output inverter which includes an input terminal connected to the first memory and an output terminal connected to the signal line and is configured to output the data in the first memory to the signal line, wherein in a reading period,
the output inverter outputs the data for the first display signal or the second display signal in the first memory to the signal line, and outputs the data for the first display signal or the second display signal to the outside via the signal line.

(16) The display apparatus driving method according to (13), the display apparatus further comprising a second memory which is connected to the sensor circuit and holds the data for the first display signal provided thereto, and an additional writing switch which is connected between the signal line and the second memory and switches whether to provide the data for the first display signal to the second memory, wherein in the period of writing the first display signal,
the additional writing switch is further switched to a conducting state, and the data for the first display signal is written into the second memory, and in a period of erasing the second display signal after the period of writing the second display signal,
the writing switch and the additional writing switch are switched to a nonconducting state, the sensor circuit is switched to provide the data for the first display signal in the second memory to the first memory, the data for the second display signal rewritten in the first memory is erased, the data in the first memory is restored to the data for the first display signal, and the level of the voltage applied to the pixel electrode is switched in accordance with the data for the first display signal input from the first memory.

Hereinafter, a display apparatus and a method of driving the display apparatus according to an eighth embodiment will be described in detail with reference to the drawings. In this embodiment, the display apparatus is a reflective liquid crystal display apparatus, and is adapted to a normally white mode. It is to be noted that FIG. 1 and the explanation of FIG. 1 are also applicable to this embodiment.

However, in this embodiment, a memory operating circuit 18 controls the operation of a second memory M2 described later.

Figure 22:
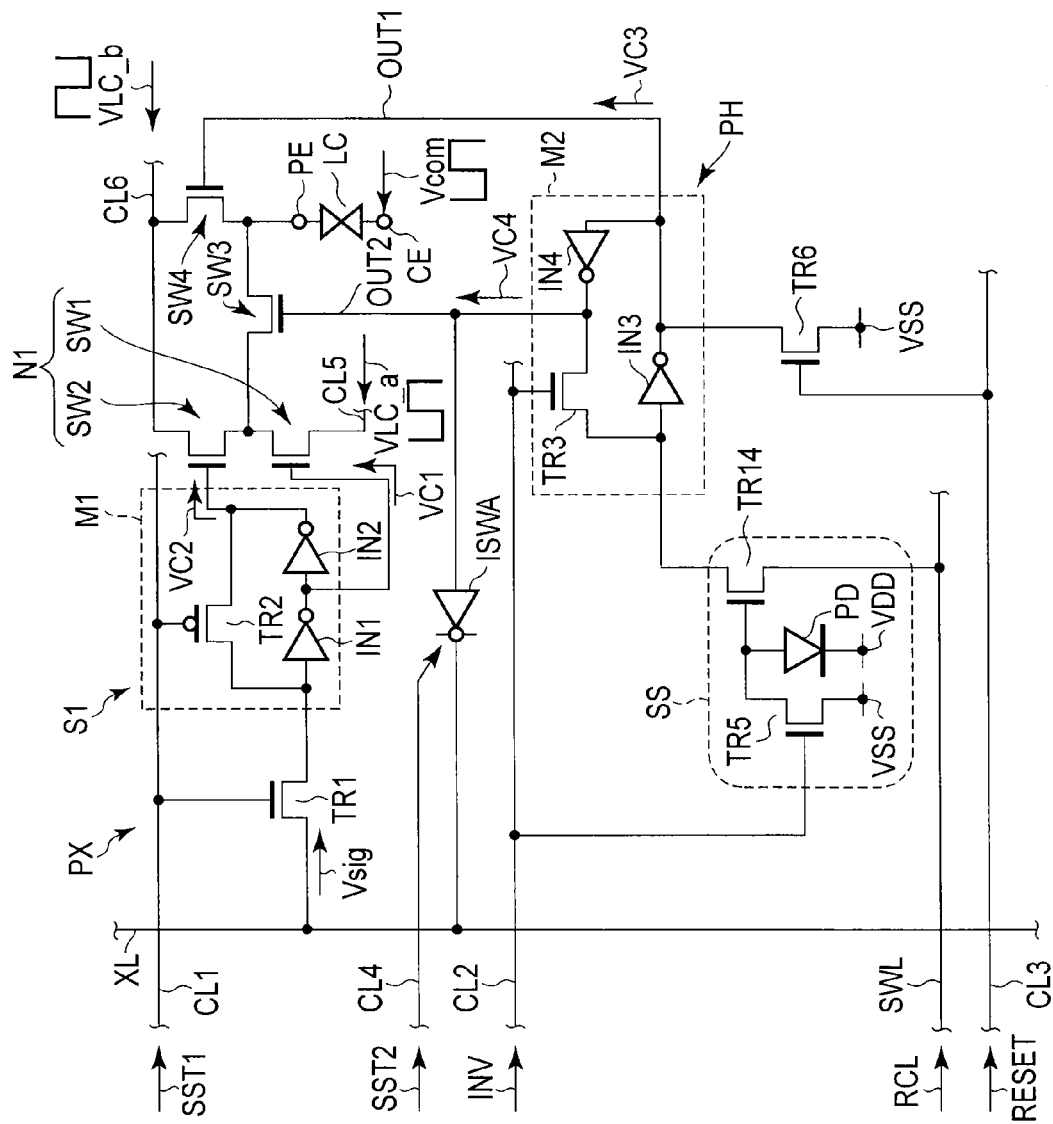
FIG. 22 is a diagram showing an equivalent circuit of a pixel in a display apparatus according to an eighth embodiment.

As shown in FIG. 1 and FIG. 22, each of pixels PX of a display unit DYP comprises, on the side of an array substrate SB1, a pixel electrode PE, a first memory M1, the second memory M2, a photosensor circuit SS as a sensor circuit, a display signal control circuit N1, and pixel control switch (SW3 and SW4).

The pixel electrode PE has the same configuration as that in the first embodiment described above.

The use of such a reflective liquid crystal display apparatus (pixel electrode PE) makes it possible to provide advantageous effects similar to those in the embodiments described above.

A counter substrate SB2 has the same configuration as that in the first embodiment described above.

On the array substrate SB1, there are formed first transistors TR1 as writing switches, signal lines XL arranged to extend along a column direction in which the pixels PX are arranged, first control wirings CL1, second transistors TR2 as loop current control switches, first inverters IN1, and second inverters IN2.

The signal lines XL are connected to the pixels PX. The signal lines XL are electrically connected on one end to the X-driver XD and the converter circuit 16. A video signal Vsig for video data is provided to the signal lines XL from the X-driver XD. The video signal Vsig is used as a display signal.

The display signal is not exclusively the video signal Vsig, and may be an image signal (video signal) indicating characters and figures written in the past, or may be a signal corresponding to white display.

Although described later, a voltage (signal) equivalent (corresponding) to a voltage (signal) applied to the pixel electrode PE is supplied to the converter circuit 16 via a later-described clocked inverter ISWA and the signal line XL. The first control wiring lines CL1 are electrically connected on one end to the Y-driver YD.

The first transistor TR11 is an N-type thin film transistor comprising a polysilicon layer as a semiconductor layer. The first transistor TR11 includes a gate electrode electrically connected to the first control wiring CL1, a source electrode electrically connected to the signal line XL, and a drain electrode electrically connected to the first memory M1. A control signal SST1 output from the Y-driver YD to control the operation of the first transistor TR11 is provided to the gate electrode of the first transistor TR11 via the first control wiring CL1. Thus, the first transistor TR11 provides the video signal Vsig to the first memory M1, and switches whether to write data for the video signal Vsig into the first memory M1.

The first memory M1 is an SRAM as a static memory. The first memory M1 holds data for the video signal Vsig. The first memory M1 comprises the first inverter IN1, the second inverter IN2, and the second transistor TR2 that are connected in a loop form.

The first inverter IN1 includes an input terminal connected to the drain electrode of the first transistor TR1, and an output terminal. The second inverter IN2 includes an input terminal connected to the output terminal of the first inverter IN1, and an output terminal.

The second transistor TR2 is a P-type thin film transistor comprising a polysilicon layer as a semiconductor layer. The second transistor TR2 includes a gate electrode electrically connected to the first control wiring line CL1, a source electrode electrically connected to the input terminal of the first inverter IN1, and a drain electrode electrically connected to the output terminal of the second inverter IN2.

A control signal SST1 is provided to the gate electrode of the second transistor TR2 via the first control wiring CL1. The second transistor TR2 thereby controls a current that loops the first inverter IN1 and the second inverter IN2.

The first memory M1 outputs an output signal VC1 and an output signal VC2 to the display signal control circuit N1. The voltage level of the output signal VC1 is 5 V corresponding to white display or 0 V corresponding to black display. The waveform of the output signal VC2 is a reversed-phase waveform of the output signal VC1. Here, the voltage level of the output signal VC2 is 5 V in a period in which the voltage level of the output signal VC1 is 0 V, and the voltage level of the output signal VC2 is 0 V in a period in which the voltage level of the output signal VC1 is 5 V.

On the array substrate SB1, there are formed the display signal control circuits N1, fifth control wirings CL5, sixth control wirings CL6, and the first output switch SW3 and the second output switch SW4 of pixel control switch. The fifth control wiring CL5 and the sixth control wiring CL6 each have one end electrically connected to the Y-driver YD.

The display signal control circuit N1 is connected between the first memory M1 and the pixel control switch. The display signal control circuit N1 switches whether to provide the pixel control switch with the video signal Vsig output from the first memory M1.

More specifically, the display signal control circuit N1 includes a first switch SW1 and a second switch SW2.

The first switch SW1 comprises an N-type thin film transistor, and includes a gate electrode connected to the output terminal of the first inverter IN1, a source electrode connected to the fifth control wiring CL5, and a drain electrode connected to the first output switch SW3. The first switch SW1 switches whether to provide the first output switch SW3 with a control signal VLC_a input from the Y-driver YD via the fifth control wiring CL5 in accordance with the output signal VC1 input from the first memory M1.

The second switch SW2 comprises an N-type thin film transistor, and includes a gate electrode connected to the output terminal of the second inverter IN2, a source electrode connected to the sixth control wiring CL6, and a drain electrode connected to the first output switch SW3. The second switch SW2 switches whether to provide the first output switch SW3 with a control signal VLC_b input from the Y-driver YD via the sixth control wiring CL6 in accordance with the output signal VC2 input from the first memory M1.

The pixel control switch is connected between the display signal control circuit N1 (first memory M1) and the pixel electrode PE. The pixel control switch switches the level of a voltage applied to the pixel electrode PE in accordance with the output signal VC1 and the output signal VC2 input from the second memory M2.

More specifically, the first output switch SW3 comprises an N-type thin film transistor, and includes a source electrode connected to the drain electrodes of the first and second SW1 and SW2, a drain electrode connected to the pixel electrode PE, and a gate electrode connected to an output wiring OUT2.

The first output switch SW3 switches whether to provide the control signal VLC_a or the control signal VLC_b to the pixel electrode PE in accordance with an output signal VC4 input from the second memory M2 via the output wiring OUT2.

The second output switch SW4 comprises an N-type thin film transistor, and includes a source electrode connected to the sixth control wiring CL6, a drain electrode connected to the pixel electrode PE, and a gate electrode connected to an output wiring OUT1.

The second output switch SW4 switches whether to provide the pixel electrode PE with the control signal VLC_b input from the Y-driver YD via the sixth control wiring CL6 in accordance with an output signal VC3 input from the second memory M2 via the output wiring OUT1.

The control signal VLC_a or the control signal VLC_b is provided to the pixel electrode PE. Here, the control signal VLC_a has a waveform in phase with a counter voltage Vcom and corresponds to white display, and the control signal VLC_b has a waveform in reverse phase to that of the counter voltage Vcom and corresponds to black display.

On the array substrate SB1, there are formed photodiodes PD which are photosensors as sensors, fourth transistors TR4 as rewriting switches, fifth transistors TR5 as switches for controlling a leakage path, control wirings SWL, and second control wirings CL2. The control wirings SWL are electrically connected on one end to the Y-driver YD. The second control wirings CL2 are electrically connected on one end to the memory operating circuit 18.

The photosensor circuit SS is connected to the second memory M2. The photosensor circuit SS detects input information. The photosensor circuit SS provides data for a control signal RCL to the second memory M2 when detecting input information. That is, the data in the second memory M2 can be rewritten to the data for the control signal RCL. More specifically, the photosensor circuit SS can rewrite the data in the second memory M2 to the data for the control signal RCL by detecting the illumination of incident light.

The photosensor circuit SS comprises the photodiode PD, the fourth transistor TR4, and the fifth transistor TR5.

The photodiode PD includes an anode, and a cathode connected to a high potential power supply VDD as a power supply. The photodiode PD generates a leakage current in accordance with the illumination of incident light.

The fourth transistor TR4 is an N-type thin film transistor comprising a polysilicon layer as a semiconductor layer. The fourth transistor TR4 includes a gate electrode electrically connected to the anode of the photodiode PD, a source electrode electrically connected to the control wiring SWL, and a drain electrode electrically connected to the second memory M2. The fourth transistor TR4 switches whether to output the control signal RCL to the second memory M2.

In response to the generation of the leakage current in the photodiode PD, a power supply voltage (high-level voltage) is provided to the gate electrode of the fourth transistor TR4 from the high potential power supply VDD. Accordingly, the fourth transistor TR4 is switched to a conducting state, and outputs the control signal RCL input from the control wiring SWL to the second memory M2.

Here, the control signal RCL is used as a detection signal. The voltage level of the control signal RCL is low (e.g., 0 V) in a later-described optical writing period, and switched to a high level (e.g., 5 V) in a later-described optical erasing period.

The fifth transistor TR5 is an N-type thin film transistor comprising a polysilicon layer as a semiconductor layer. The fifth transistor TR5 includes a gate electrode electrically connected to the second control wiring CL2, a source electrode electrically connected to a low potential power supply VSS (ground potential) as a power supply, and a drain electrode electrically connected to the anode of the photodiode PD. The fifth transistor TR5 switches whether to form a path for the leakage current generated in the photodiode PD. The fifth transistor TR5 is switched to a conducting state such that the fourth transistor TR4 can be switched to a nonconducting state.

On the array substrate SB1, there are formed third transistors TR3 as loop current control switches, third inverters IN3, and fourth inverters IN4.

The second memory M2 is an SRAM as a static memory. The second memory M2 holds the data for the control signal RCL (detection signal). The second memory M2 comprises the third inverter IN3, the fourth inverter IN4, and the third transistor TR3 that are connected in a loop form.

The third inverter IN3 includes an input terminal connected to the drain electrode of the fourth transistor TR4, and an output terminal connected to the output wiring OUT1. The fourth inverter IN4 includes an input terminal connected to the output terminal of the third inverter IN3, and an output terminal connected to the output wiring OUT2.

The third transistor TR3 is an N-type thin film transistor comprising a polysilicon layer as a semiconductor layer. The third transistor TR3 includes a gate electrode connected to the second control wiring CL2, a source electrode connected to the output terminal of the fourth inverter IN4, and a drain electrode connected to the input terminal of the third inverter IN3.

A second memory control signal INV output from the memory operating circuit 18 to control the operation of the third transistor TR3 is provided to the gate electrode of the third transistor TR3 via the third control wiring CL3. The third transistor TR3 controls a current that loops the third inverter IN3 and the fourth inverter IN4. In a period in which the voltage level of the second memory control signal INV is high (e.g., 5 V), the second memory M2 is in a current-loop state and can hold data.

The second memory M2 outputs the output signal VC3 and the output signal VC4 to the pixel control switch. The voltage levels of the output signal VC3 and the output signal VC4 are a high level (e.g., 5 V) or a low level (e.g., 0 V). The waveform of the output signal VC4 is a reversed-phase waveform of the output signal VC3. The voltage level of the output signal VC4 is low in a period in which the voltage level of the output signal VC3 is high, and the voltage level of the output signal VC4 is low in a period in which the voltage level of the output signal VC3 is high.

On the array substrate SB1, there are formed sixth transistors TR6 as reset switches, and third control wirings CL3. The third control wirings CL3 are electrically connected on one end to the Y-driver YD.

The sixth transistor TR6 is an N-type thin film transistor comprising a polysilicon layer as a semiconductor layer. The sixth transistor TR6 includes a gate electrode electrically connected to the third control wiring CL3, a source electrode electrically connected to the low potential power supply VSS (ground potential) as a power supply, and a drain electrode electrically connected to the output wiring OUT1 and the input terminal of the fourth inverter IN4 of the second memory M2.

A reset signal RESET output from the Y-driver YD is provided to the gate electrode of the sixth transistor TR6 via the third control wiring CL3. If the voltage level of the reset signal RESET is switched to a high level (e.g., 5 V), the sixth transistor TR6 is switched to a conducting state. Accordingly, a signal at a voltage level (0 V) that initializes the data in the second memory M2 is provided to the second memory M2 (the input terminal of the fourth inverter IN4) from the low potential power supply VSS. Thus, the second memory M2 is initialized when the voltage level of the reset signal RESET is switched to a high level. This corresponds to a later-described collective erasing operation.

In consequence, the second memory M2 outputs the low-level output signal VC3 and the high-level output signal VC4 in an initial state or initialized state, switches the first output switch SW3 to a conducting state, and switches the second output switch SW4 to a nonconducting state. A signal (the control signal VLC_a or the control signal VLC_b) associated with the data for the video signal Vsig stored in the first memory M1 is then provided to the pixel electrode PE.

When the low-level control signal RCL is input to the second memory M2 in the optical writing period, the second memory M2 outputs the high-level output signal VC3 and the low-level output signal VC4, switches the first output switch SW3 to a nonconducting state, and switches the second output switch SW4 to a conducting state. A signal (the control signal VLC_b) associated with the data for the control signal RCL stored in the second memory M2 is then provided to the pixel electrode PE.

When the high-level control signal RCL is input to the second memory M2 in the optical erasing period, the second memory M2 outputs the low-level output signal VC3 and the high-level output signal VC4, switches the first output switch SW3 to a conducting state, and switches the second output switch SW4 to a nonconducting state. A signal (the control signal VLC_a or the control signal VLC_b) associated with the data for the video signal Vsig stored in the first memory M1 is then provided to the pixel electrode PE.

On the array substrate SB1, there are formed clocked inverters ISWA as output inverters, and fourth control wirings CL4. The fourth control wirings CL4 are electrically connected on one end to the Y-driver YD.

The clocked inverter ISWA includes an input terminal connected to the output terminal of the fourth inverter IN4 of the second memory M2, and an output terminal connected to the signal line XL.

A control signal SST2 output from the Y-driver YD is input to the clocked inverter ISWA, and the operation of the clocked inverter ISWA is controlled. The clocked inverter ISWA can output the data in the second memory M2 to the signal line XL. The data in the second memory M2 output to the signal line XL is output to the outside of a panel via the X-driver XD and the converter circuit 16, and stored, for example, in an unshown storage medium (e.g., an SD card).

The pixel PX having the configuration described above can be roughly classified into a video display pixel circuit S1 and a photosensor control circuit PH as a sensor control circuit. The video display pixel circuit S1 includes the first transistor TR1, the first memory M1, the display signal control circuit N1, and the pixel control switch (SW3 and SW4). The photosensor control circuit PH includes the photosensor circuit SS, the second memory M2, and the sixth transistor TR6.

Now, the operation of the display apparatus 100 is described. The operation of the display apparatus 100 is controlled by a timing controller TCON. In the display apparatus 100 according to the present embodiment, characters and figures are written into the display unit DYP in accordance with positional information input by applying light to the display unit DYP with a light pen (pen-shaped light) LP. When the power supply is activated, a signal (0 V) corresponding to white display is supplied to the signal line XL as an initial signal. The initial signal is different from the video signal Vsig.

Figure 23:
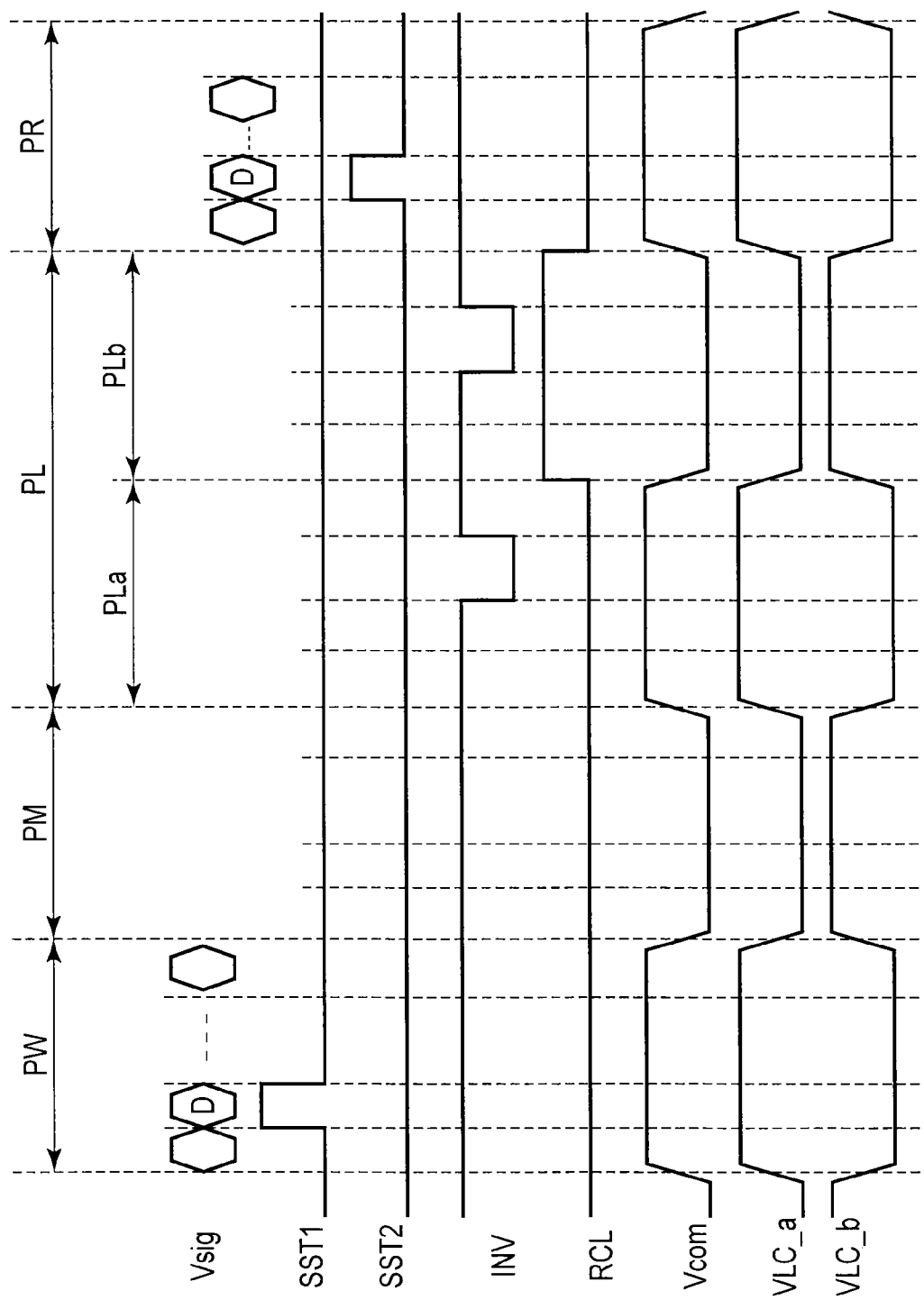
FIG. 23 is a timing chart showing various control signals and a counter voltage in a method of driving the display apparatus according to the eighth embodiment.

As shown in FIG. 23, the operation of the display apparatus 100 is divided into a display signal writing operation in a display signal (video signal Vsig) writing period PW, a memory operation in a memory period PM, an optical rewriting operation (rewriting operation) in an optical rewriting period PL (rewriting period), and a reading operation in a reading period PR.

The optical rewriting period PL can be said to be an input information detecting period. The optical rewriting operation is divided into an optical writing operation (writing operation) in an optical writing period PLa (writing period), and an optical erasing operation (erasing operation) in an optical erasing period PLb (erasing period).

The series of operations (operation periods) described above and are arranged and shown for convenience in FIG. 23, and are not exclusively repeated in the shown order. Although described later, a user switches to the optical writing operation or the optical erasing operation. Therefore, for example, the display apparatus 100 may operate without the optical erasing operation, and may operate to alternately repeat the optical writing operation and the optical erasing operation more than once.

As shown in FIG. 22 and FIG. 23, in writing, the second memory control signal INV provided to the second control wiring line CL2 in the writing period PW is at a high level. Thus, the third and fifth transistors TR3 and TR5 are switched to a conducting state. In an initial state, the second memory M2 switches the first output switch SW3 to a conducting state, and switches the second output switch SW4 to a nonconducting state.

The voltage level of the counter voltage Vcom applied to the counter electrode CE alternately switches between a high-level voltage and a low-level voltage at given periods. The voltage levels of the control signals VLC_a and VLC_b alternately switch between a high-level voltage and a low-level voltage at given periods to correspond to the period at which the voltage level of the counter voltage Vcom is switched.

The control signal VLC_a and the control signal VLC_b are controlled to be at levels opposite to each other. That is, in a period in which the voltage level of the counter voltage Vcom is high, the voltage level of the control signal VLC_a is high, and the voltage level of the control signal VLC_b is low. In a period in which the voltage level of the counter voltage Vcom is low, the voltage level of the control signal VLC_b is high, and the voltage level of the control signal VLC_a is low.

In the writing period PW, the voltage level of the control signal SST2 provided to the clocked inverter ISWA is low.

In the case of writing, first, the first transistor TR1 is switched to a conducting state by the switch of the voltage level of the control signal SST1 to a high level, and the video signal Vsig is supplied to the first memory M1. The voltage level of the control signal SST1 is switched to a low level after the video signal Vsig is provided to the first memory M1 from the signal line XL.

Accordingly, the first transistor TR1 is switched to a nonconducting state (off), and the second transistor TR2 is switched to a conducting state (on). Thus, the first memory M1 is looped, and the data for the video signal Vsig is held in the first memory M1. The voltage levels of the video signal Vsig include a low level (e.g., 0 V) corresponding to white display and a high level (e.g., 5 V) corresponding to black display.

For example, suppose that the low-level video signal Vsig is held in the first memory M1. The first memory M1 provides the high-level output signal VC1 to the gate electrode of the first switch SW1, provides the low-level output signal VC2 to the gate electrode of the second switch SW2, thereby controlling the first switch SW1 and the second switch SW2.

Thus, the first switch SW1 is switched to a conducting state, and the second switch SW2 is switched to a nonconducting state, so that the control signal VLC_a at a voltage level corresponding to white display is selected. The control signal VLC_a is provided to the pixel electrode PE via the first switch SW1 and the first output switch SW3 which is in a conducting state. This condition is maintained by the memory operation.

In the case of optical writing in the optical writing period PLa, the voltage level of the second memory control signal INV provided to the second control wiring CL2 is switched to a low level. Accordingly, the third and fifth transistors TR3 and TR5 are switched to a nonconducting state.

If light is applied to the photosensor circuit SS by input with the light pen LP in this condition, a leakage current runs through the photodiode PD. As a result, the low-level control signal RCL is provided to the second memory M2 via the fourth transistor TR4.

If the voltage level of the second memory control signal INV is then switched to a high level, the third and fifth transistors TR3 and TR5 are switched to a conducting state. Thus, the second memory M2 is looped, and the data for the control signal RCL is held in the second memory M2. In addition, the fourth transistor TR4 is kept in a nonconducting state.

The second memory M2 holding the data for the low-level control signal RCL provides the high-level output signal VC3 to the gate electrode of the second output switch SW4, and provides the low-level output signal VC4 to the gate electrode of the first output switch SW3, thereby controlling the first output switch SW3 and the second output switch SW4.

Accordingly, the first output switch SW3 is switched to a nonconducting state, the second output switch SW4 is switched to a conducting state, and the control signal VLC_b at a voltage level corresponding to black display is selected. The control signal VLC_b is then provided to the pixel electrode PE via the second output switch SW4.

When light is thus applied to the photosensor circuit SS from the light pen LP, the signal applied to the pixel electrode PE is switched to the control signal VLC_b corresponding to black display in accordance with the period of the second memory control signal INV.

When the data for the low-level control signal RCL is stored in the second memory M2 in advance, black display is set before writing with the light pen LP.

The display apparatus 100 can normally hold data in pixel memories (the first memory M1 and the second memory M2), and therefore its frequency can be decreased to 1 Hz or less, for example. This enables lower power consumption in the display apparatus 100. As shown in FIG. 23, the rewriting with the light pen LP can be controlled by the second memory control signal INV independently of the control signals VLC_a and VLC_b. The frequency of the second memory control signal INV is different from the frequencies of the control signals VLC_a and VLC_b, and can therefore be set to a frequency suitable for handwriting input. If the second memory control signal INV is adapted to the use of the light pen LP, the frequency of the second memory control signal INV has only to be increased during the use of the light pen LP, which enables both lower power consumption and handwriting input.

In the case of optical erasing in the optical erasing period PLb, the voltage level of the control signal RCL provided to the control wiring line SWL is high.

Here, the user can operate an interface such as a button mounted on the display apparatus 100 (provided in the display apparatus 100) to switch to optical writing or optical erasing in the display unit DYP. An external command signal corresponding to the user operation is provided to the timing controller TCON via a flexible substrate 20. The timing controller TCON switches the control signal RCL in accordance with the provided command signal.

In order to erase the characters and figures written in the display unit DYP, light is applied to the photosensor circuit SS by input with the light pen LP in the optical erasing period PLb, so that a leakage current runs through the photodiode PD. Further, the voltage level of the second memory control signal INV is switched to a low level. As a result, the high-level control signal RCL is provided to the second memory M2 via the control wiring SWL and the fourth transistor TR4.

If the voltage level of the second memory control signal INV is then switched to a high level, the third and fifth transistors TR3 and TR5 are switched to a conducting state. Thus, the second memory M2 is looped, and the data for the high-level control signal RCL is held in the second memory M2. That is, the data in the second memory M2 is restored to the state before optical input. In addition, the fourth transistor TR4 is kept in a nonconducting state.

The second memory M2 holding the data for the high-level control signal RCL provides the low-level output signal VC3 to the gate electrode of the second output switch SW4, and provides the high-level output signal VC4 to the gate electrode of the first output switch SW3, thereby controlling the first output switch SW3 and the second output switch SW4.

Accordingly, the first output switch SW3 is switched to a conducting state, and the second output switch SW4 is switched to a nonconducting state. Thus, a signal (the control signal VLC_a or the control signal VLC_b) associated with the data for the video signal Vsig stored in the first memory M1 is provided to the pixel electrode PE.

In this way, the second memory M2 can control the first output switch SW3 and the second output switch SW4. Therefore, the characters and figures written in the display unit DYP can be erased by applying light to the written characters and figures from the light pen LP.

The optical erasing with the light pen LP is basically the same as the optical writing. However, as described above, the voltage level of the control signal RCL provided to the control wiring SWL is different. In the optical writing, the low-level control signal RCL is provided to the control wiring SWL. In the optical erasing, the high-level control signal RCL is provided to the control wiring SWL.

As described above, the data in the first memory M1 is configured to be unerasable by, for example, the light pen LP. Thus, characters (data) written on images of cartoons or an electronic newspaper with the light pen LP can be erased without erasing the original image (the video signal Vsig).

This is enabled by changing the voltage level of the control signal RCL, thereby permitting the simplification of a pixel circuit.

Reading is performed in the reading period PR. In order to output (read) data for the signal stored in the second memory M2, the voltage level of the second memory control signal INV is kept at a high level to hold the data in the second memory M2. Even if the user erroneously uses the light pen LP in the reading period PR, new data is not written into the second memory M2 because the fourth transistor TR4 is in a nonconducting state.

In this condition, the voltage level of the control signal SST2 input to the clocked inverter ISWA is switched to a high level, and the data stored in the second memory M2 is provided to the converter circuit 16 via the clocked inverter ISWA and the signal line XL.

The Y-driver YD sequentially switches the voltage level of the control signal SST2 to a high level for each row of the pixels PX, and the signal stored in the second memory M2 is provided to the converter circuit 16 for each row of the pixels PX. The converter circuit 16 converts the signal input in parallel for each row of the pixels PX to a serial signal. The signal may be divided into bits and thus processed to enhance resolution. The serial signal converted by the converter circuit 16 is output to the external via the flexible substrate 20.

If the externally output signal is then stored in an unshown storage medium, the characters and figures written in the display unit DYP can be saved. If the externally output signal is supplied to, for example, a printer, the characters and figures written in the display unit DYP can be printed and output on paper.

Although the case described above is based on the assumption that the signal corresponding to white display is first supplied to the pixel electrode PE in writing with the light pen LP, the signal first supplied to the pixel electrode PE may be a signal other than the signal corresponding to white display.

For example, when the signal output to the external via the flexible substrate 20 is stored in an external memory, the signal stored in the external memory may be provided to the X-driver XD via the flexible substrate 20 and an I/F processing circuit 14, and an initial screen may be formed. The characters and figures written in the past may be displayed on the screen in this way. In this case, the user can write information over the characters and figures written in the past, and additionally display the overwritten information on the screen.

The user can also select the collective erasing operation for collectively erasing the characters written in the display unit DYP. When the collective erasing operation is selected, the voltage level of the second memory control signal INV is switched to a low level, and the voltage level of the reset signal RESET is switched to a high level. Accordingly, the sixth transistor TR6 is switched to a conducting state, and a signal at a voltage level (0 V) that initializes the data in the second memory M2 is provided to the second memory M2 from the low potential power supply VSS.

If the voltage level of the second memory control signal INV is then switched to a high level, the third transistor TR3 is switched to a conducting state. Thus, the second memory M2 is looped, and the data in the second memory M2 is initialized. That is, the data in the second memory M2 is restored to the initial state before optical input.

In the collective erasing operation, all the pixels PX may be collectively erased, but the selected pixels PX alone may be collectively erased.

According to the display apparatus having the above-described configuration and the method of driving the display apparatus in the eighth embodiment, a signal is written into the pixel electrode PE by applying light to the display unit DYP with the light pen LP, so that the signal line XL is only driven when an image is switched. Therefore, when a still image is displayed, the X-driver XD has only to drive the signal line XL at the initial screen writing, thereby allowing lower power consumption.

As the photodiode PD (the photosensor control circuit PH) is disposed in each of the pixels PX, input positional information can be precisely detected. The information detected by the photodiode PD can be processed within the pixels PX without even being transferred to an external IC, so that the processing speed can be enhanced. Further, it is possible to provide the display apparatus 100 which is high in the speed of processing the input positional information and which can be easily used by every user in every scene, and the method of driving the display apparatus.

Next, a display apparatus and a method of driving the display apparatus according to a ninth embodiment will be described. It is to be noted that the configuration according to this embodiment is the same in other respects as that according to the eighth embodiment described above and that like components are provided with like reference signs and are not described in detail.

Nowadays, higher definition is required for display apparatuses of, for example, electronic books and smartphones, and the simplification of the pixel circuit is also required in the present display apparatus 100 for higher definition. When the required input resolution of the control signal RCL (detection signal) is not as high as that of the video signal Vsig, one photosensor control circuit PH may be configured to control four pixels PX (video display pixel circuits S1) as shown in FIG. 5.

Accordingly, the resolution of a picture (image) based on the input with the light pen LP is reduced by half as compared to the eighth embodiment described above, but the resolution of a picture based on the video signal Vsig can be increased.

The pixels PX are classified into any of the pixel groups. That is, the pixels PX constitute pixel groups comprising adjacent pixels PX. In this embodiment, a pixel group comprises four pixels PX. The (four) pixels PX of the pixel group share the photosensor control circuit PH.

The circuit configuration of the display apparatus 100 is described below.

As shown in FIG. 5, FIG. 24, and FIG. 25, a video display pixel circuit S1 includes a first transistor TR1, a first memory M1, a display signal control circuit N1, and a pixel control switch (SW3 and SW4). The first memory M1 holds data for the video signal Vsig. The display signal control circuit N1 controls a signal (a control signal VLC_a or a control signal VLC_b) provided to a first output switch SW3 in accordance with a signal provided from the first memory M1. The pixel control switch (SW3 and SW4) controls the voltage level of a pixel electrode PE.

The photosensor control circuit PH includes a second memory M2, a photosensor circuit SS, a sixth transistor TR6, and a clocked inverter ISWA. The second memory M2 holds the control signal RCL, and outputs signals for controlling the pixel control switch (SW3 and SW4). The photosensor circuit SS includes a photodiode PD, and controls the photodiode PD. The sixth transistor TR6 switches whether to restore data in the second memory M2 to an initial state. The clocked inverter ISWA provides the data held in the second memory M2 to the exterior.

By way of example, each of the pixels PX of the pixel group includes one video display pixel circuit S1, and each pixel group includes one photosensor control circuit PH. Moreover, the application of the configuration described above enables tone display in accordance with the area of the pixel electrode PE.

Displaying of an image on the basis of the video signal Vsig is described below. First, the first transistor TR1 of the video display pixel circuit S1 is switched to a conducting state by a control signal SST1, and the video signal Vsig is provided to the first memory M1 of the video display pixel circuit S1 from a signal line XL. A Y-driver YD sequentially switches the voltage level of the control signal SST1 to a high level for each row of the display pixels PX, and transfers the data to the first memory M1 for each row of the pixels PX.

The first memory M1 controls a first switch SW1 and a second switch SW2 in accordance with the voltage level of the video signal Vsig, and provides the control signal VLC_a or the control signal VLC_b to the first output switch SW3. The second memory M2 in an initial state switches the first output switch SW3 to a conducting state, and switches the second output switch SW4 to a nonconducting state. Thus, a signal (the control signal VLC_a or the control signal VLC_b) associated with the data in the first memory M1 is provided to the pixel electrode PE.

Next described is a case where the low-level control signal RCL corresponding to black display is provided to the second memory M2 from the photosensor circuit SS by the application of light with the light pen LP.

In this case, the second memory M2 of one photosensor control circuit PH outputs a high-level output signal VC3 and a low-level output signal VC4 to the pixel control switches (SW3 and SW4) of four video display pixel circuits S1.

Accordingly, the first output switch SW3 is switched to a nonconducting state, and the second output switch SW4 is switched to a conducting state. Thus, the control signal VLC_b corresponding to black display is provided to the pixel electrode PE.

The configuration described above simplifies the photosensor control circuit PH and enables the video signal Vsig to be adapted to higher-definition pictures (images).

The display apparatus 100 independently manages the data in the second memory M2 and the data for the video signal Vsig input to, for example, an external memory with the light pen LP. Therefore, when the data is viewed, for example, by an unshown external display apparatus (PC), it is necessary to generate data composed of the data for the video signal Vsig and the data (optical writing data) in the second memory M2.

According to the display apparatus having the above-described configuration and the method of driving the display apparatus in the ninth embodiment, it is possible to provide the display apparatus 100 which is high in the speed of processing input positional information and which can be easily used by every user in every scene, and the method of driving the display apparatus.

The eighth and ninth embodiments described above are illustrative only and are not intended to limit the scope of the invention. Modifications can be made to the components according to the eighth and ninth embodiments described above without departing from the spirit thereof. Further, various inventions can be made by properly combining the components disclosed in the embodiments described above. For example, some of all the components shown in the embodiments may be eliminated. Moreover, components in different embodiments may be suitably combined together.

For example, the display apparatus 100 is not exclusively the reflective liquid crystal display apparatus that requires no backlight unit, and may be a transmissive liquid crystal display apparatus. The sensor provided in the photosensor control circuit PH includes only to be one photodiode PD and requires no other sensors, thereby contributing to the improvement in the opening ratio of the pixel.

The display apparatus 100 is not exclusively the liquid crystal display apparatus adapted to the normally white mode, and may be a liquid crystal display apparatus adapted to a normally black mode.

Furthermore, the display apparatus 100 is not exclusively the liquid crystal display apparatus, and is applicable to various display apparatuses such as an organic EL display apparatus. In this case, advantageous effects similar to those in the embodiments described above are obtained.

For example, the organic EL display apparatus is configured so that the initial screen shows black display in the entire display unit DYP and shows, for example, white display in parts of the pixels PX that are irradiated by the light pen LP. In this case, a voltage is applied so that red, blue, and green organic EL elements emit light via photosensor circuits when irradiated by the light pen LP. In the case of the organic EL display apparatus, a common electrode facing the pixel electrode does not need to be driven by an alternating current.

The first memory M1 and the second memory M2 are not exclusively storage elements (e.g., one-bit SRAM). If the number of memories is increased, tone display is possible in addition to white display and black display. If the first memory M1 and the second memory M2 comprise dynamic random access memories (DRAM), multi-tone display is possible.

Means for inputting to the display apparatus is not exclusively the light pen LP, and has only to be anything that emits light.

The sensor provided in the photosensor control circuit PH is not exclusively the photodiode, and may be any sensor that can substitute for the photodiode.

Each pixel group may include two pixels PX, three pixels PX, or five or more pixels PX. For example, as shown in FIG. 26, each pixel group may include six pixels PX.

Hereinafter, a display apparatus and a method of driving the display apparatus driving method according to a tenth embodiment will be described in detail with reference to the drawings. In this embedment, the display apparatus is a reflective liquid crystal display apparatus, and is adapted to a normally white mode.

Figure 27:
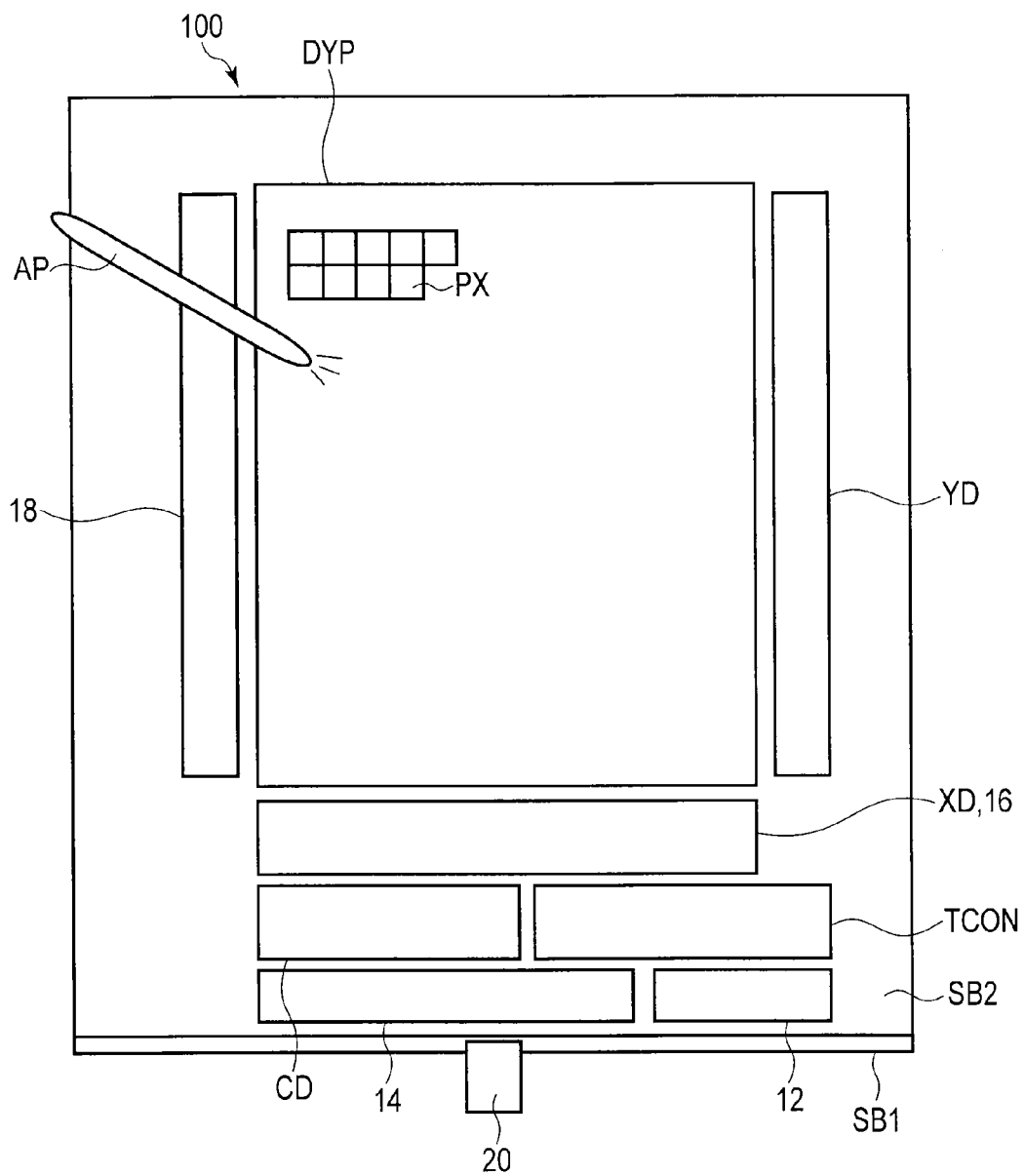
FIG. 27 is a plan view schematically showing a display apparatus according to a tenth embodiment.

As shown in FIG. 27, a display apparatus 100 according to this embodiment is different from that shown in FIG. 1, and is formed without the automatic photosensor timing adjustment circuit 30. This is attributed to the fact that an AC pen AP is used in place of the light pen LP in the present embodiment. In the present embodiment, environment light (external light) has no influence on the input of information. A memory operating circuit 18 controls the operation of a second memory M2 described later. In other respects, the illustration in FIG. 27 is the same as the illustration in FIG. 1 and is not explained.

FIG. 28 shows part of the display apparatus 100 and the AC pen AP. As shown in FIG. 28, information is input to the display apparatus 100 by transferring an alternating current (AC) signal VA output from the tip of the AC pen AP to a detection electrode DT provided in the pixel group. In this embodiment, the outer surface of a polarizer PO disposed on the outer surface of a counter substrate SB2 is an input surface. The detection electrode DT is different from the pixel electrode PE, and is made of a transparent conducting material such as indium tin oxide (ITO).

An undesired voltage or noise is supplied to the pixel electrode PE and the detection electrode DT due to the AC signal VA or external noise. However, the pixel electrode PE and the detection electrode DT are connected to the first memory M1 and the second memory M2 that will be described later. Therefore, the display apparatus 100 can satisfactorily display images even under the influence of noise or the like.

Figure 29:
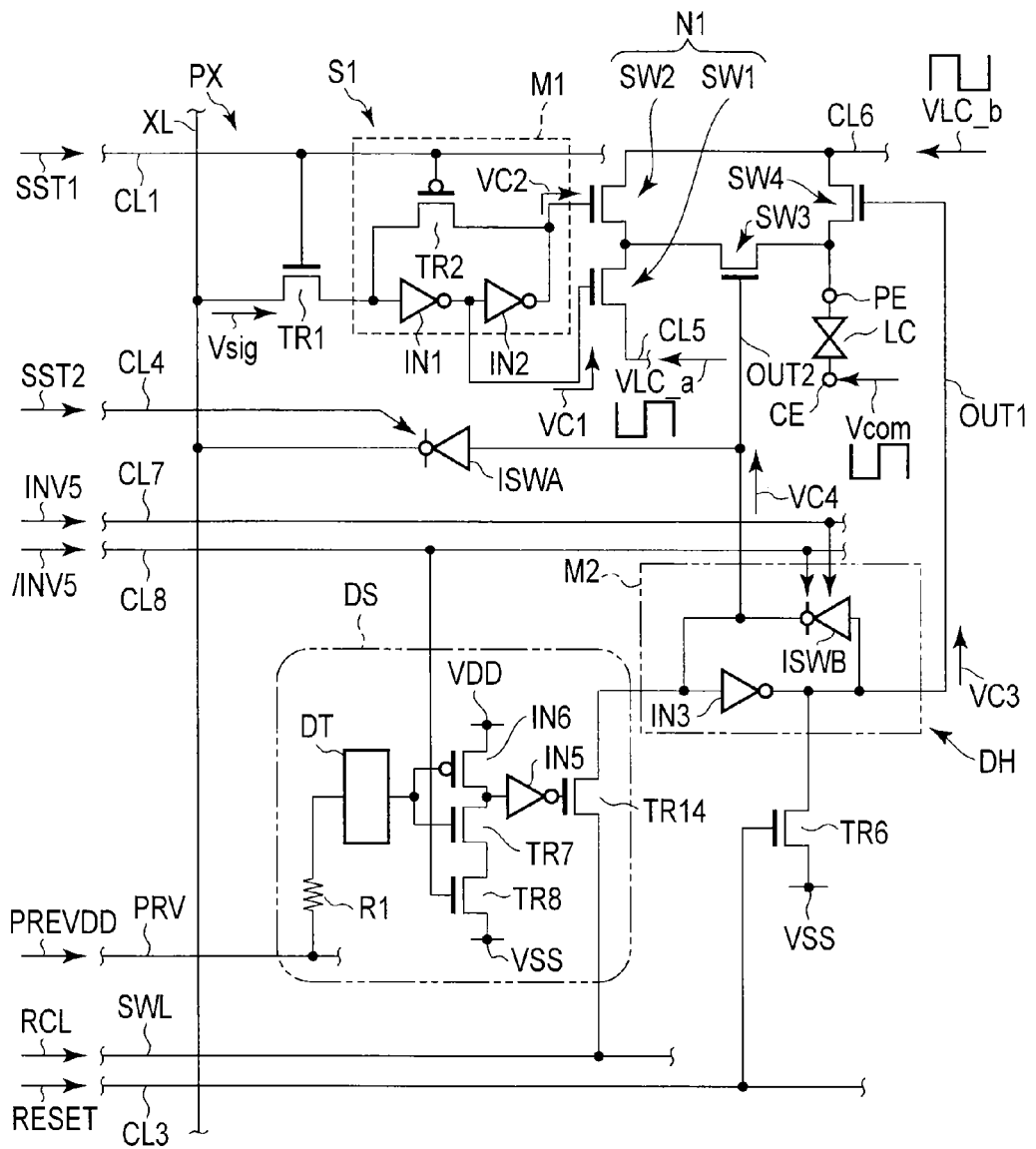
FIG. 29 is a diagram showing an equivalent circuit of a pixel according to the tenth embodiment.

As shown in FIG. 27 and FIG. 29, each of pixels PX of the display unit DYP comprises, on the side of an array substrate SB1, a pixel electrode PE, a first memory M1, the second memory M2, an alternating current sensor circuit (AC sensor circuit) DS as a sensor circuit, a display signal control circuit N1, pixel control switch (SW3 and SW4), a first transistor TR1, a sixth transistor TR6, and a clocked inverter ISWA.

The pixel electrode PE is configured to permit the input of the AC signal VA to the detection electrode DT. The pixel electrode PE has the same configuration in other respects as that in the first embodiment described above.

The use of such a reflective liquid crystal display apparatus (pixel electrode PE) makes it possible to provide advantageous effects similar to those in the first embodiment described above.

The counter substrate SB2 has the same configuration as that in the first embodiment described above.

The first transistor TR1, the first memory M1, the display signal control circuit N1, the pixel control switch (SW3 and SW4), the sixth transistor TR6, and the clocked inverter ISWA have the same configurations as those in the eighth embodiment described above.

On the array substrate SB1, there are formed fifth inverters IN5, fourth transistors TR4 as rewriting switches, sixth transistors TR6, seventh transistors TR7, eighth transistors TR8, the detection electrodes DT, pull-up resistors R1, control wirings SWL, eighth control wirings CL8, and control wirings PRV. The control wirings SWL and the control wirings PRV are electrically connected on one end to the Y-driver YD. The eighth control wirings CL8 are electrically connected on one end to the memory operating circuit 18.

The AC sensor circuit DS is connected to the second memory M2. The AC sensor circuit DS detects input information. The AC sensor circuit DS provides data for a control signal RCL to the second memory M2 when detecting input information. That is, the data in the second memory M2 can be rewritten to the data for the control signal RCL. More specifically, the AC sensor circuit DS can detect whether the alternating current signal (AC signal) VA is input and thereby rewrite the data in the second memory M2 to the data for the control signal RCL.

The AC sensor circuit DS comprises the fifth inverter IN5, the fourth transistor TR4, the sixth transistor TR6, the seventh transistor TR7, the eighth transistor TR8, the detection electrode DT, and the pull-up resistor R1.

The fourth transistor TR4 is an N-type thin film transistor comprising a polysilicon layer as a semiconductor layer. The fourth transistor TR4 includes a gate electrode electrically connected to the output terminal of the fifth inverter IN5, a source electrode electrically connected to the control wiring SWL, and a drain electrode electrically connected to the second memory M2. The fourth transistor TR4 switches whether to output the control signal RCL to the second memory M2.

Here, the control signal RCL is used as a detection signal. The voltage level of the control signal RCL is low (e.g., 0 V) in a later-described AC writing period, and switched to a high level (e.g., 5 V) in a later-described AC erasing period.

The sixth transistor TR6 is a P-type thin film transistor comprising a polysilicon layer as a semiconductor layer. The sixth transistor TR6 includes a gate electrode electrically connected to the detection electrode DT, a source electrode electrically connected to a high potential power supply VDD as a power supply, and a drain electrode electrically connected to the input terminal of the fifth inverter IN5. The sixth transistor TR6 switches whether to output a power supply voltage (high-level voltage) to the fifth inverter IN5.

The seventh transistor TR7 is an N-type thin film transistor comprising a polysilicon layer as a semiconductor layer. The seventh transistor TR7 includes a gate electrode electrically connected to the detection electrode DT, a source electrode electrically connected to the eighth transistor TR8, and a drain electrode electrically connected to the input terminal of the fifth inverter IN5. The seventh transistor TR7 switches whether to output, to the fifth inverter IN5, a power supply voltage (low-level voltage, 0 V) provided via the eighth transistor TR8.

The gate electrode of the sixth transistor TR6 and the gate electrode of the seventh transistor TR7 are electrically connected to each other. The drain electrode of the sixth transistor TR6 and the drain electrode of the seventh transistor TR7 are electrically connected to each other. The sixth transistor TR6 and the seventh transistor TR7 constitute an inverter. A through-current always runs through the sixth transistor TR6 and the seventh transistor TR7, so that the eighth transistor TR8 is provided.

The eighth transistor TR8 is an N-type thin film transistor comprising a polysilicon layer as a semiconductor layer. The eighth transistor TR8 includes a gate electrode electrically connected to the eighth control wiring CL8, a source electrode electrically connected to the low potential power supply VSS (ground potential) as a power supply, and a drain electrode electrically connected to the source electrode of the seventh transistor TR7. The eighth transistor TR8 switches whether to conduct the low potential power supply VSS and the seventh transistor TR7 in accordance with a second control signal /INV5 provided via the eighth control wiring CL8.

The pull-up resistor R1 is connected between the detection electrode DT and the control wiring PRV. A precharge voltage PREVDD (e.g., 5 V) is provided to the pull-up resistor R1 via the control wiring PRV. The precharge voltage PREVDD is provided to the detection electrode DT via the pull-up resistor R1 so that the potential of the detection electrode DT is pulled up.

The detection electrode DT detects whether the AC signal VA is input by the AC pen AP. The detection electrode DT provides the sixth transistor TR6 and the seventh transistor TR7 with the voltage that has been pulled up, and waits for the AC signal VA to be input.

On the array substrate SB1, there are formed seventh control wirings CL7, third inverters IN3, and clocked inverters ISWB. The seventh control wirings CL7 are electrically connected on one end to the memory operating circuit 18.

The second memory M2 is an SRAM as a static memory. The second memory M2 holds data for the control signal RCL (detection signal). The second memory M2 comprises the third inverter IN3 and the clocked inverter ISWB that are connected in a loop form.

The third inverter IN3 includes an input terminal connected to the drain electrode of the fourth transistor TR4, and an output terminal connected to an output wiring OUT1. The clocked inverter ISWB includes an input terminal connected to the output terminal of the third inverter IN3, and an output terminal connected to an output wiring OUT2 and the input terminal of the third inverter IN3.

The seventh control wiring CL7 and the eighth control wiring CL8 are connected to the clocked inverter ISWB. A first control signal INV5 and the second control signal /INV5 are provided to the clocked inverter ISWB from the memory operating circuit 18 via the seventh control wiring CL7 and the eighth control wiring CL8. The waveform of the second control signal /INV5 is a reversed-phase waveform of the first control signal INV5. Thus, the clocked inverter ISWB is driven under the control of the first control signal INV5 and the second control signal /INV5.

In a period in which the voltage level of the first control signal INV5 is high, the second memory M2 is in a current-loop state and holds data. The data in the first memory M1 is rewritten by the switch of the voltage level of the first control signal INV5 to a low level.

The second memory M2 outputs an output signal VC3 and an output signal VC4 to the pixel control switch. The voltage levels of the output signal VC3 and the output signal VC4 are a high level (e.g., 5 V) or a low level (e.g., 0 V). The waveform of the output signal VC4 is a reversed-phase waveform of the output signal VC3.

Now, the operation of the AC sensor circuit DS when the data for the control signal RCL (detection signal) is provided to the second memory M2 from the AC sensor circuit DS is described.

First described is a case where the voltage level of the first control signal INV5 is high and the voltage level of the second control signal /INV5 is low.

In this case, the eighth transistor TR8 is switched to a nonconducting state, so that no through-current runs through the sixth transistor TR6 and the seventh transistor TR7. A voltage that has been pulled up is provided to the gate electrode of the sixth transistor TR6 and the gate electrode of the seventh transistor TR7 from the detection electrode DT. The sixth transistor TR6 is switched to a conducting state, and the seventh transistor TR7 is switched to a nonconducting state. A power supply voltage (high-level voltage) is provided to the fifth inverter IN5 via the sixth transistor TR6. As the fourth transistor TR4 is in a nonconducting state, the control signal RCL is not supplied to the second memory M2.

Next described is a case where the voltage level of the first control signal INV5 is switched to a low level and the voltage level of the second control signal /INV5 is switched to a high level.

In this case, the sixth transistor TR6 is kept in a conducting state, the seventh transistor TR7 is kept in a nonconducting state, and the eighth transistor TR8 is switched to a conducting state. If the AC signal VA is input to the detection electrode DT from the AC pen AP in this condition, a high level of the AC signal VA is provided to the gate electrode of the sixth transistor TR6 and the gate electrode of the seventh transistor TR7. The sixth transistor TR6 is switched to a nonconducting state, and the seventh transistor TR7 is switched to a conducting state.

A power supply voltage (low-level voltage) is provided to the fifth inverter IN5 via the eighth transistor TR8 and the seventh transistor TR7. As the fourth transistor TR4 is in a conducting state, the control signal RCL is supplied to the second memory M2.

The data in the second memory M2 is rewritten to the data for the control signal RCL. Here, the voltage level of the control signal RCL is switched to a low level in a later-described AC writing period, and switched to a high level in a later-described AC erasing period.

Subsequently, the voltage level of the first control signal INV5 is switched to a high level, and the voltage level of the second control signal /INV5 is switched to a low level, so that the rewritten data in the second memory M2 is maintained.

The pixel PX having the configuration described above can be roughly classified into a video display pixel circuit S1 and an AC sensor control circuit DH as a sensor control circuit. The video display pixel circuit S1 includes the first transistor TR1, the first memory M1, the display signal control circuit N1, and the pixel control switch (SW3 and SW4). The AC sensor control circuit DH includes the AC sensor circuit DS, the second memory M2, and the sixth transistor TR6.

Now, the operation of the display apparatus 100 is described. The operation of the display apparatus 100 is controlled by a timing controller TCON. In the display apparatus 100 according to the present embodiment, characters and figures are written into the display unit DYP in accordance with positional information input by providing the AC signal VA to the display unit DYP with the use of the AC pen AP. When the power supply is activated, a signal (0 V) corresponding to white display is supplied to the signal line XL as an initial signal. The initial signal is different from a video signal Vsig.

Figure 30:
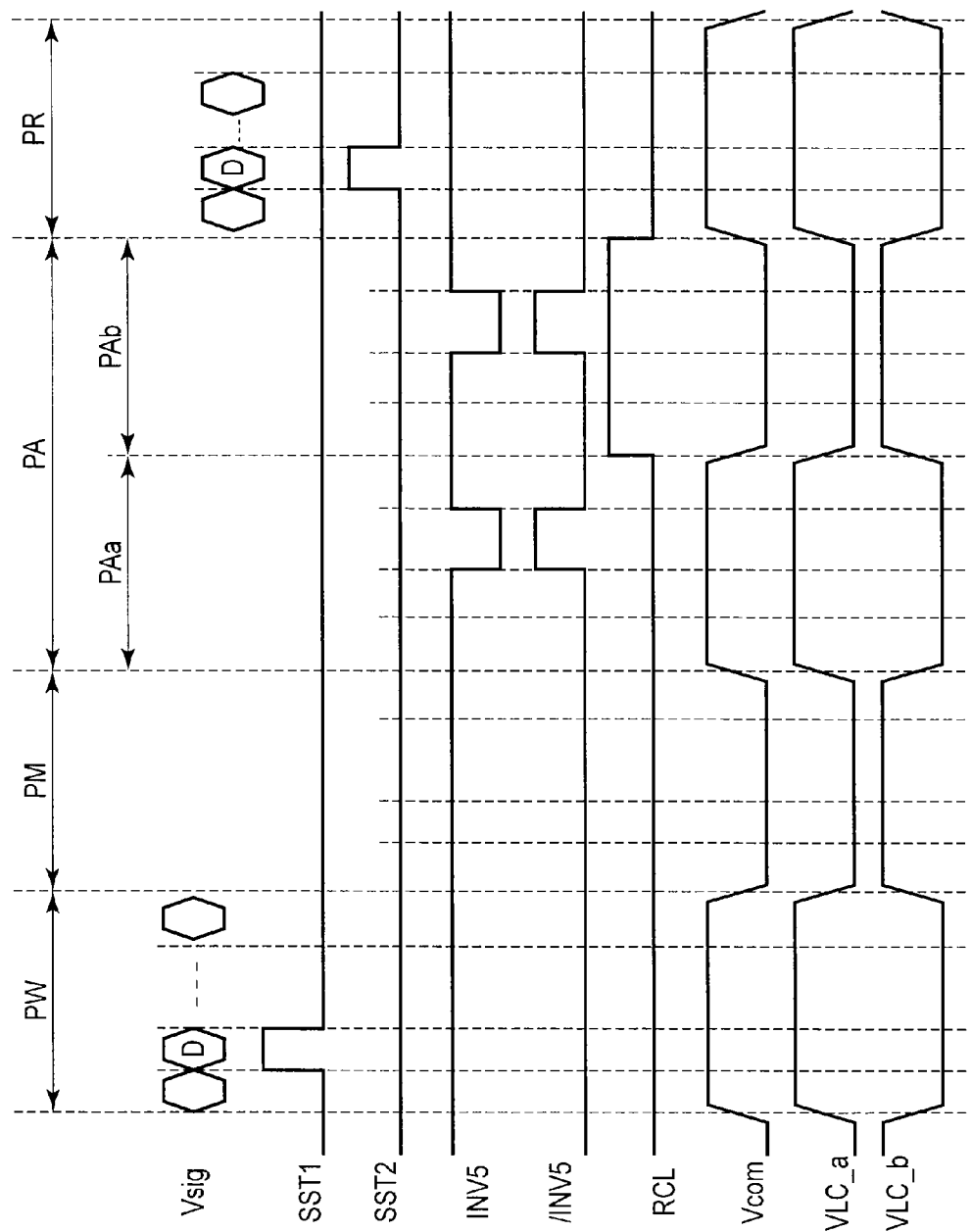
FIG. 30 is a timing chart showing various control signals and a counter voltage in a method of driving the display apparatus according to the tenth embodiment.

As shown in FIG. 30, the operation of the display apparatus 100 is divided into a display signal writing operation in a display signal (video signal Vsig) writing period PW, a memory operation in a memory period PM, an AC rewriting operation (rewriting operation) in an AC rewriting period PA (rewriting period), and a reading operation in a reading period PR.

The AC rewriting period PL can be said to be an input information detecting period. The AC rewriting operation is divided into an AC writing operation (writing operation) in an AC writing period PAa (writing period), and an AC erasing operation (erasing operation) in an AC erasing period PAb (erasing period).

The series of operations (operation periods) described above are arranged and shown for convenience in FIG. 30, and are not exclusively repeated in the shown order. Although described later, a user switches to the AC writing operation or the AC erasing operation. Therefore, for example, the display apparatus 100 may operate without the AC erasing operation, and may operate to alternately repeat the AC writing operation and the AC erasing operation more than once.

As shown in FIG. 29 and FIG. 30, in writing, the first control signal INV5 provided to the seventh control wiring CL7 is at a high level, and the second control signal /INV5 provided to the eighth control wiring CL8 is at a low level, in the writing period PW. Thus, the eighth transistor TR8 is switched to a nonconducting state, and the second memory M2 holds data. In an initial state, the second memory M2 switches the first output switch SW3 to a conducting state, and switches the second output switch SW4 to a nonconducting state.

In other respects, the writing operation in the writing period PW is performed in the same manner as that in the eighth embodiment described above.

In the case of AC writing in the AC writing period PAa, the first control signal INV5 provided to the seventh control wiring CL7 is at a low level, and the second control signal /INV5 provided to the eighth control wiring CL8 is at a high level. Thus, the eighth transistor TR8 is switched to a conducting state.

If the AC signal VA is input to the detection electrode DT from the AC pen AP in this condition, a high level of the AC signal VA is provided to the gate electrode of the sixth transistor TR6 and the gate electrode of the seventh transistor TR7. The seventh transistor TR7 is switched to a conducting state, and the fourth transistor TR4 is also switched to a conducting state. As a result, the low-level control signal RCL is provided to the second memory M2 via the fourth transistor TR4.

Subsequently, the voltage level of the first control signal INV5 is switched to a high level, and the voltage level of the second control signal /INV5 is switched to a low level, so that the second memory M2 is looped. Thus, the data for the low-level control signal RCL is held in the second memory M2. As the eighth transistor TR8 is switched to a nonconducting state, the fourth transistor TR4 is kept in a nonconducting state.

The second memory M2 holding the data for the low-level control signal RCL provides the high-level output signal VC3 to the gate electrode of the second output switch SW4, and provides the low-level output signal VC4 to the gate electrode of the first output switch SW3, thereby controlling the first output switch SW3 and the second output switch SW4.

Accordingly, the first output switch SW3 is switched to a nonconducting state, and the second output switch SW4 is switched to a conducting state. Thus, a control signal VLC_b at a voltage level corresponding to black display is selected. The control signal VLC_b is then provided to the pixel electrode PE via the second output switch SW4.

When the AC signal VA is thus input to the detection electrode DT from the AC pen AP, the signal applied to the pixel electrode PE is switched to the control signal VLC_b corresponding to black display in accordance with the periods of the first control signal INV5 and the second control signal /INV5.

When the data for the low-level control signal RCL is stored in the second memory M2 in advance, black display is set before writing with the AC pen AP.

The display apparatus 100 can normally hold data in pixel memories (the first memory M1 and the second memory M2), and therefore its frequency can be decreased to 1 Hz or less, for example. This enables lower power consumption in the display apparatus 100.

As shown in FIG. 30, the rewriting with the AC pen AP can be controlled by the first control signal INV5 and the second control signal /INV5 independently of the control signals VLC_a and VLC_b. The frequencies of the first control signal INV5 and the second control signal /INV5 are different from the frequencies of the control signals VLC_a and VLC_b, and can therefore be set to frequencies suitable for handwriting input. If the first control signal INV5 and the second control signal /INV5 are adapted to the use of the AC pen AP, the frequencies of the first control signal INV5 and the second control signal /INV5 have only to be increased during the use of the AC pen AP, which enables both lower power consumption and handwriting input.

In the case of AC erasing in the AC erasing period PAb, the voltage level of the control signal RCL provided to the control wiring line SWL is high.

Here, the user can operate an interface such as a button mounted on the display apparatus 100 (provided in the display apparatus 100) to switch to AC writing or AC erasing in the display unit DYP. An external command signal corresponding to the user operation is provided to the timing controller TCON via a flexible substrate 20. The timing controller TCON switches the control signal RCL in accordance with the provided command signal.

In order to erase the characters and figures written in the display unit DYP, a high level of the AC signal VA is provided to the gate electrode of the sixth transistor TR6 and the gate electrode of the seventh transistor TR7 if the AC signal VA is input to the detection electrode DT from the AC pen AP in the AC erasing period PAb. The seventh transistor TR7 is switched to a conducting state, and the fourth transistor TR4 is also switched to a conducting state. As a result, the high-level control signal RCL is provided to the second memory M2 via the fourth transistor TR4.

Subsequently, the voltage level of the first control signal INV5 is switched to a high level, and the voltage level of the second control signal /INV5 is switched to a low level, so that the second memory M2 is looped. Thus, the data for the high-level control signal RCL is held in the second memory M2. As the eighth transistor TR8 is switched to a nonconducting state, the fourth transistor TR4 is kept in a nonconducting state.

The second memory M2 holding the data for the high-level control signal RCL provides the low-level output signal VC3 to the gate electrode of the second output switch SW4, and provides the high-level output signal VC4 to the gate electrode of the first output switch SW3, thereby controlling the first output switch SW3 and the second output switch SW4.

Accordingly, the first output switch SW3 is switched to a conducting state, and the second output switch SW4 is switched to a nonconducting state. Thus, a signal (the control signal VLC_a or the control signal VLC_b) associated with the data for the video signal Vsig stored in the first memory M1 is provided to the pixel electrode PE.

In this way, the second memory M2 can control the first output switch SW3 and the second output switch SW4. Therefore, the characters and figures written in the display unit DYP can be erased by inputting the AC signal VA to the characters and figures written from the AC pen AP.

The AC erasing with the AC pen AP is basically the same as the AC writing. However, as described above, the voltage level of the control signal RCL provided to the control wiring SWL is different. In the AC writing, the low-level control signal RCL is provided to the control wiring SWL. In the AC erasing, the high-level control signal RCL is provided to the control wiring SWL.

As described above, the data in the first memory M1 is configured to be unerasable by, for example, the AC pen AP. Thus, characters (data) written on images of cartoons or an electronic newspaper with the AC pen AP can be erased without erasing the original image (the video signal Vsig).

This is enabled by changing the voltage level of the control signal RCL, thereby permitting the simplification of a pixel circuit.

Reading is performed in the reading period PR. In order to output (read) data for the signal stored in the second memory M2, the voltage level of the first control signal INV5 is kept at a high level and the voltage level of the second control signal /INV5 is kept at a low level to hold the data in the second memory M2. Even if the user erroneously uses the AC pen AP in the reading period PR, new data is not written into the second memory M2 because the fourth transistor TR4 is in a nonconducting state.

In this condition, the voltage level of the control signal SST2 input to the clocked inverter ISWA is switched to a high level, and the data stored in the second memory M2 is provided to the converter circuit 16 via the clocked inverter ISWA and the signal line XL.

Although the case described above is based on the assumption that the signal corresponding to white display is first supplied to the pixel electrode PE in writing with the AC pen AP, the signal first supplied to the pixel electrode PE may be a signal other than the signal corresponding to white display.

The read data in the second memory M2 can be processed in the same manner as in the eighth embodiment described above.

The user can also select the collective erasing operation for collectively erasing the characters written in the display unit DYP. The collective erasing operation can be performed in the same manner as that in the eighth embodiment described above.

According to the display apparatus having the above-described configuration and the method of driving the display apparatus in the tenth embodiment, a signal is written into the pixel electrode PE by inputting the AC signal VA to the display unit DYP with the AC pen AP, so that the signal line XL is only driven during the switch of images. Therefore, when a still image is displayed, the X-driver XD has only to drive the signal line XL at the initial screen writing, thereby allowing lower power consumption.

As the detection electrode DT (the AC sensor circuit DS) is disposed in each of the pixels PX, input positional information can be precisely detected. The information detected by the detection electrode DT can be processed within the pixels PX without even being transferred to an external IC, so that the processing speed can be enhanced.

The use of the AC pen AP provides the following advantages as compared with the use of the light pen LP.
  The decrease in display quality can be prevented owing to the absence of the wrong operation of the sensor caused by the variation of external light intensity.
  One photo engraving process (PEP) can be eliminated in the manufacturing process of the array substrate SB1.
  There is no need to produce a photodiode (high-luminance LED) for the light pen LP that leads to the increase of manufacturing costs.
  Writing can be performed without discomfort in optical writing.
  Writing can be readily performed.

Furthermore, it is possible to provide the display apparatus 100 which is high in the speed of processing input positional information and which can be easily used by every user in every scene, and the method of driving the display apparatus.

Next, a display apparatus and a method of driving the display apparatus according to an eleventh embodiment will be described. This embodiment is different from the tenth embodiment in the configuration of the second memory M2. The pull-up resistor R1 according to the tenth embodiment is replaced by a ninth transistor TR9. The pixel PX is formed without the sixth transistor TR6. The configuration according to this embodiment is the same in other respects as that according to the tenth embodiment described above, and like components are provided with like reference signs and are not described in detail.

As shown in FIG. 31, on an array substrate SB1, there are formed third transistors TR3 as loop current control switches, third inverters IN3, and fourth inverters IN4.

The second memory M2 is an SRAM as a static memory. The second memory M2 holds data for the control signal RCL (detection signal). The second memory M2 comprises the third inverter IN3, the fourth inverter IN4, and the third transistor TR3 that are connected in a loop form.

The third inverter IN3 includes an input terminal connected to the drain electrode of the fourth transistor TR4, and an output terminal connected to an output wiring OUT1. The fourth inverter IN4 includes an input terminal connected to the output terminal of the third inverter IN3, and an output terminal connected to an output wiring OUT2.

The third transistor TR3 is an N-type thin film transistor comprising a polysilicon layer as a semiconductor layer. The third transistor TR3 includes a gate electrode connected to a seventh control wiring CL7, a source electrode connected to the output terminal of the fourth inverter IN4, and a drain electrode connected to the input terminal of the third inverter IN3.

A first control signal INV5 output from a memory operating circuit 18 to control the operation of the third transistor TR3 is provided to the gate electrode of the third transistor TR3 via the seventh control wiring CL7. The third transistor TR3 controls a current that loops the third inverter IN3 and the fourth inverter IN4. In a period in which the voltage level of the first control signal INV5 is high (e.g., 5 V), the second memory M2 is in a current-loop state and can hold data. The second memory M2 outputs an output signal VC3 and an output signal VC4 to the pixel control switch.

An AC sensor circuit DS comprises the ninth transistor TR9 in place of the pull-up resistor R1.

The ninth transistor TR9 is an N-type thin film transistor comprising a polysilicon layer as a semiconductor layer. The ninth transistor TR9 includes a gate electrode electrically connected to the seventh control wiring CL7, a source electrode electrically connected to a control wiring PRV, and a drain electrode electrically connected to a detection electrode DT. The ninth transistor TR9 switches whether to output a precharge voltage PREVDD to the detection electrode DT.

Now, the operation of the display apparatus 100 is described. The display apparatus 100 operates substantially as in the tenth embodiment described above. However, the point of the present embodiment is that the ninth transistor TR9 operates differently. Another point is the timing of inputting an AC signal VA. The operation of the display apparatus 100 is described mainly in connection with the above points.

As shown in FIG. 30 and FIG. 31, in writing, the first control signal INV5 provided to the seventh control wiring CL7 is at a high level, and a second control signal /INV5 provided to an eighth control wiring CL8 is at a low level, in a writing period PW. Thus, an eighth transistor TR8 is switched to a nonconducting state, and the second memory M2 holds data. In an initial state, the second memory M2 switches a first output switch SW3 to a conducting state, and switches a second output switch SW4 to a nonconducting state.

Furthermore, the ninth transistor TR9 is switched to a conducting state, and the precharge voltage PREVDD is provided to the detection electrode DT via the control wiring PRV the ninth transistor TR9. As a result, a potential VN of a node no1 is an intermediate potential of the threshold voltage of a seventh transistor TR7. A voltage is written into the seventh transistor TR7 as described above.

The sixth transistor TR6 is switched to a conducting state, and the seventh transistor TR7 is switched to a nonconducting state. Thus, a power supply voltage (high-level voltage) is provided to the fifth inverter IN5 via the sixth transistor TR6, and the fourth transistor TR4 is in a nonconducting state. Moreover, a through-current runs from the sixth transistor TR6 to the seventh transistor TR7. However, the through-current does not run through the eighth transistor TR8.

In other respects, the writing operation in the writing period PW is performed in the same manner as that in the tenth embodiment described above.

As shown in FIG. 30, FIG. 31, and FIG. 32, in the case of AC writing in an AC writing period PAa, the first control signal INV5 provided to the seventh control wiring CL7 is at a low level, and the second control signal /INV5 provided to the eighth control wiring CL8 is at a high level. Thus, the eighth transistor TR8 is switched to a conducting state.

Subsequently, the AC signal VA is input to the detection electrode DT from an AC pen AP, and a high level of the AC signal VA is provided to the gate electrode of the sixth transistor TR6 and the gate electrode of the seventh transistor TR7. When the AC signal VA is input to the detection electrode DT, the potential of the detection electrode DT (node no1) rapidly rises due to coupling capacitance resulting from, for example, the polarizer (FIG. 28) PO or the glass substrate (counter substrate SB2) and reaches the threshold voltage of the seventh transistor TR7.

Furthermore, there is a time difference between the timing of voltage level changes of the first control signal INV5 and the second control signal /INV5 and the timing of inputting the AC signal VA to the detection electrode DT. Thus, a maximum punch-through voltage can be generated in the detection electrode DT (node no1).

The AC signal VA detection accuracy can be improved. This allows the lower amplitude of the AC signal VA and the lower power consumption of the AC pen AP. Moreover, the detection electrode DT can be reduced in size.

The seventh transistor TR7 is switched to a conducting state, and the fourth transistor TR4 is also switched to a conducting state. As a result, the low-level control signal RCL is provided to the second memory M2 via the fourth transistor TR4.

In other respects, the AC writing operation in the AC writing period PAa is performed in the same manner as that in the tenth embodiment described above.

The AC erasing operation performed in an AC erasing period PAb is basically the same as the AC writing operation. However, in the AC erasing period PAb, the voltage level of the control signal RCL provided to the control wiring SWL is high.

In order to use the AC pen AP to erase the characters and figures written in the display unit DYP, the first control signal INV5 is switched to a low level, the second control signal /INV5 is switched to a high level, and then the AC signal VA is input to the detection electrode DT from the AC pen AP, in the AC erasing period PAb.

In the AC erasing operation as well, there is a time difference between the timing of voltage levels change of the first control signal INV5 and the second control signal /INV5 and the timing of inputting the AC signal VA to the detection electrode DT. Thus, a maximum punch-through voltage can be generated in the detection electrode DT (node no1).

The seventh transistor TR7 is switched to a conducting state, and the fourth transistor TR4 is also switched to a conducting state. As a result, the high-level control signal RCL is provided to the second memory M2 via the fourth transistor TR4.

In other respects, the AC erasing operation in the AC erasing period PAb is performed in the same manner as that in the tenth embodiment described above.

In the present embodiment as well, the user can also select the above-described collective erasing operation if, for example, the sixth transistor TR6 according to the tenth embodiment is used.

According to the display apparatus having the above-described configuration and the method of driving the display apparatus in the eleventh embodiment, it is possible to provide advantageous effects similar to those in the tenth embodiment described above. The punch-through voltage generated in the detection electrode DT can be used for detecting information input from the AC pen AP. This can improve the AC signal VA detection accuracy.

Furthermore, it is possible to provide the display apparatus 100 which is high in the speed of processing input positional information and which can be easily used by every user in every scene, and the method of driving the display apparatus.

The tenth and eleventh embodiments described above are illustrative only and are not intended to limit the scope of the invention. Modifications can be made to the components according to the tenth and eleventh embodiments described above without departing from the spirit thereof. Further, various inventions can be made by properly combining the components disclosed in the embodiments described above. For example, some of all the components shown in the embodiments may be eliminated. Moreover, components in different embodiments may be suitably combined together.

Figure 33:
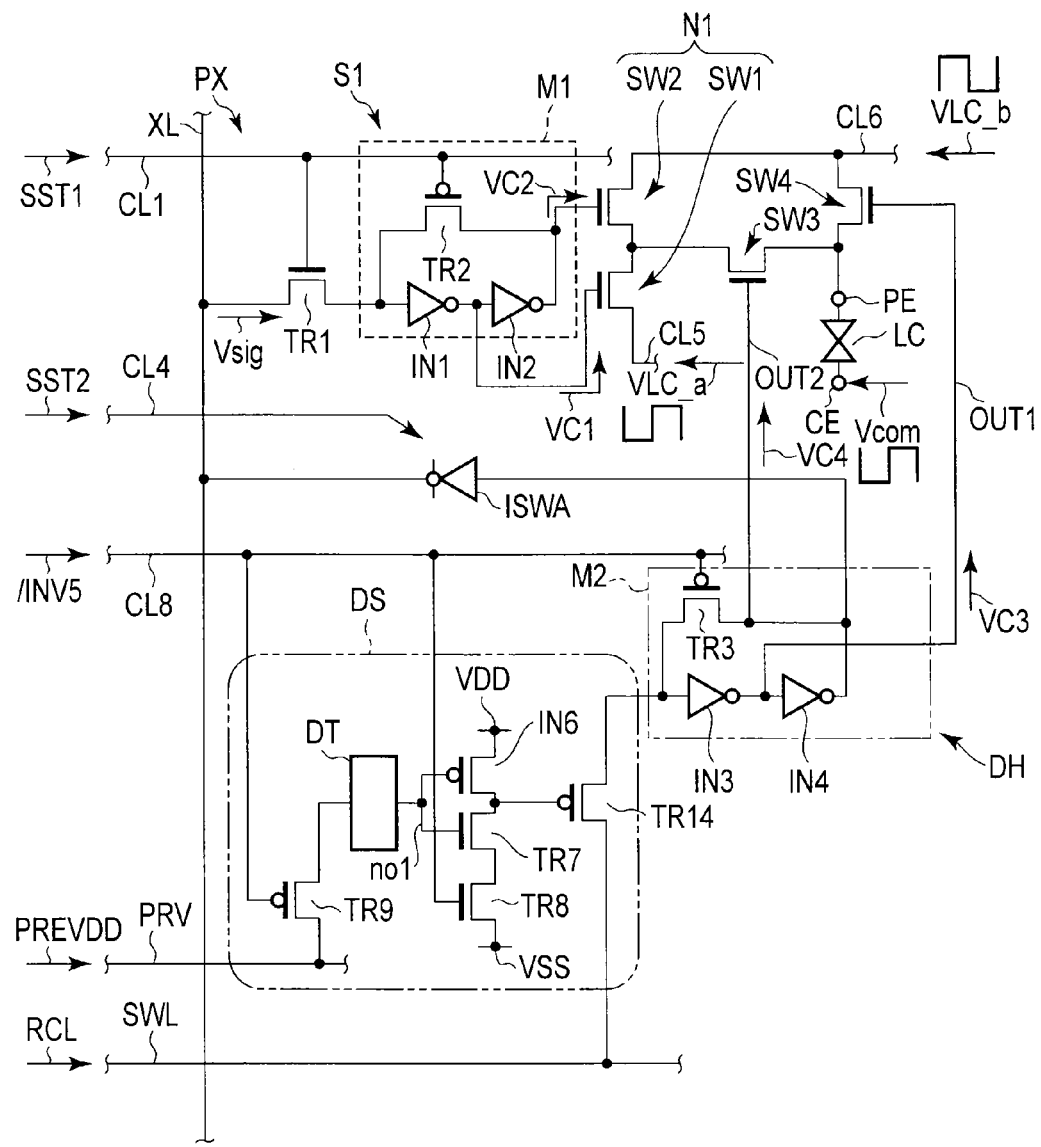
FIG. 33 is a diagram showing an equivalent circuit of a pixel according to a modification of the eleventh embodiment.

For example, the pixel PX may be formed as shown in FIG. 33. This can simplify the configuration of the pixel PX as compared with that in the eleventh embodiment. In this example, the display apparatus 100 is formed without the seventh control wiring CL7 and the fifth inverter IN5, in contrast to the eleventh embodiment (FIG. 31). The third transistor TR3, the fourth transistor TR4, and the ninth transistor TR9 are P-type thin film transistors.

The gate electrode of the fourth transistor TR4 is connected to the drain electrodes of the sixth transistor TR6 and the seventh transistor TR7. The gate electrodes of the third transistor TR3 and the ninth transistor TR9 are connected to the eighth control wiring CL8.

The pixel PX having the configuration described above can operate in the same manner as in the eleventh embodiment described above.

One AC sensor control circuit DH may be configured to control the pixels PX (video display pixel circuits S1). The pixels PX are classified into any of the pixel groups. That is, the pixels PX constitute pixel groups comprising adjacent pixels PX. For example, a pixel group comprises four pixels PX, the four pixels PX of each pixel group share the AC sensor control circuit DH.

The display apparatus 100 is not exclusively the reflective liquid crystal display apparatus that requires no backlight unit, and may be a transmissive liquid crystal display apparatus.

The display apparatus 100 is not exclusively the liquid crystal display apparatus adapted to the normally white mode, and may be a liquid crystal display apparatus adapted to a normally black mode.

Furthermore, the display apparatus 100 is not exclusively the liquid crystal display apparatus, and is applicable to various display apparatuses such as an organic EL display apparatus. In this case, advantageous effects similar to those in the embodiments described above are obtained.

For example, the organic EL display apparatus is configured so that the initial screen shows black display in the entire display unit DYP and shows, for example, white display in parts of the pixels PX to which information is input by the AC pen AP. In this case, a voltage is applied so that red, blue, and green organic EL elements emit light via the AC sensor circuit DS when information is input by the AC pen AP. In the case of the organic EL display apparatus, a common electrode facing the pixel electrode does not need to be driven by an alternating current.

The first memory M1 and the second memory M2 are not exclusively storage elements (e.g., one-bit SRAM). If the number of memories is increased, tone display is possible in addition to white display and black display. If the first memory M1 and the second memory M2 comprise dynamic random access memories (DRAM), multi-tone display is possible.

Means for inputting to the display apparatus is not exclusively the AC pen AP, and has only to be anything that emits an AC signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display apparatus comprising:
   a signal line configured to be provided with a display signal; and
   a pixel comprising a pixel electrode, a first and a second memory, a first writing switch configured to control the first memory, a second writing switch configured to control the second memory, a sensor circuit, a display signal control circuit and a pixel control switch,
   wherein
   the first writing switch is connected between the signal line and the first memory and is configured to switch whether to write data for the display signal into the first memory,
   the second writing switch is connected between the signal line and the second memory, shares the signal line with the first writing switch, and is configured to switch whether to write the data for the display signal into the second memory,
   the sensor circuit is configured to detect input information and to rewrite initial-state data in the second memory to data for the detection signal in interlock with control of the second memory when detecting the input information, the display signal control circuit is connected between the first memory and the pixel control switch, is connected between the second memory and the pixel control switch, and is configured to switch the voltage level of a control signal provided to the pixel control switch in accordance with the data for the display signal provided from the first memory and one of the initial-state data and the data for the detection signal provided from the second memory, and the pixel control switch is configured to switch the voltage level of the pixel electrode in accordance with the control signal provided from the display signal control circuit.

2. The display apparatus according to claim 1, wherein the sensor circuit is a photosensor circuit, is configured to detect the illumination of incident light, and is configured to rewrite data in the second memory to the data for the detection signal when detecting the illumination of the incident light.

3. The display apparatus according to claim 1, wherein the first memory comprises
   a first inverter including an input terminal connected to the writing switch,
   a second inverter including an input terminal connected to an output terminal of the first inverter, and an output terminal, and
   a loop current control switch which is connected between the input terminal of the first inverter and the output terminal of the second inverter and configured to control a current that loops the first inverter and the second inverter.

4. The display apparatus according to claim 1, wherein the second memory comprises
   a first inverter including an input terminal connected to the sensor circuit,
   a second inverter including an input terminal connected to an output terminal of the first inverter, and an output terminal, and
   a loop current control switch which is connected between the input terminal of the first inverter and the output terminal of the second inverter and configured to control a current that loops the first inverter and the second inverter.

5. The display apparatus according to claim 1, wherein the sensor circuit comprises
   a photosensor which is configured to generate a leakage current in accordance with the illumination of incident light,
   a rewriting switch which is connected to the photosensor and configured to switch whether to output the detection signal to the second memory, and
   a leakage path control switch which is connected to the photosensor and configured to switch whether to form a path for the leakage current generated in the photosensor.

6. The display apparatus according to claim 1, wherein the pixel comprises a reset switch which is connected to the second memory and configured to switch whether to initialize the data in the second memory.

7. The display apparatus according to claim 1, wherein the pixel further comprises additional second memories similar in configuration to the former second memory and additional sensor circuits similar in configuration to the former sensor circuit, and
   the pixel further comprises one of the second memory and the additional second memories, and on of the sensor circuit and the additional sensor circuits.

8. The display apparatus according to claim 1, wherein the pixel further comprises an output inverter which includes an input terminal connected to the second memory and an output terminal connected to the signal line, and is configured to output the data in the second memory to the signal line.

9. The display apparatus according to claim 8, further comprising:
   an X-driver which is connected to the signal lines and configured to provide the display signals to the signal lines,
   a Y-driver which is configured to drive the writing switch, the first memory, and the output inverter,
   a memory operating circuit which is configured to control the operations of the second memory and the sensor circuit,
   a converter circuit which is connected to the signal lines and configured to convert signals supplied in parallel from the signal lines to serial signals and then output the serial signals, and
   a controller which is configured to control the operations of the X-driver, the Y-driver, the memory operating circuit, and the converter circuit.

10. The display apparatus according to claim 1, wherein the signal lines are configured to be provided with at least one of a first display signal as the display signals and a second display signal,
    the memory comprises a plurality of first memories and a second memory which are configured to hold data for provided signals,
    each of the pixels further comprises
    one of the first memories, and
    a first writing switch which is connected between the signal line provided with the first display signal and the first memory and configured to switch whether to write data for the first display signal into the first memory,
    each of the pixel groups further comprises a second writing switch which is connected between the signal line provided with the second display signal and the second memory and configured to switch whether to write the data for the second display signal into the second memory,
    the sensor circuit is connected to the second memory, and configured to rewrite data in the second memory to the data for the detection signal when detecting the input information, and
    the pixel control switch is connected between the first and second memories and the pixel electrode, and configured to switch the voltage level of the pixel electrode in accordance with the data for the first display signal input from the first memory and in accordance with the data for the second display signal input from the second memory or the detection signal.

11. The display apparatus according to claim 1, wherein the memory comprises a plurality of first memories configured to hold data for signals provided thereto,
    the pixel further comprises
    one of the first memories, and
    a writing switch which is connected between the signal line and the first memory, and configured to switch whether to write the data for the display signal into the first memory,
    the sensor circuit is connected to the first memory, and configured to rewrite data in the first memory to the data for the detection signal when detecting the input information, and
    the pixel control switch is connected between the first memory and the pixel electrode, and configured to switch the voltage level of the pixel electrode in accordance with one of the data for the display signal input from the first memory and the data for the detection signal.

12. The display apparatus according to claim 1, wherein the sensor circuit is an alternating current sensor circuit, is configured to detect whether an alternating current signal is input, and is configured to rewrite data in the second memory to the data for the detection signal when the alternating current signal is input.

* * * * *